US007950432B2

(12) United States Patent

Langvin et al.

(10) Patent No.: US 7,950,432 B2

(45) Date of Patent: May 31, 2011

(54) METHOD OF CUSTOMIZING AN ARTICLE AND APPARATUS INCLUDING AN INFLATABLE MEMBER

(75) Inventors: Elizabeth Langvin, Sherwood, OR (US); Zvi Rapaport, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 94 days.

(21) Appl. No.: 12/490,954

(22) Filed: Jun. 24, 2009

(65) Prior Publication Data

US 2010/0326591 A1 Dec. 30, 2010

(51) Int. Cl.
*B32B 37/10* (2006.01)

(52) U.S. Cl. ......................... 156/358; 156/285; 156/382

(58) Field of Classification Search ......................... None
See application file for complete search history.

(56) References Cited

U.S. PATENT DOCUMENTS 1,893,795 A 1/1933 Chapman
3,483,580 A 12/1969 Cherry et al.
4,188,254 A 2/1980 Hemperly, Jr.
4,247,355 A * 1/1981 Friedrich et al. .............. 156/382
4,505,975 A 3/1985 Majima
4,670,084 A 6/1987 Durand
4,724,026 A 2/1988 Nelson
4,792,376 A 12/1988 Denley
4,888,713 A 12/1989 Falk
4,899,411 A 2/1990 Johnson et al.
5,087,495 A 2/1992 Nelson
5,097,390 A 3/1992 Gerrie et al.
5,255,352 A 10/1993 Falk
5,341,532 A 8/1994 Markowitz
5,414,975 A 5/1995 Hummel
5,486,397 A 1/1996 Gordon et al.
5,985,416 A 11/1999 Sherman et al.
5,994,264 A 11/1999 Sherman et al.
6,299,817 B1 10/2001 Parkinson
6,485,668 B1 * 11/2002 Murphy et al. ............... 264/516
6,544,634 B1 4/2003 Abrams et al.
6,718,880 B2 4/2004 Oshima et al.
6,971,135 B2 12/2005 Nadler
6,984,281 B2 1/2006 Oshima et al.
6,994,765 B2 2/2006 Oshima et al.
7,166,249 B2 1/2007 Abrams et al.
2002/0023306 A1 2/2002 Sajedi et al.
2003/0046778 A1 3/2003 Sicurelli, Jr.
2006/0005328 A1 1/2006 Johnson
2006/0024455 A1 2/2006 Oshima et al.

(Continued)

FOREIGN PATENT DOCUMENTS

EP 1000731 5/2000

(Continued)

OTHER PUBLICATIONS

Invitation to Pay Additional Fees mailed Jan. 28, 2010 wuth Annex containing results of International Search Report from PCT Application No. PCT/US2009/059018. International Search Report mailed Jul. 11, 2002 in PCT Application No. PCT/US2002/07617. International Search Report and Written Opinion mailed Apr. 20, 2010 in PCT Application No. PCT/US2009/059018.

*Primary Examiner* — Sam C Yao

(74) *Attorney, Agent, or Firm* — Plumsea Law Group, LLC

(57) ABSTRACT

A graphic transfer assembly is disclosed. The graphic transfer assembly includes an inflatable member that is capable of expanding to fill the interior of an article of footwear. The graphic transfer assembly can include a fluid pump for filling the inflatable member.

11 Claims, 49 Drawing Sheets

U.S. PATENT DOCUMENTS

| | | | | |
|---|---|---|---|---|
| 2007/0079928 | A1 | 4/2007 | Abrams et al. | |
| 2007/0130805 | A1 | 6/2007 | Brady et al. | |
| 2007/0151656 | A1 | 7/2007 | Gager et al. | |
| 2007/0185372 | A1 * | 8/2007 | Anderson et al. | 600/30 |
| 2008/0127426 | A1 * | 6/2008 | Morlacchi et al. | 8/115.51 |

FOREIGN PATENT DOCUMENTS

| | | |
|---|---|---|
| WO | WO 90/08487 | 8/1990 |
| WO | WO 96/29208 | 9/1996 |
| WO | WO 02/072301 | 9/2002 |
| WO | WO 02/094581 | 11/2002 |

* cited by examiner

METHOD OF CUSTOMIZING AN ARTICLE AND APPARATUS INCLUDING AN INFLATABLE MEMBER

BACKGROUND

The present invention relates to a method of making articles, and in particular to a method of applying graphics to an article.

Methods of customizing an article of footwear have been previously proposed. Abrams et al. (U.S. Pat. No. 7,166,249) is directed to an in-mold decorating process. Abrams teaches a method of applying a sheet with a printed graphic to a mold in order to create a molded product that includes the printed graphic. Abrams teaches a method that allows for the in-mold decoration of deep dimensional and three dimensional molded parts.

Abrams teaches an embodiment for applying an image to a molded duck decoy. First, left and right photographic images of the duck are produced using distortion printing to compress the image in designated areas. The sheet is then coated using screen printing techniques. The printed and coated sheet is then vacuum formed to the dimensions of a duck decoy causing the distortion printed areas to assume normal color and proportion. The vacuum formed printed sheet is cut into left and right view pieces which are then placed in the appropriate cavities of a blow mold and molded with polyethylene. When the mold is opened two halves of a duck decoy having a photographic quality image are removed and mated to form a finished decoy.

SUMMARY

A method of customizing an article is disclosed. In one aspect, the invention provides a method of applying a graphic to an article, comprising the steps of: filling an inflatable member with fluid; associating the article with the inflatable member; associating the graphic with a surface of the article; pressing a deformable membrane against a portion of the article so that the deformable membrane conforms to the surface; heating the deformable membrane; and thereby transferring the graphic to the surface.

In another aspect, the invention provides a method of using a graphic transfer assembly, comprising the steps of: attaching an inflatable member to the graphic transfer assembly; inflating the inflatable member to a first size; associating a first article with the inflatable member, the first article having the first size; transferring a first graphic to a portion of the first article using the graphic transfer assembly; removing the first article from the inflatable member; inflating the inflatable member to a second size, the second size being different from the first size; associating a second article with the inflatable member, the second article having the second size; and transferring a second graphic to a portion of the second article using the graphic transfer assembly.

In another aspect, the invention provides a graphic transfer assembly, comprising: a base portion configured to support the graphic transfer assembly; a first moveable portion including a first deformable membrane and a second moveable portion including a second deformable membrane; an actuator configured to control the first moveable portion and the second moveable portion between an open position and a closed position; a support assembly configured to attach an inflatable member to the base portion; the support assembly including a first fluid port configured to fill an interior chamber of the inflatable member with fluid; the support assembly also including a second fluid port, the second fluid port configured to apply a vacuum between the first deformable membrane and the second deformable membrane; the actuator configured to control the first moveable portion and the second moveable portion; and wherein the first deformable membrane and the second deformable membrane are configured to conform to a portion of an article and thereby transfer a graphic to the article.

Other systems, methods, features and advantages of the invention will be, or will become apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE EXEMPLARY EMBODIMENTS

Figure 1:
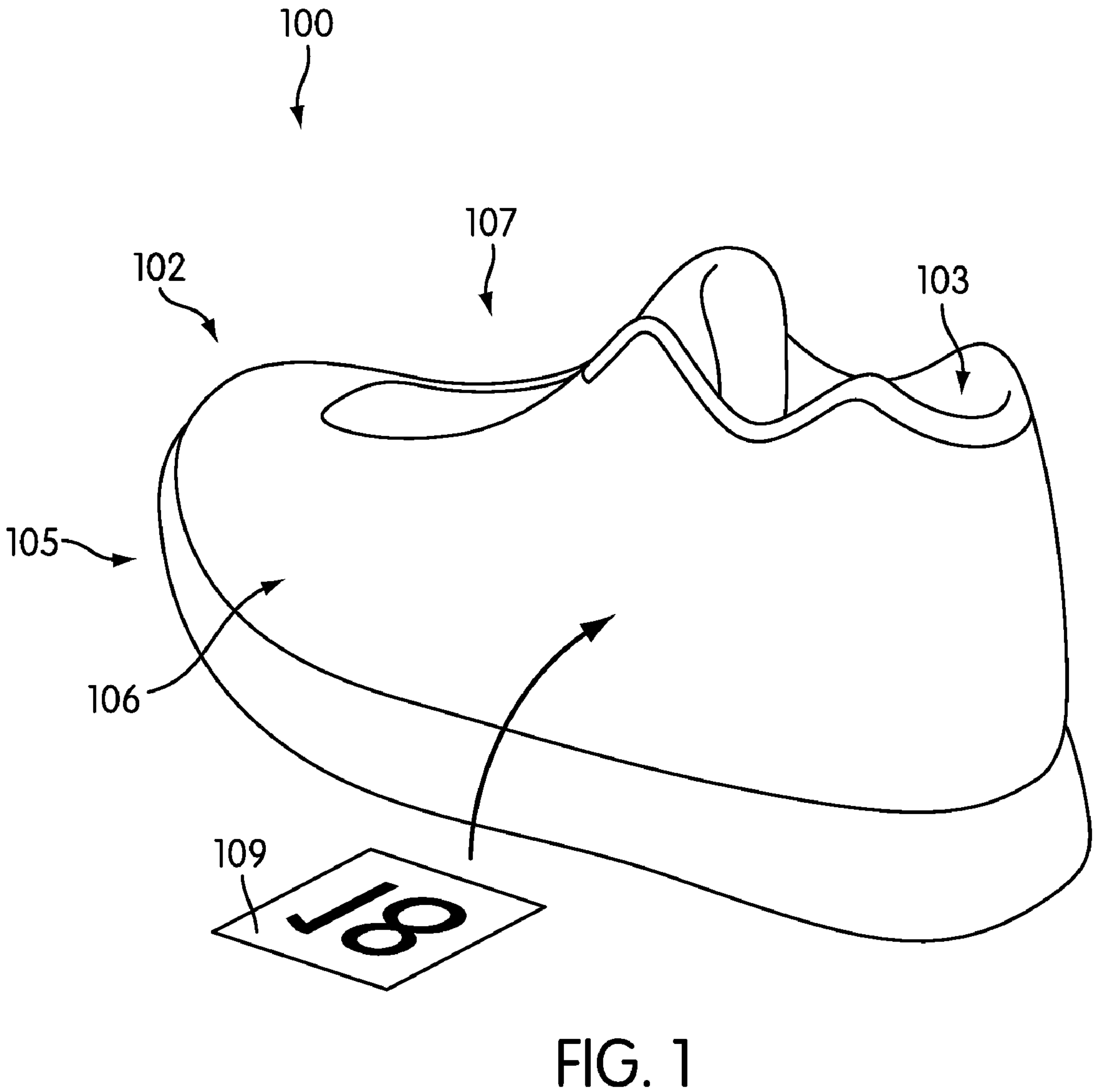
FIG. 1 is an isometric view of an embodiment of an article.
Figure 2:
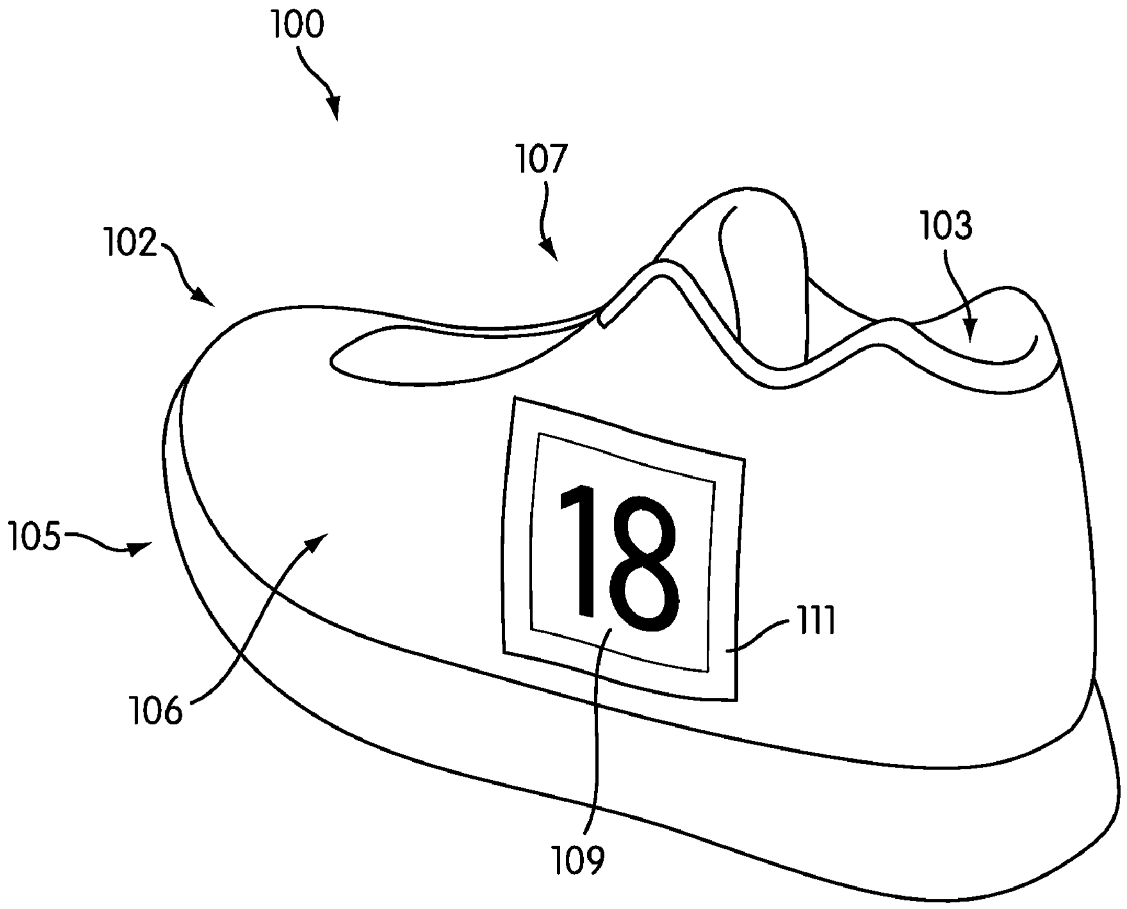
FIG. 2 is an isometric view of an embodiment of an article with an associated graphic.

FIGS. 1 and 2 are schematic views of an embodiment of article 100 that is configured to be worn. In this exemplary embodiment, article 100 is an article of footwear. However, it should be understood that the principles taught throughout this detailed description may be applied to additional articles as well. Generally, these principles could be applied to any article that may be worn. In some embodiments, the article may include one or more articulated portions that are configured to move. In other cases, the article may be configured to conform to portions of a wearer in a three-dimensional manner. Examples of articles that are configured to be worn include, but are not limited to: footwear, gloves, shirts, pants, socks, scarves, hats, jackets, as well as other articles. Other examples of articles include, but are not limited to: shin guards, knee pads, elbow pads, shoulder pads, as well as any other type of protective equipment. Additionally, in some embodiments, the article could be another type of article that is not configured to be worn, including, but not limited to: balls, bags, purses, backpacks, as well as other articles that may not be worn.

In one exemplary embodiment, article 100 may be a high top shoe. However, in other embodiments, article 100 could be any type of footwear, including, but not limited to: a running shoe, a basketball shoe, a high heel shoe, a boot, a slip-on shoe, a low top shoe, as well as other types of footwear. Additionally, while a single article of footwear is shown in the current embodiment, the same principles taught in this detailed description could be applied to a second, complementary article of footwear.

In different embodiments, article 100 may comprise different portions. In this embodiment, article 100 includes upper 102. Generally, upper 102 may be any type of upper. In particular, upper 102 may comprise an upper with any design, shape, size and/or color. For example, in embodiments where article 102 is a basketball shoe, article 102 could comprise a high top upper that is shaped to provide high support on an ankle. In embodiments where article 102 is a running shoe, article 102 could comprise a low top upper that is shaped to provide flexibility during running.

Article 100 is configured to receive a foot of a wearer. In some embodiments, article 100 includes throat 103 configured to receive a foot of a wearer. Typically, throat 103 allows a foot to be inserted into an interior portion of article 100.

Article 100 may include lateral portion 106. Also, article 100 may include medial portion 107 disposed opposite lateral portion 106. Furthermore, lateral portion 106 may be associated with an outside of a foot. Similarly, medial portion 107 may be associated with an inside of a foot.

In some embodiments, article 100 could further be associated with a sole system. In some cases, a sole system for article 100 could include an outsole. In other cases, the sole system could include a midsole. In still other cases, the sole system could include an insole. In an exemplary embodiment, article 100 may include sole system 105. Sole system 105 may include a midsole and an outsole.

Referring to FIGS. 1 and 2, one or more graphics may be applied to portions of article 100. The term "graphic" as used throughout this detailed description and in the claims, applies to any image, picture, text or indicia. In some cases, a graphic may be used for decorative purposes. In other cases, a graphic may be used for displaying various types of information. In still other cases, a graphic may include the application of a color to a portion or a substantial entirety of an article. In some cases, a single solid color could be applied to a portion or a substantial entirety of an article. In other cases, multiple colors could be applied in various manners to a portion or a substantial entirety of an article. Furthermore, in still other cases, a graphic could include a combination of images, colors and other types of designs. For example, in this embodiment, graphic 109 may be associated with article 100.

Generally, a graphic may be configured with any size and shape, including, but not limited to: square shapes, rectangular shapes, elliptical shapes, triangular shapes, regular shapes, irregular shapes as well as other types of shapes. In some cases, a graphic may be three dimensional. In other cases, a graphic may be substantially two dimensional. In one embodiment, graphic 109 is configured with a generally rectangular shape. In addition, graphic 109 is substantially two dimensional. In other words, graphic 109 is relatively flat. Furthermore, in an exemplary embodiment, graphic 109 may be used to indicate a team number of an athlete wearing article 100. For example, in one embodiment, graphic 109 may include the number "18".

In different embodiments, a graphic may be applied using various methods. In one embodiment, a graphic may be printed onto a film that is compatible with an upper material. In particular, the graphic may be printed onto the film in reverse so that the graphic ink contacts the upper material. With this arrangement, the ink is protected by the film. In some cases, the film may be a film that is compatible with a polyurethane (PU) coating on an upper. In other embodiments, however, other methods for applying a graphic to an article may be used.

In different embodiments, one or more graphics may be applied to different portions of article 100. For example, in this embodiment, graphic 109 may be applied to lateral portion 106 of article 100. In some cases, additional graphics may be applied to other portions of article 100.

In some embodiments, a graphic may be applied to a curved portion of an article. For example, an article of footwear may comprise curved portions including, but not limited to: toe portions, heel portions, lacing portions, and sides of an article of footwear. In other embodiments, a graphic may be applied to a substantially flat portion of an article.

In one embodiment, article 100 is substantially complete with portions of upper 102 and sole system 105 assembled to form article 100. With article 100 substantially assembled, lateral portion 106 comprises a curved portion of article 100. In particular, lateral portion 106 may be curved to conform to a portion of a foot that may be inserted within article 100.

In some embodiments, a graphic may be associated with a portion of an article prior to applying the graphic to the article. In some cases, a graphic may be temporarily attached to an article to associate the graphic with the article. In different embodiments, the temporary attachment of a graphic to an article may be accomplished in various manners, including, but not limited to: tape, adhesive and other manners known in the art. In one embodiment, a temporary tape with low adhesion is used to temporarily attach a graphic to an article. For example, in some cases, a frisket-type adhesive may be used. In one embodiment, a mylar tape can be used.

Referring to FIG. 1, graphic 109 may be associated with lateral portion 106 to indicate the position that graphic 109 may be applied to lateral portion 106. In this embodiment, lateral portion 106 may be a curved portion of article 100. In other embodiments, however, lateral portion 106 could be a substantially flat portion of article 100. In an exemplary embodiment, graphic 109 maybe temporarily attached with tape 111 prior to the application of graphic 109 to article 100, as illustrated in FIG. 2. After associating graphic 109 with article 100, a graphic transfer assembly may be used to apply graphic 109 to article 100.

In some embodiments, graphics may be applied to a large portion of an article. In some cases, a graphic may be used to apply color to a portion or an entirety of an article of footwear. In addition, a graphic can be used to apply a design to a portion or entirety of an article of footwear. In other words, the use of a graphic is not limited to a localized region of an article.

Figure 3:
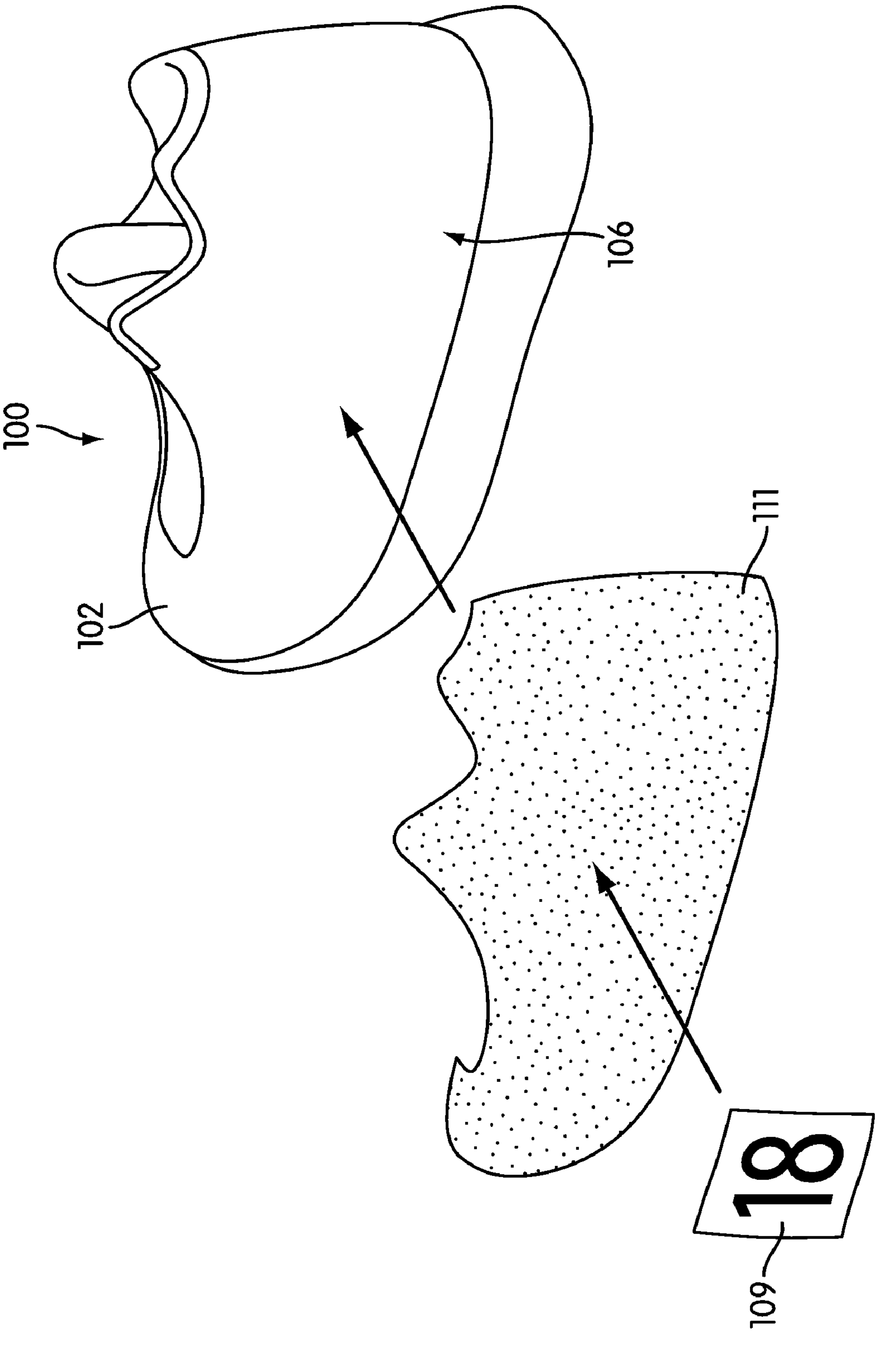
FIG. 3 is an isometric view of an embodiment of an article with an associated graphic.
Figure 4:
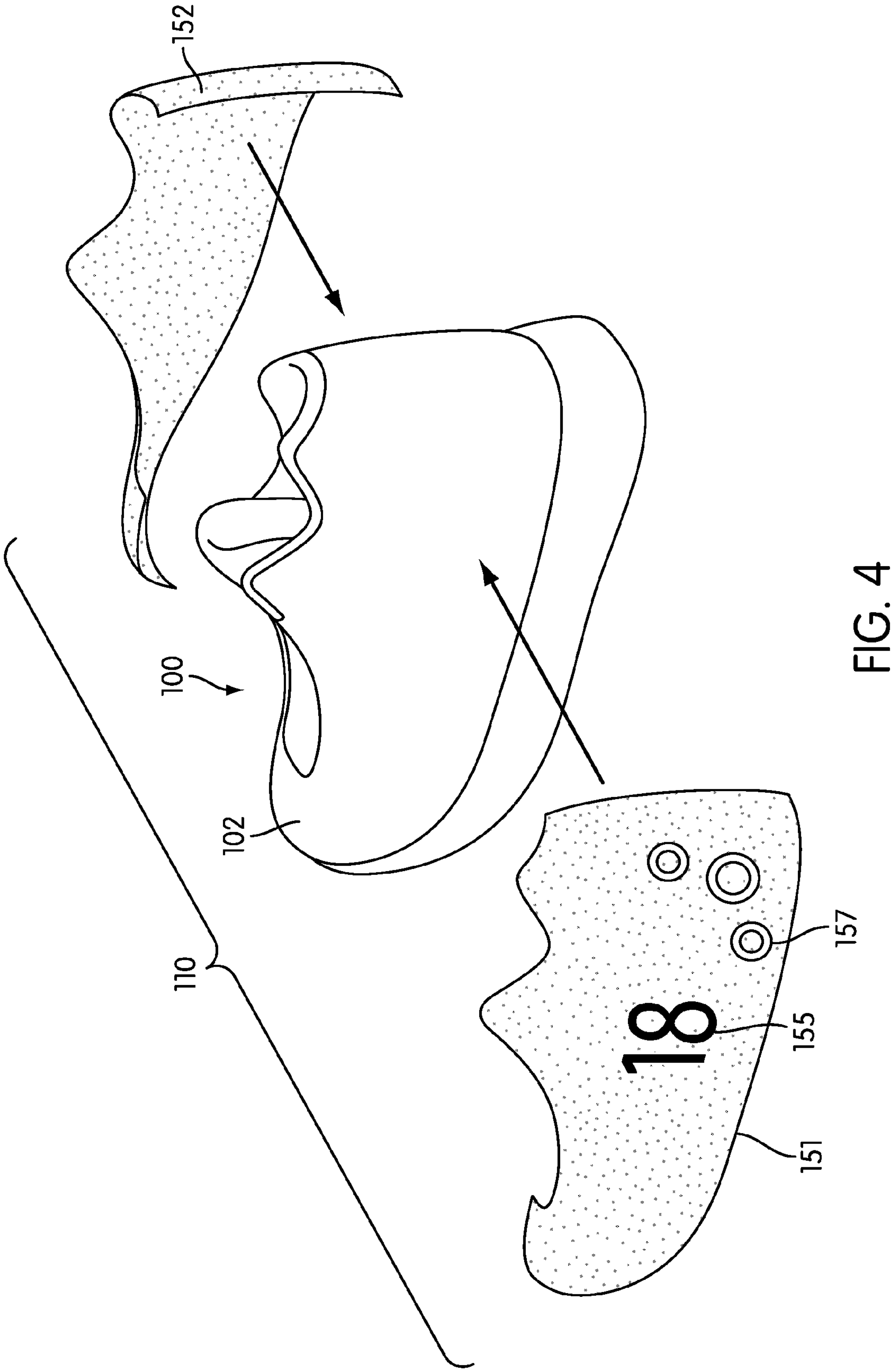
FIG. 4 is an isometric view of an embodiment of an article with an associated graphic.
Figure 5:
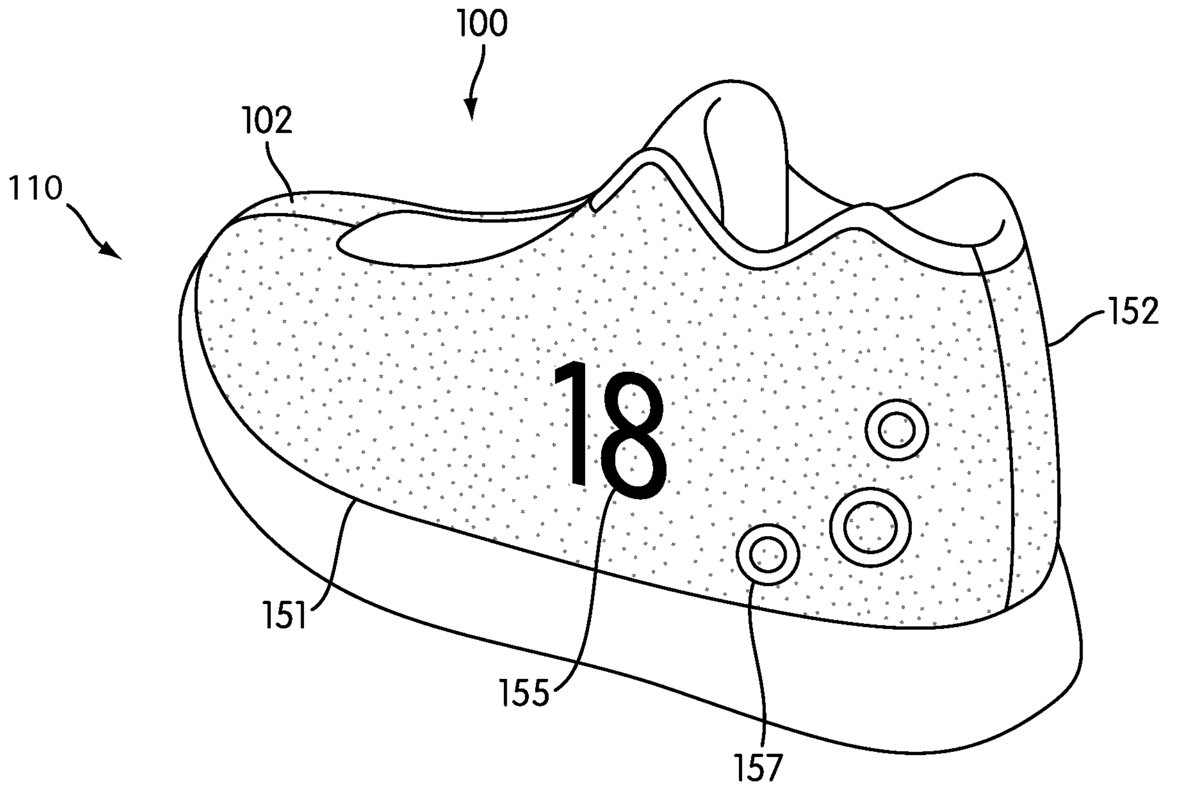
FIG. 5 is an isometric view of an embodiment of an article with an associated graphic.

FIGS. 3-5 illustrate different embodiments of graphics that may be applied to an article of footwear. Referring to FIG. 3, graphic 109 and coloring graphic 111 are applied to article of footwear 100. In some cases, coloring graphic 111 may be applied to lateral portion 106 of article 100 to provide color to the substantial entirety of lateral portion 106. In addition, graphic 109 can be applied directly to coloring graphic 111. In other words, in some cases, multiple graphics can be combined together to form a customized design for an article.

In different embodiments, coloring graphic 111 can be any material configured to cover a substantial majority of article of footwear 100. In some cases, for example, a coloring graphic can be a colored film. In other cases, a coloring graphic can be a thin coating of ink or dye that may be applied in another manner. In one embodiment, coloring graphic 111 may be a colored film that can be joined with lateral portion 106 to provide an overall change in color for upper 102.

Referring to FIGS. 4 and 5, graphic 110 comprises two distinct film portions. In particular, graphic 110 includes first film portion 151 and second film portion 152. In particular, first film portion 151 and second film portion 152 may be films with various inks or other dyes arranged as coloring for the article. In some cases, a film can also include inks and/or dyes arranged as a graphic or design. In this embodiment, first film portion 151 includes graphical number 155. In addition, first film portion 151 includes graphical design portion 157 that comprises a plurality of rings. In other cases, first film portion 151 could include any other combination of shapes, numbers, letters, or other types of images. In some cases, second film portion 152 can also include similar graphics and/or designs. With this arrangement, coloring, as well as distinct designs and patterns can be applied to article of footwear 100 using graphic 110.

In some cases, a customized graphic could be applied to an article. The term "customized graphic" refers to any graphic selected or created by a customer for application to one or more articles. In some cases, a customer may be provided with provisions for creating or selecting a customized graphic using a website associated with a manufacturer. In other cases, a customer can travel to a retail store or a kiosk to engage in a process of selecting or creating a customized graphic. In still other cases, a customer could submit a customized graphic to a manufacturer via mail or email. Examples of a customization process for creating and or selecting customized graphics that can be applied to an article can be found in U.S. Patent Application Publication No. 2008/0147219, entitled "Method of Making an Article of Footwear", filed on Dec. 18, 2006, and published Jun. 19, 2008, and hereby incorporated by reference. This case is hereby referred to as the "digital printing case".

FIGS. 6-15 are intended to illustrate an embodiment of a method of applying a graphic to an article with a graphic transfer assembly. For purposes of illustration, FIGS. 6-15 illustrate an embodiment of a method of applying graphic 110 to lateral portion 106 of article 100. However, it should be understood that this method could also be used to apply a graphic to any other portion of an article. For example, in embodiments where the article is an article of footwear, this method could be used to apply a graphic to another portion of an upper, a sole, as well as any other portions of the article. Furthermore, this method could be used to apply a graphic to individual portions of an article that could later be assembled together to form a completed article.

Figure 6:
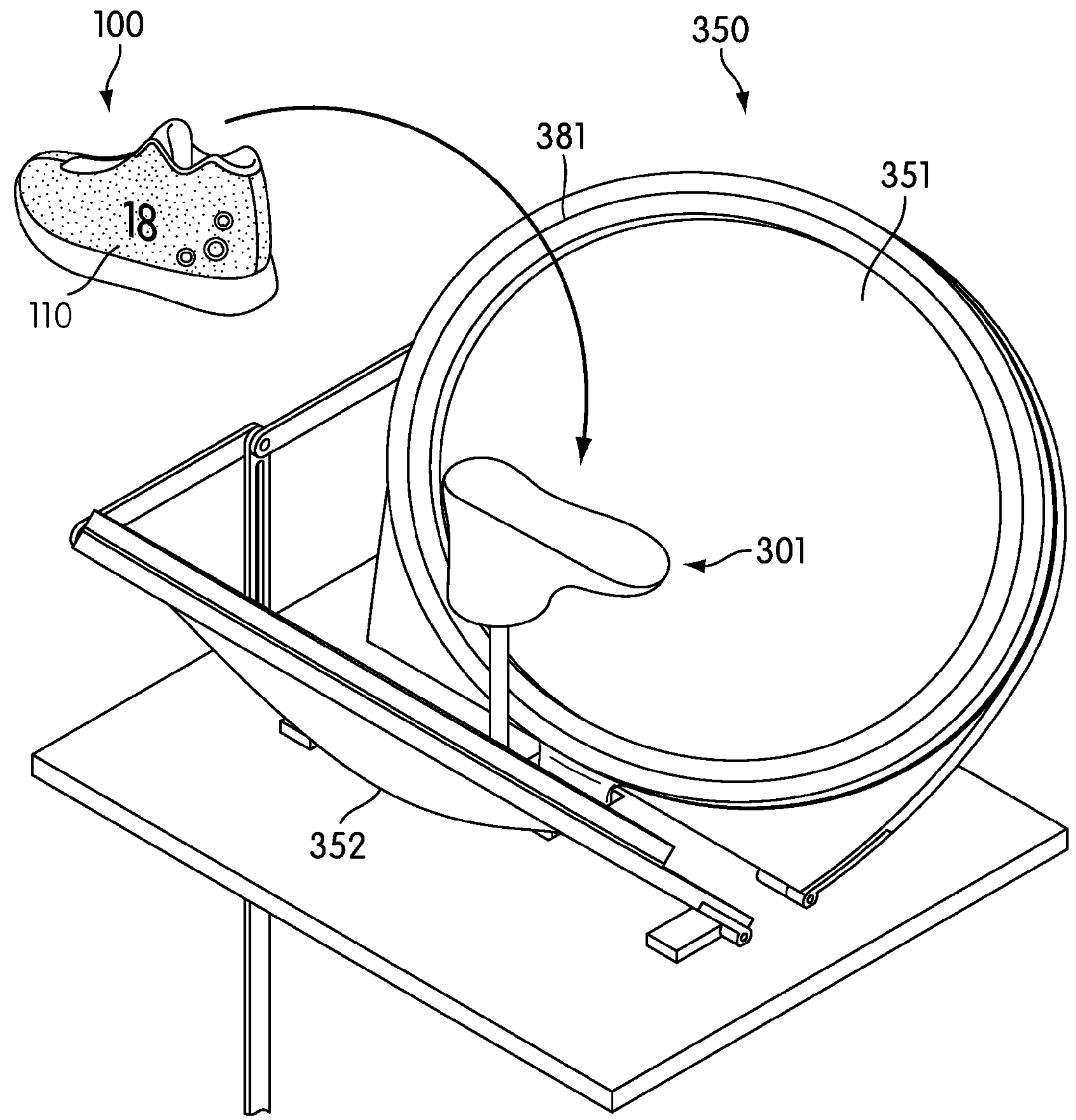
FIG. 6 is an isometric view of an embodiment of an article associated with a last attached to a graphic transfer assembly.

In some embodiments, an article may be associated with a last prior to the application of a graphic to the article. Referring to FIG. 6, last 301 may be inserted within article 100. With last 301 inserted within article 100, article 100 may be configured with a shape substantially similar to the shape that article 100 may assume during use of article 100. In order to apply graphic 110 to article 100, last 301 may be associated with graphic transfer assembly 350. Details of the attachment of last 301 to graphic transfer assembly 350 will be discussed in detail later in this detailed description.

A graphic transfer assembly may include provisions for applying a graphic to a curved portion of an article so that the graphic conforms to the curved portion. In other words, the graphic transfer assembly may be configured to apply the graphic to the curved portion of the article without wrinkles or bends in the curved portion of the article or the graphic. This may be accomplished by pressing the graphic into the various contours of the curved portion. In some cases, a graphic transfer assembly may include a deformable membrane that may be pressed against a curved portion of an article so that the deformable membrane conforms to the curved portion of the article.

In order to conform to a curved portion of an article, a deformable membrane may be constructed from a substantially flexible material. Examples of flexible material include, but are not limited to: natural rubber, synthetic rubber, silicone, other elastomers such as silicone rubber, as well as other materials known in the art. In one embodiment, a deformable membrane may comprise a fabric material.

In some embodiments, a graphic transfer assembly may include more than one deformable membrane. In an exemplary embodiment, graphic transfer assembly 350 includes two deformable membranes. In particular, graphic transfer assembly 350 includes first deformable membrane 351 and second deformable membrane 352.

Generally, a deformable membrane may be configured with any size and shape. Examples of shapes include, but are not limited to: square shapes, rectangular shapes, elliptical shapes, triangular shapes, regular shapes, irregular shapes as well as other types of shapes. In some embodiments, a deformable membrane may be configured with a size and shape to cover a substantial entirety of a portion of an article. For example, a deformable membrane may be configured with a size and shape to cover a medial portion of an article. In one embodiment, first deformable membrane 351 and second deformable membrane 352 may be configured with an oval shape.

Figure 7:
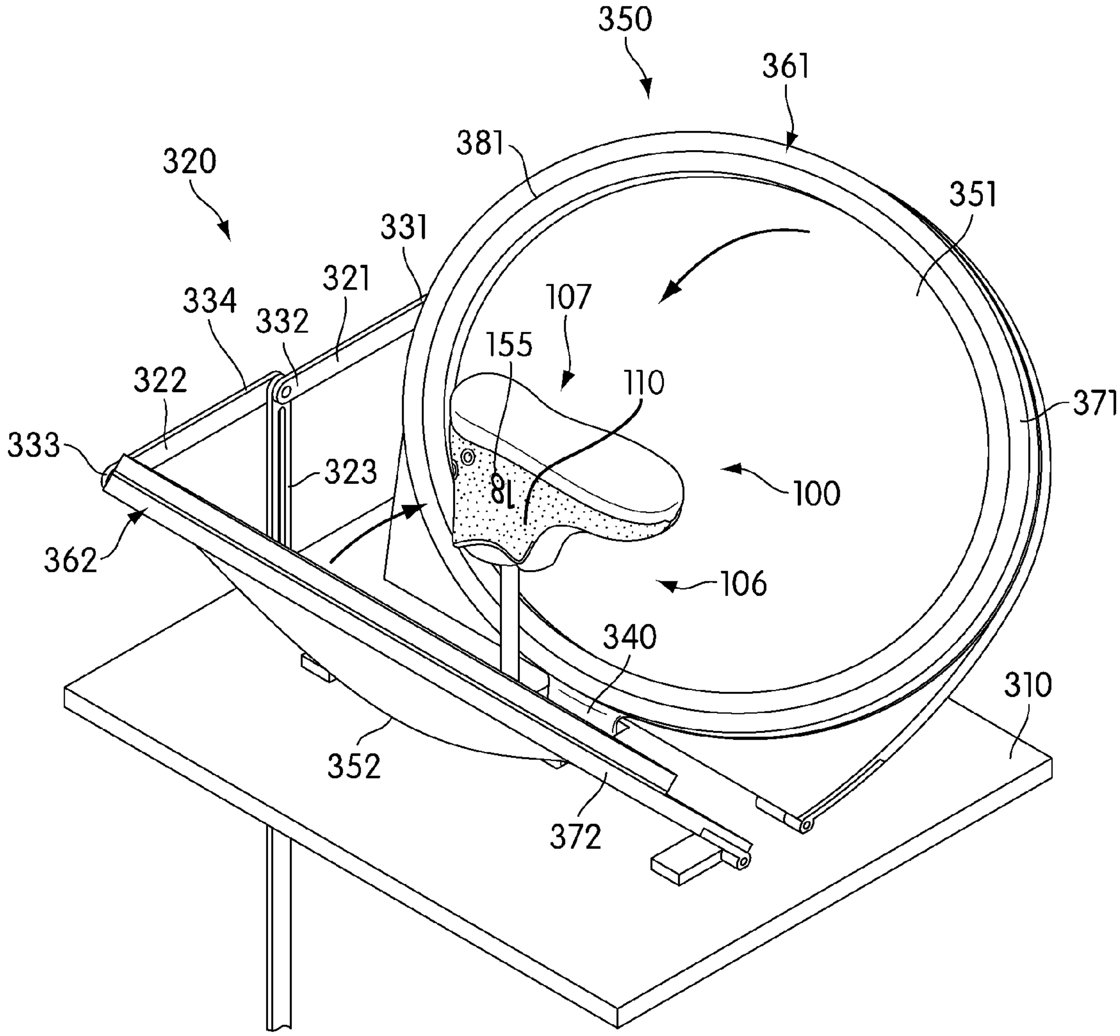
FIG. 7 is a schematic view of an embodiment of an article disposed on a graphic transfer assembly with deformable membranes configured to press against portions of the article.

In some cases, first deformable membrane 351 may be associated with medial portion 107 of article 100, as illustrated in FIG. 7. Similarly, second deformable membrane 352 may be associated with lateral portion 106 of article 100. In other cases, first deformable membrane 351 and second deformable membrane 352 may be associated with other portions of article 100. For example, first deformable membrane 351 may be associated with a toe portion of article 100. Likewise, second deformable membrane 352 may be associated with a heel portion of article 100.

In some embodiments, a graphic transfer assembly may include provisions to press a deformable membrane against a portion of an article. In some cases, a graphic transfer assembly may move an article against a deformable membrane. In other words, a deformable membrane may be fixed in a stationary position while an article is pressed into the deformable membrane. In other cases, a graphic transfer assembly may move a deformable membrane against an article. In other words, an article may be fixed in a stationary position while a deformable membrane is pressed against the article. In an exemplary embodiment, a graphic transfer assembly may include moveable portions to move deformable membranes against portions of an article.

Referring to FIG. 7, graphic transfer assembly 350 includes first moveable portion 361 and second moveable portion 362. First moveable portion 361 may be associated with first deformable membrane 351. Likewise, second moveable portion 362 may be associated with second deformable membrane 352.

Generally, first moveable portion 361 and second moveable portion 362 may be configured with any shape and size, including, but not limited to: square shapes, rectangular shapes, elliptical shapes, triangular shapes, regular shapes, irregular shapes as well as other types of shapes. In one embodiment, first moveable portion 361 and second moveable portion 362 may be configured with an oval shape.

In one embodiment, first moveable portion 361 may comprise first outer frame 371, as illustrated in FIG. 7. In some cases, first outer frame 371 of first moveable portion 361 may be disposed around a periphery of first deformable membrane 351. In particular, first deformable membrane 351 may be attached to first moveable portion 361 at first outer frame 371.

In a similar manner, second moveable portion 362 may include second outer frame 372. Second outer frame 372 may be disposed around a periphery of second deformable membrane 352. In particular, second deformable membrane 352 may be attached to second moveable portion 362 at second outer frame 372.

First moveable portion 361 and second moveable portion 362 may also be attached to other portions of graphic transfer assembly 350. In one embodiment, first outer frame 371 of first moveable portion 361 and second outer frame 372 of second moveable portion 362 may be attached to base portion 310 of graphic transfer assembly 350. With this arrangement, base portion 310 may provide support for first moveable portion 361 and second moveable portion 362.

In some embodiments, first outer frame 371 and second outer frame 372 may include provisions for joining first moveable portion 361 and second moveable portion 362 together. In some cases, first outer frame 371 and second outer frame 372 may include seals to join first moveable portion 361 and second moveable portion 362. Referring to FIG. 6, first outer frame 371 includes seal 381. For example, in one embodiment, seal 381 may be a gasket seal. In some cases, second outer frame 372 may include a corresponding seal. In other cases, only seal 381 may be used. With this arrangement, first moveable portion 361 may be joined with second moveable portion 362 in a substantially air tight manner.

In some embodiments, graphic transfer assembly 350 may be associated with an actuator that is configured to control first moveable portion 361 and second moveable portion 362.

In one embodiment, graphic transfer assembly 350 includes actuator 320. Generally, actuator 320 may be configured in various manners known in the art to control first moveable portion 361 and second moveable portion 362. In an exemplary embodiment, actuator 320 may be configured with first lateral portion 321 to control first moveable portion 361. Also, actuator 320 may include second lateral portion 322 to control second moveable portion 362.

In some cases, first lateral portion 321 may be attached to first outer frame 371 of first moveable portion 361. In particular, first end portion 331 of first lateral portion 321 may be attached to first outer frame 371. Likewise, second end portion 332 of first lateral portion 321 may be attached to central portion 323 of actuator 320. In a similar manner, second lateral portion 322 may be attached to second outer frame 372 of second moveable portion 362. In particular, first end portion 333 of second lateral portion 322 may be attached to second outer frame 372. In addition, second end portion 334 of second lateral portion 322 may be attached to central portion 323 of actuator 320.

Figure 8:
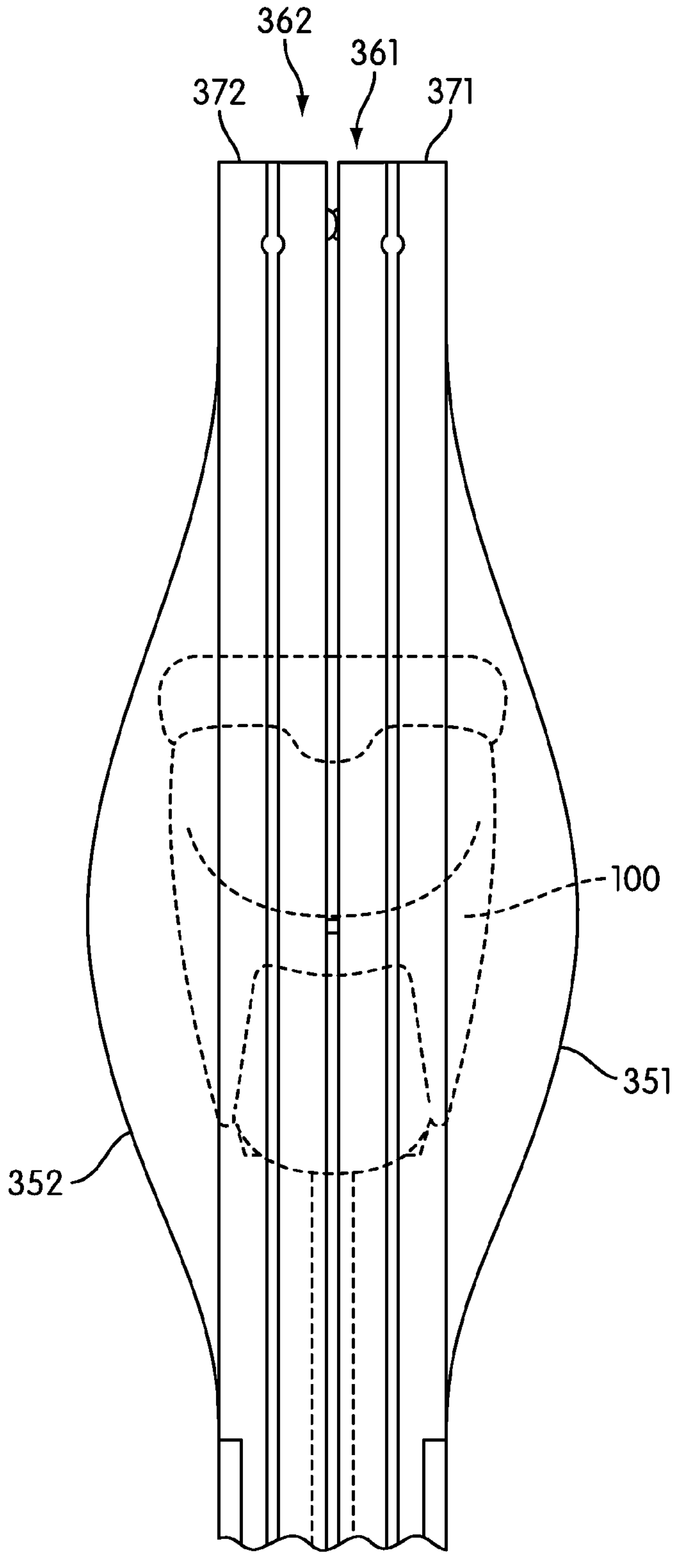
FIG. 8 is a schematic view of an embodiment of an article disposed on a graphic transfer assembly with deformable membranes enclosing curved portions of the article.
Figure 9:
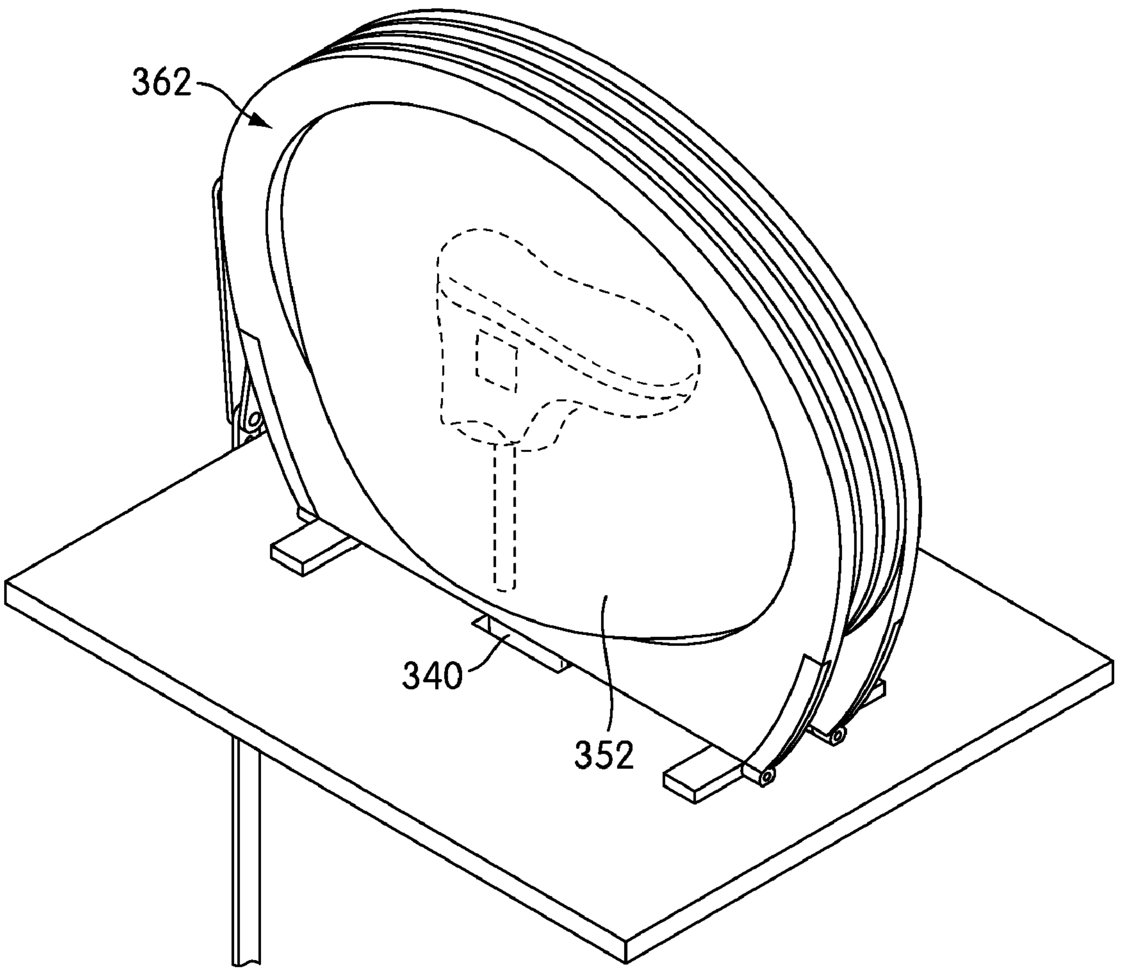
FIG. 9 is a side view of an embodiment of an article disposed between deformable membranes enclosing curved portions of the article.

With first outer frame 371 and second outer frame 372 attached to first lateral portion 321 and second lateral portion 322, respectively, as well as to base portion 310, actuator 320 may be configured to move first moveable portion 361 and second moveable portion 362 in a manner substantially similar to a clam shell closing. In one embodiment, actuator 320 may depress central portion 323 to pull second end portion of 332 of first lateral portion 321 and second end portion 334 of second lateral portion 322 in a downward direction. As second end portion 332 and second end portion 334 are pulled downward, first end portion 331 and first end portion 333 may be pulled upward and inward. This arrangement pulls first moveable portion 361 and second moveable portion 362 inward. With this arrangement, first moveable portion 361 and second moveable portion 362 may be pressed against each other at first outer frame 371 and second outer frame 372, as illustrated in FIGS. 8 and 9. In some cases, first seal 381 and second seal 382 may join as first outer frame 371 and second outer frame 372 are pressed against each other together.

As first moveable portion 361 and second moveable portion 362 are pressed against each other, first deformable membrane 351 and second deformable membrane 352 may be pressed against article 100. In some embodiments, first deformable membrane 351 and second deformable membrane 352 may press against portions of article 100 that do not comprise a substantial entirety of article 100. In other embodiments, first deformable membrane 351 and second deformable membrane 352 may press against portions of article 100 that comprise a substantial entirety of article 100.

In some embodiments, a deformable membrane may press against a portion of an article in a relatively loose manner. In other words, the deformable membrane may not conform to a curved portion of an article when the deformable membrane presses against the article. In an exemplary embodiment, first deformable membrane 351 and second deformable membrane 352 are pressed against portions of article 100 in a relatively loose manner, as illustrated in FIGS. 8 and 9.

A graphic transfer assembly may include provisions to assist a deformable membrane in conforming to a curved portion of an article. In some embodiments, a deformable membrane may be tightened against a portion of an article to conform to a curved portion of the article. In some cases, air between deformable membranes may be evacuated so that the deformable membranes conform to curved portions of an article.

In one embodiment, graphic transfer assembly 350 may include air valve 340. Generally, air valve 340 may be associated with graphic transfer assembly 350 in a manner known in the art that allows air valve 340 to evacuate air from between first deformable membrane 351 and second deformable membrane 352. In one embodiment, air valve 340 disposed between first moveable portion 361 and second moveable portion 362, as illustrated in FIGS. 7 and 9. Air valve 340 may also be attached to a vacuum tank, not shown in these Figures. With this arrangement, air valve 340 may evacuate air from a space between first deformable membrane 351 and second deformable membrane 352 when first seal 381 and second seal 382 are joined.

Figure 10:
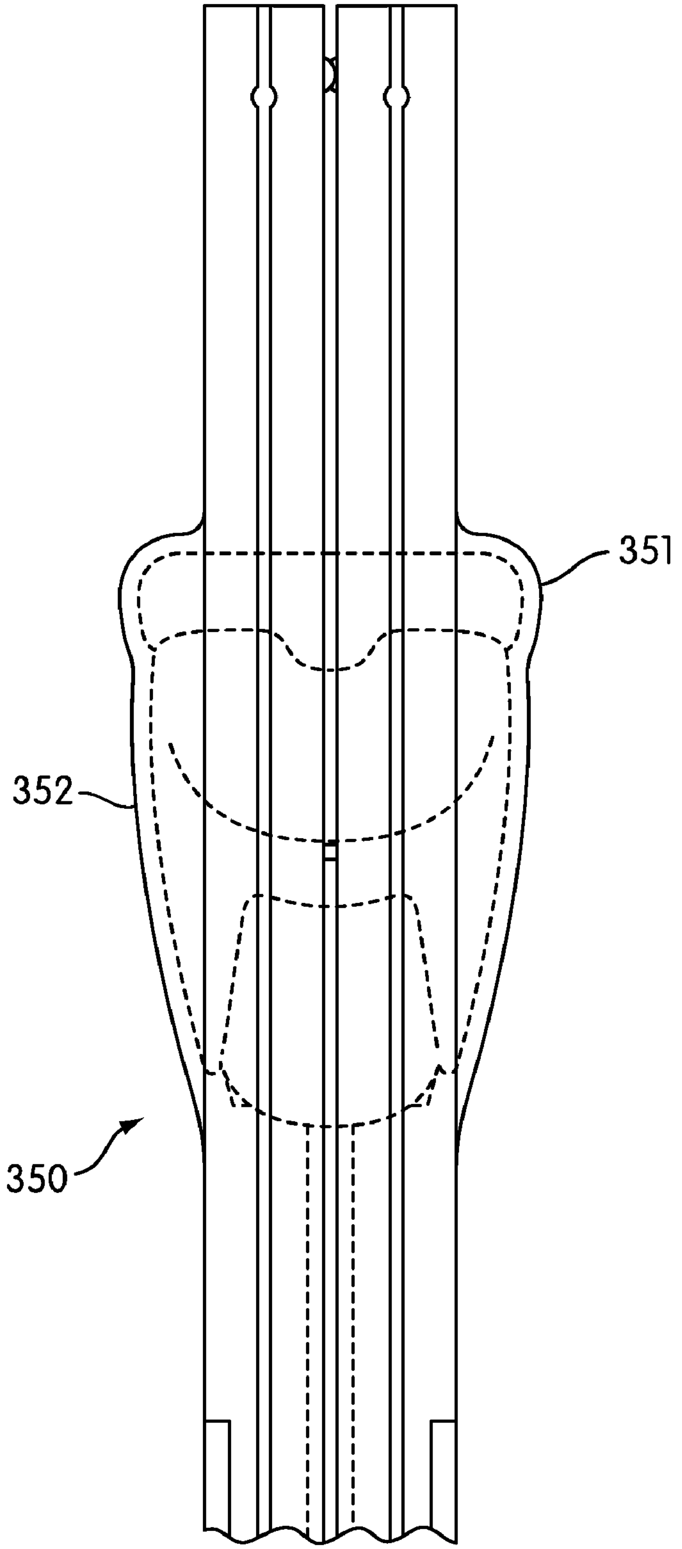
FIG. 10 is a schematic view of an embodiment of an article disposed on a graphic transfer assembly with deformable membranes conforming to curved portions of the article.
Figure 11:
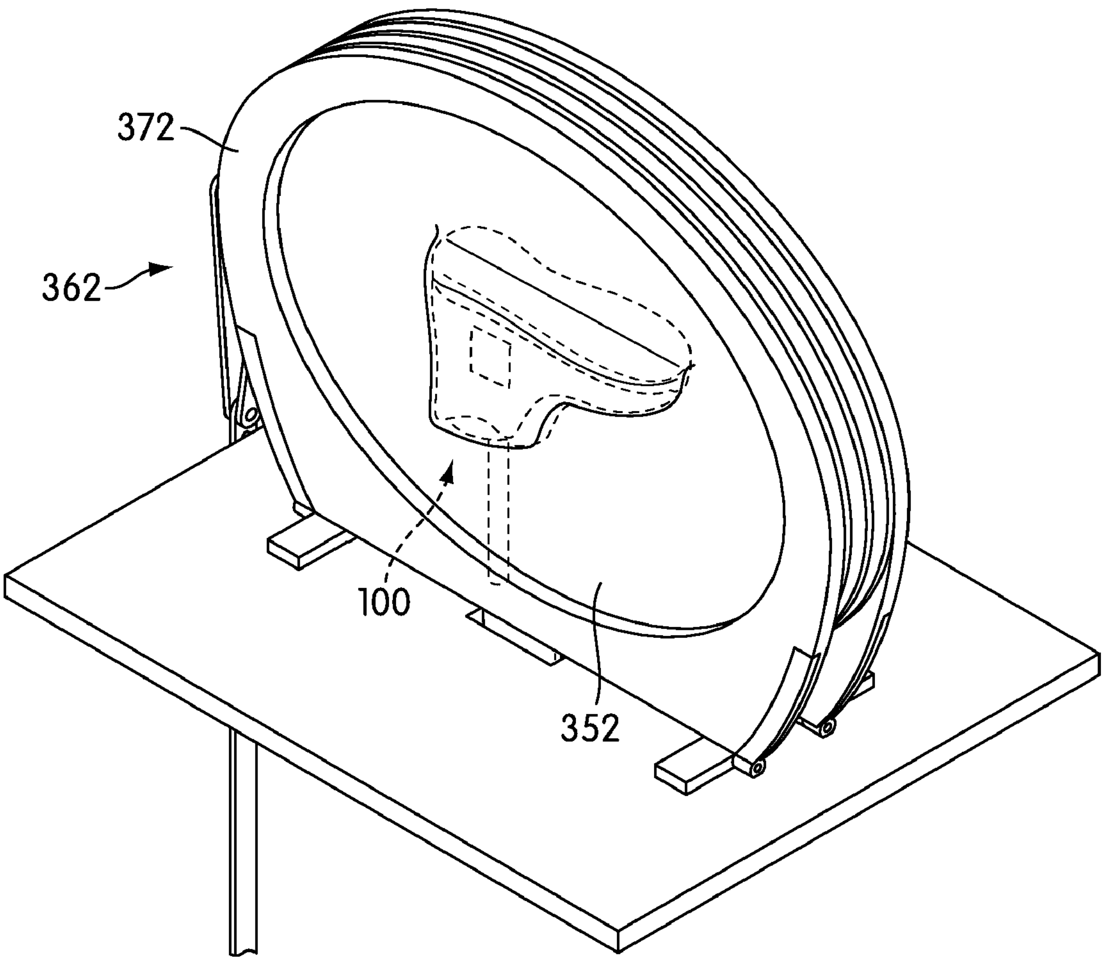
FIG. 11 is a side view of an embodiment of an article disposed between deformable membranes conforming to curved portions of the article.

Referring to FIGS. 10 and 11, air is evacuated from a space between first deformable membrane 351 and second deformable membrane 352. This allows first deformable membrane 351 and second deformable membrane 352 to conform to curved portions of article 100. In particular, first deformable membrane 351 conforms to curved portions of medial portion 107 of article 100. In a similar manner, second deformable membrane 352 conforms to curved portions of lateral portion 106 of article 100.

In order to apply a graphic to an article, heat may be used to attach the graphic to the article. In some embodiments, heat may be applied by heating elements disposed adjacent to a deformable membrane. In other embodiments, heat may be applied by heat radiated from a deformable membrane. In some cases, heating wires may be embedded in a deformable membrane. In other cases, a deformable membrane may comprise a heat conducting material to transfer heat to an article.

With first deformable membrane 351 and second deformable membrane 352 conforming to curved portions of article 100, heat may be transferred through first deformable membrane 351 and second deformable membrane 352 to apply graphic 110 to article 100. In an exemplary embodiment, heating wires embedded in first deformable membrane 351 and second deformable membrane 352 may be heated to apply graphic 110 to article 100.

Figure 12:
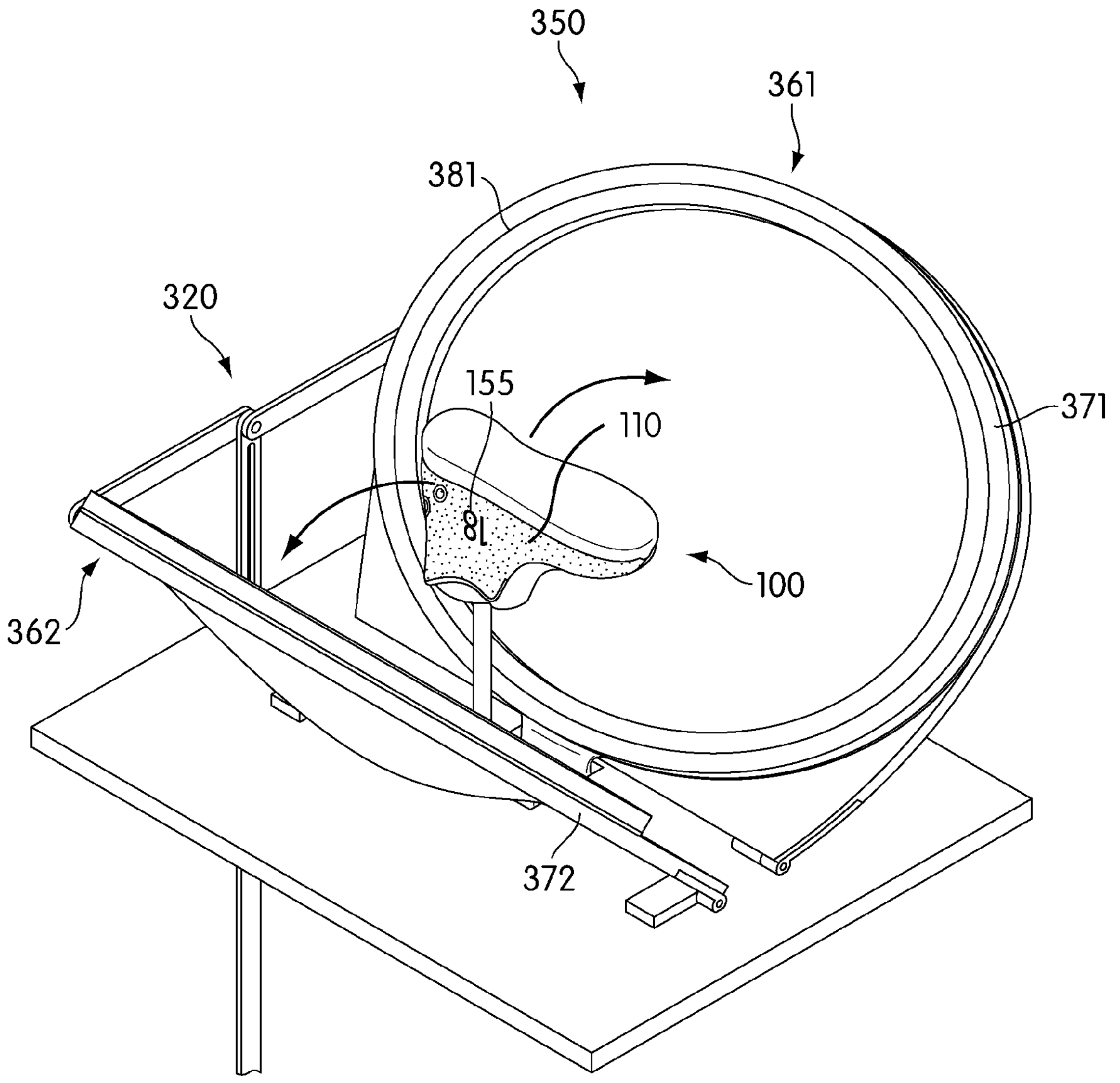
FIG. 12 is a schematic view of an embodiment of deformable membranes of a graphic transfer assembly moving away from an article.

Following heat transfer of graphic 110 to article 100, graphic 110 may be applied to article 100. With graphic 110 applied to article 100, actuator 320 may be configured to open first moveable portion 361 and second moveable portion 362, as illustrated in FIG. 12. With first moveable portion 361 and second moveable portion 362 no longer pressing against article 100, article 100 may be removed from last 301, as seen in FIG. 6, and graphic transfer assembly 350.

Figure 13:
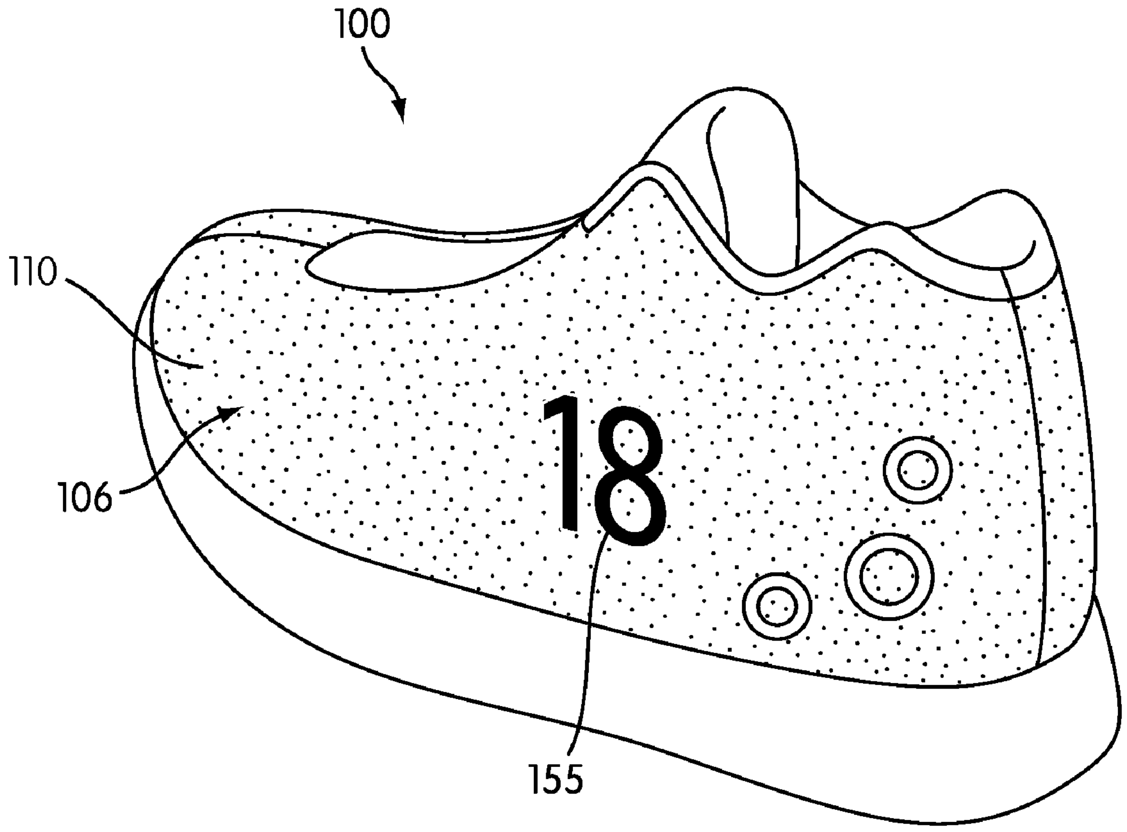
FIG. 13 is a schematic view of an embodiment of an article with a graphic applied to a curved portion of the article.

Referring to FIG. 13, graphic 110 is applied to lateral portion 106 of article 100. Although only one graphic is applied to article 100 in this exemplary embodiment, it should be understood that additional graphics may be applied to article 100 at a substantially same time as graphic 110 is applied to lateral portion 106. For example, a graphic associated with medial portion 107 of article 100 may be applied at substantially the same time as graphic 110. In other words, this method may be used to apply multiple graphics to portions of article 100 at a substantially same time.

Graphic transfer assembly 350 may be used to apply graphics to various types of articles. In particular, first deformable membrane 351 and second deformable membrane 352 may be configured to conform to a variety of curved portions associated with various types of articles. For example, FIGS. 11-13 illustrate an embodiment of a method of applying a graphic to an article with a low top upper.

Figure 14:
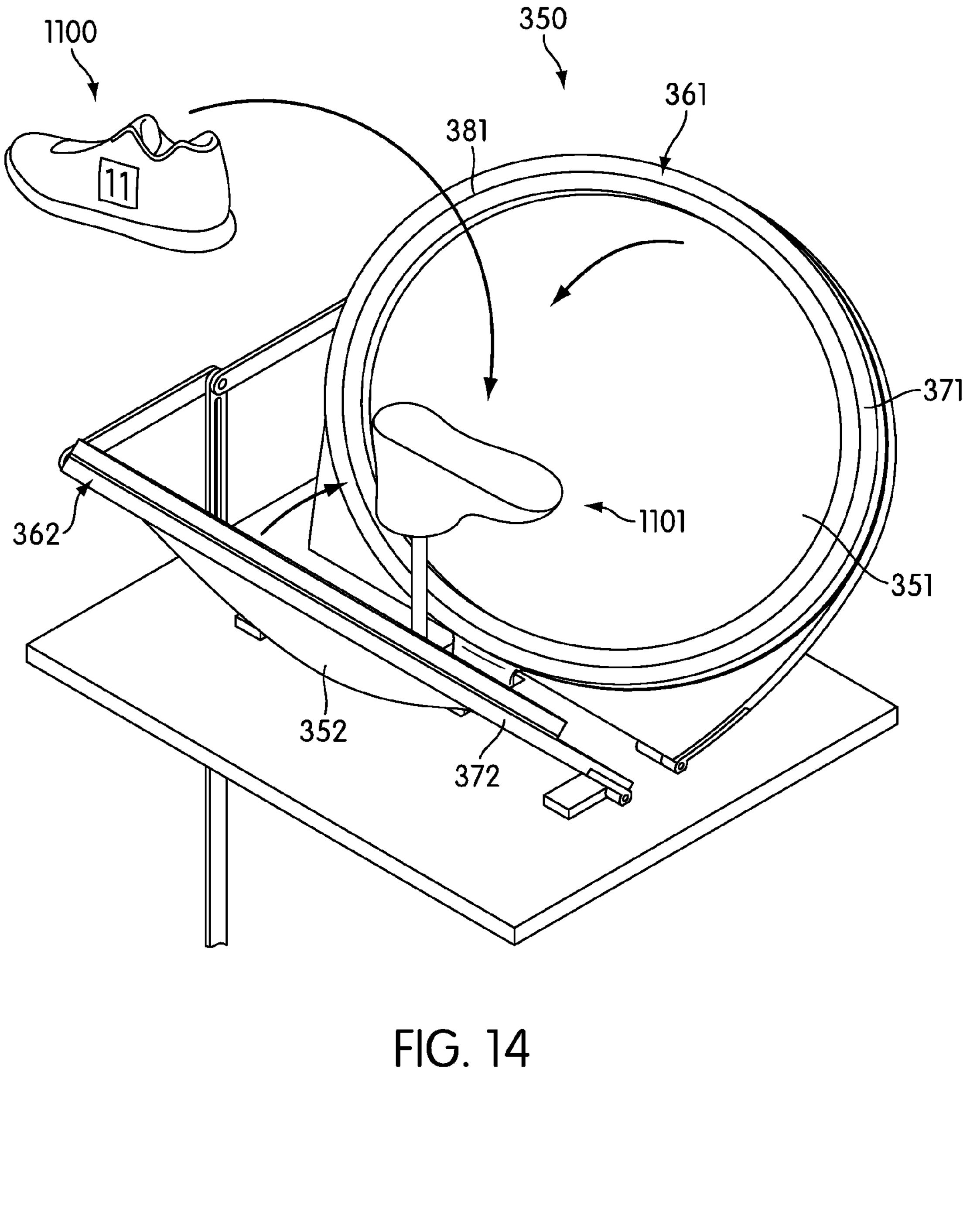
FIG. 14 is a schematic view of an embodiment of an article associated with a last and disposed on a graphic transfer assembly.

Referring to FIG. 14, a graphic associated with article 1100 may be applied to article 1100 by graphic transfer assembly 350. In one embodiment, article 1100 may be a low top running shoe. In order to apply a graphic to article 1100, article 1100 may be associated with last 1101. Last 1101 may be attached to graphic transfer assembly 350. With article 1100 disposed on graphic transfer assembly 350, first moveable portion 361 and second moveable portion 362 may be moved to press first deformable membrane 351 and second deformable membrane 352 against article 100 in a substantially similar manner as the previous embodiment.

Figure 15:
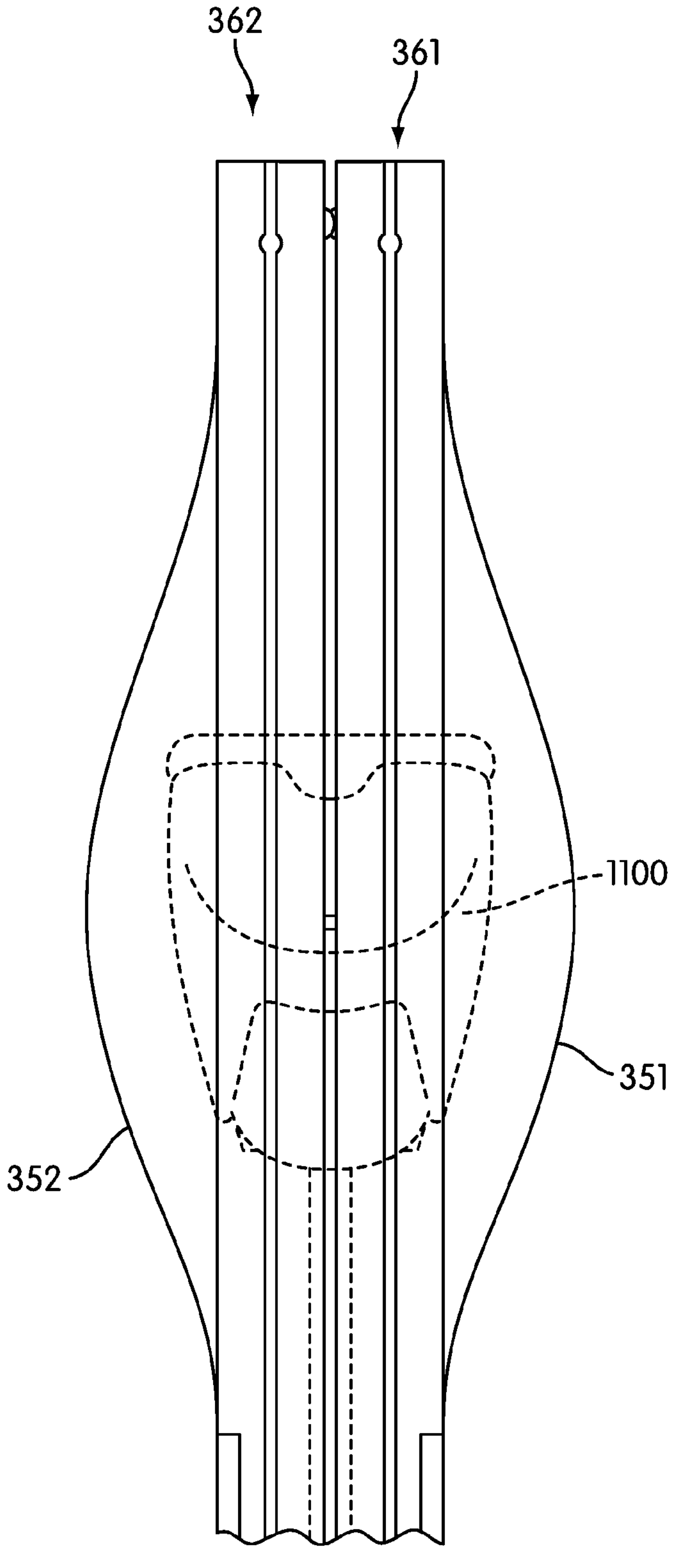
FIG. 15 is a schematic view of an embodiment of deformable membranes of a graphic transfer assembly enclosing an article.
Figure 16:
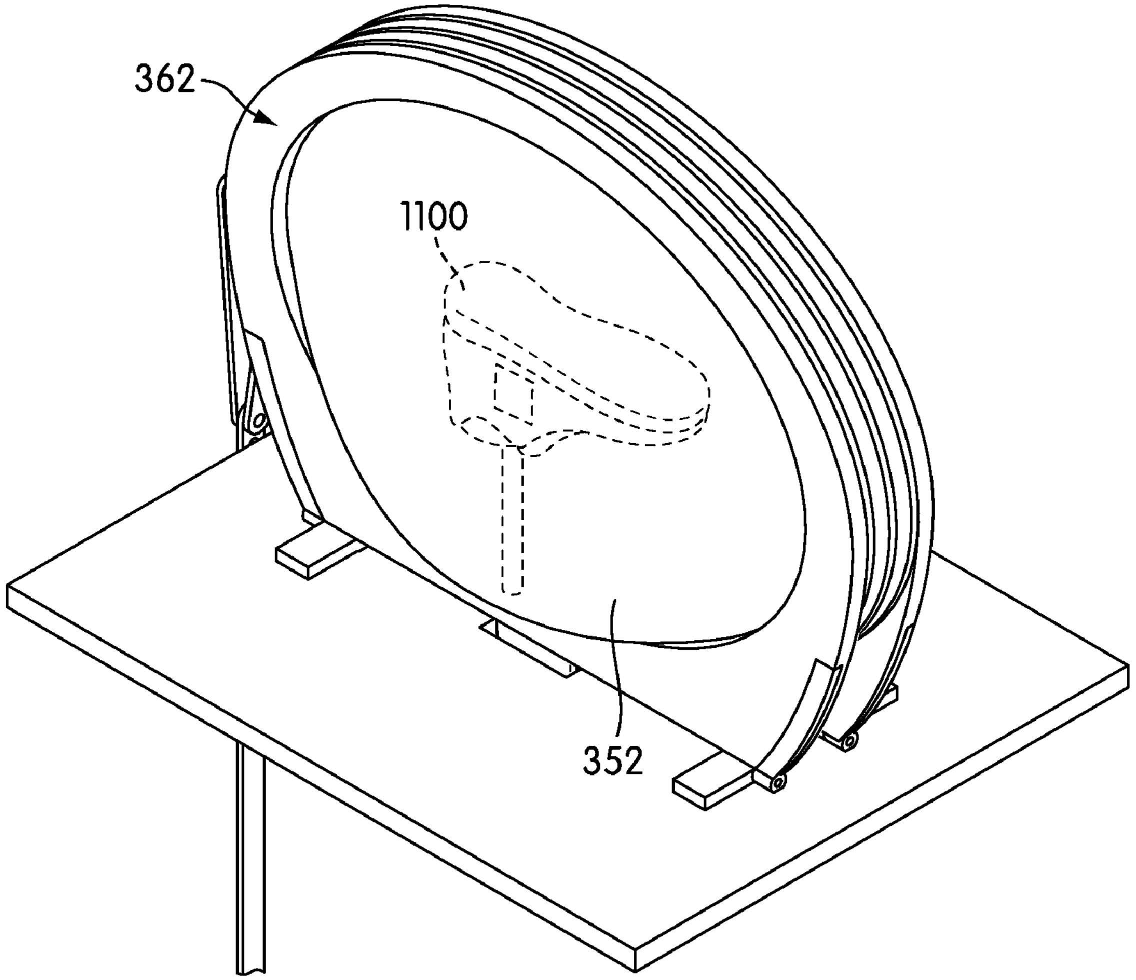
FIG. 16 is a side view of an embodiment of deformable membranes of a graphic transfer assembly conforming to curved portions of an article.

After first moveable portion 361 and second moveable portion 362 are joined, air may be evacuated from a space between first deformable membrane 351 and second deformable membrane 352. This allows first deformable membrane 351 and second deformable membrane 352 to conform to curved portions of article 1100, as illustrated in FIGS. 15 and 16. With this arrangement, heat may be transferred by first deformable membrane 351 and second deformable membrane 352 to apply a graphic to article 1100.

A graphic transfer assembly can include provisions for automatically opening and closing. For example, in some embodiments, a graphic transfer assembly can include automatically controlled actuators for opening and closing one or more moveable portions of the graphic transfer assembly.

Figure 17:
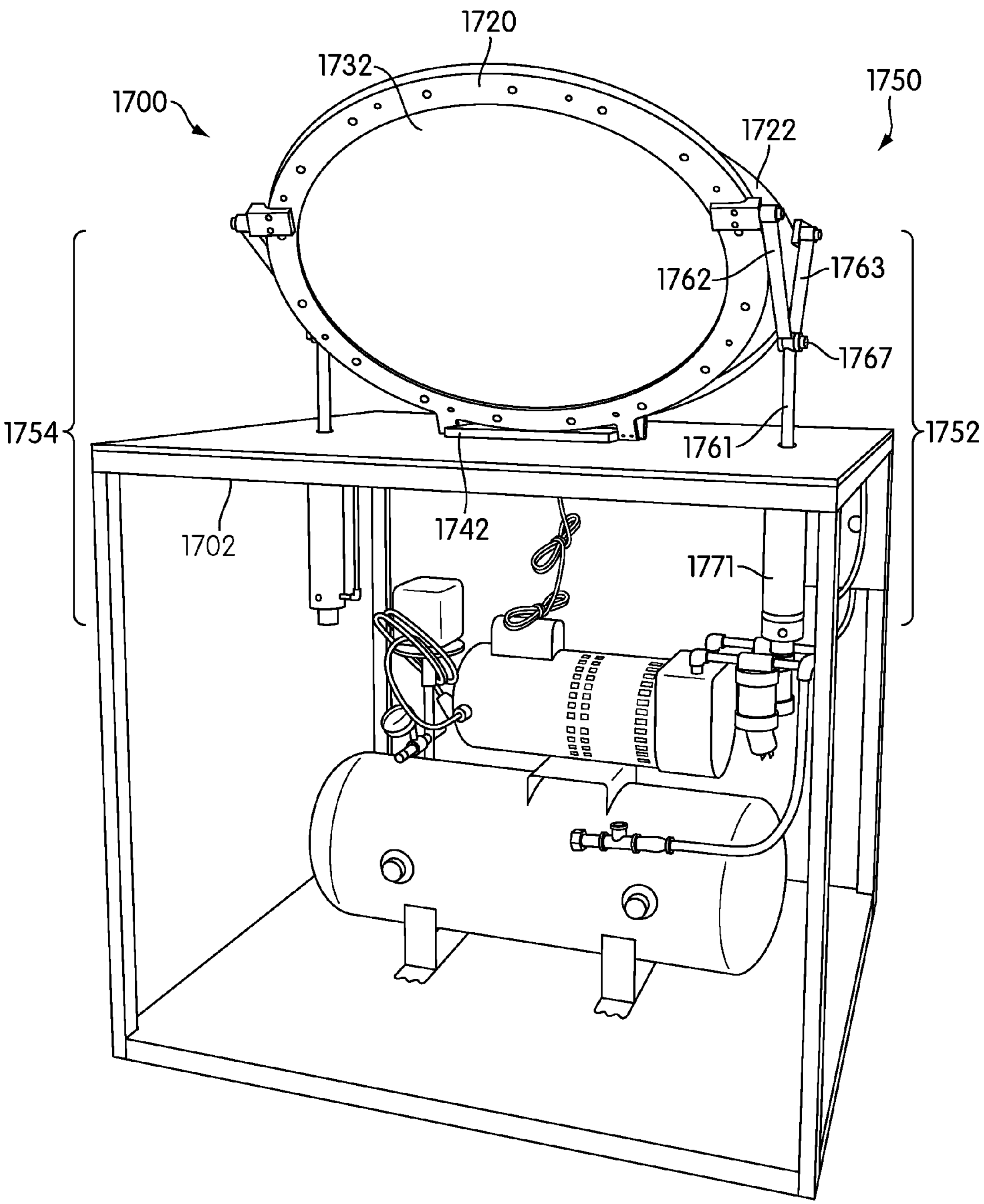
FIG. 17 is an isometric view of an exemplary embodiment of a graphic transfer assembly.
Figure 18:
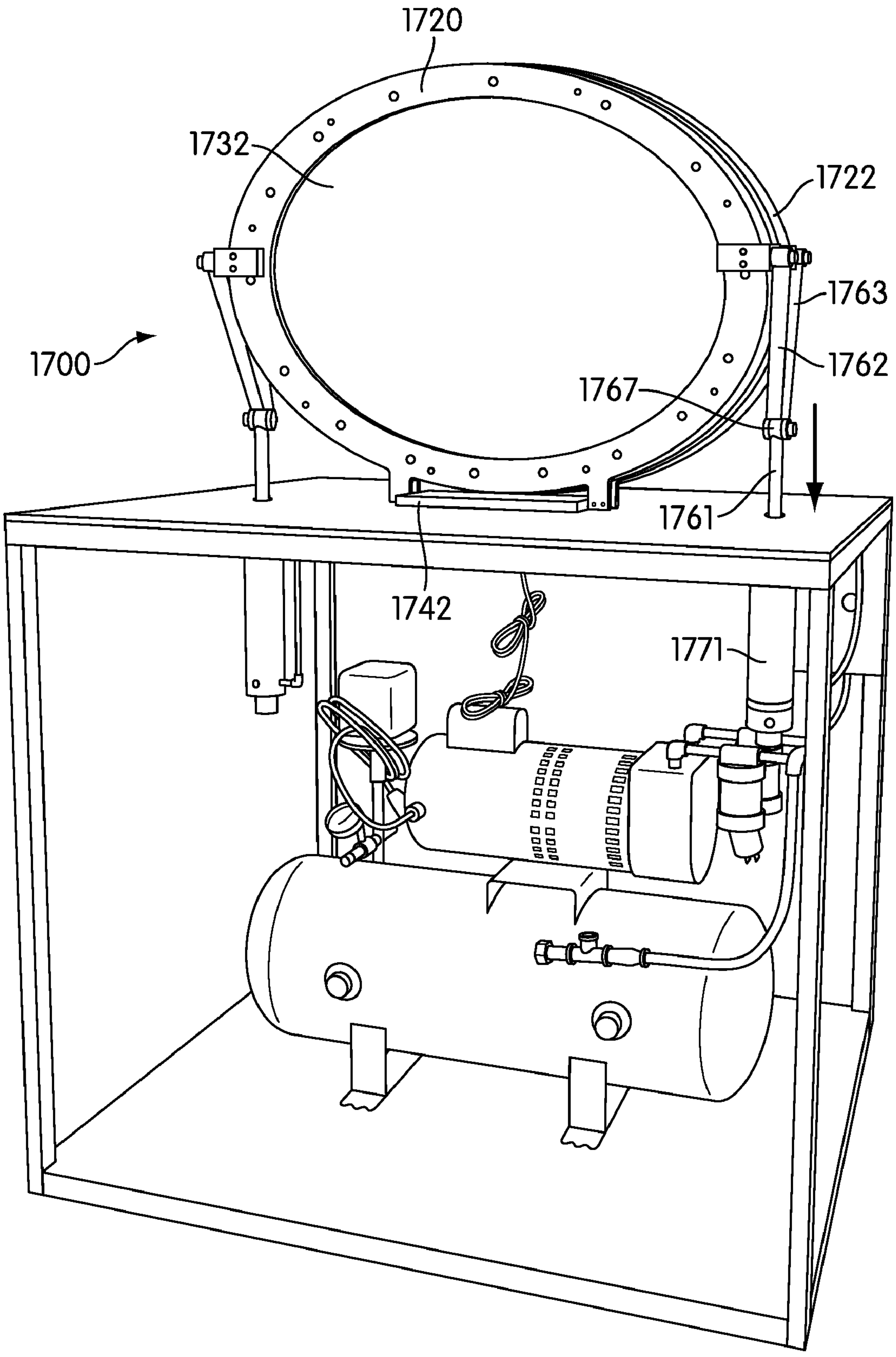
FIG. 18 is an isometric view of an exemplary embodiment of a graphic transfer assembly.

FIGS. 17 and 18 illustrate another embodiment of a graphic transfer assembly. Referring to FIGS. 17 and 18, graphic transfer assembly 1700 includes base portion 1702. In some cases, graphic transfer assembly 1700 can further include first moveable portion 1720 and second moveable portion 1722. Also, first moveable portion 1720 and second moveable portion 1722 may be further associated with first deformable membrane 1732 and a second deformable membrane, which is not visible.

In some embodiments, first moveable portion 1720 may be attached to base portion 1702 at first pivot attachment 1742. Likewise, second moveable portion 1722 may be attached to base portion 1702 at a similar pivot attachment that is disposed adjacent to first pivot attachment 1742. With this arrangement, first moveable portion 1720 and second moveable portion 1722 can be drawn apart to insert a last and/or an article and can also be drawn together to apply a graphic to an article in the manner previously discussed.

In this embodiment, graphic transfer assembly 1700 further includes actuation system 1750. In particular, actuation system 1750 comprises first actuator assembly 1752 and second actuator assembly 1754. In some cases, first actuator assembly 1752 includes first portion 1761, second portion 1762 and third portion 1763. First portion 1761 may be connected to first actuating device 1771. Additionally, second portion 1762 may extend from first portion 1761 to first moveable portion 1720. Likewise, third portion 1763 may extend from second portion 1762 to second moveable portion 1722. In some cases, second portion 1762 and third portion 1763 may also pivot with respect to first portion 1761 at pivot joint 1767. With this arrangement, as first portion 1761 is moved in a vertical direction, second portion 1762 and third portion 1763 apply forces to first moveable portion 1720 and second moveable portion 1722. In particular, as first portion 1761 is moved in an upwards direction, second portion 1762 and third portion 1763 rotate away from one another and push first moveable portion 1720 and second moveable portion 1722 apart, as seen in FIG. 17. Likewise, as first portion 1761 is pulled in a downwards direction, second portion 1762 and third portion 1763 rotate towards each other and pull first moveable portion 1720 and second moveable portion 1722 together, as seen in FIG. 18.

In an exemplary embodiment, the movement of first portion 1761 is controlled by first actuating device 1771. In different embodiments, first actuating device 1771 can be any type of actuating device. In some cases, first actuating device 1771 can be a pneumatic actuator. Examples of pneumatic actuating devices include, but are not limited to, rotary actuators, tie rod actuators, grippers, rodless actuators with mechanical linkage, rodless actuators with magnetic linkage, as well as any other type of pneumatic actuator. In still other cases, first actuating device 1771 could be another type of actuating device, including but not limited to electric actuators, motors, hydraulic cylinders, linear actuators or any other type of actuator.

In some embodiments, second actuator assembly 1754 may be configured to facilitate opening and closing of first moveable portion 1720 and second moveable portion 1722 in a similar manner to first actuator assembly 1752. Using two actuator assemblies on opposing ends of graphic transfer assembly 1700 can facilitate the opening and closing of first moveable portion 1722 and second moveable portion 1724.

It should be further understood that although the current embodiment employs an actuation system for opening and closing a graphic transfer assembly, in other embodiments different types of systems could be used. For example, in one embodiment, a first moveable portion and a second moveable portion of a graphic transfer assembly could be manually opened and closed by lifting and lowering the moveable portions between an open and closed position. In another example, a motor could be attached to one or more pivot portions of the moveable portions to control the motion of the moveable portions.

Figure 19:
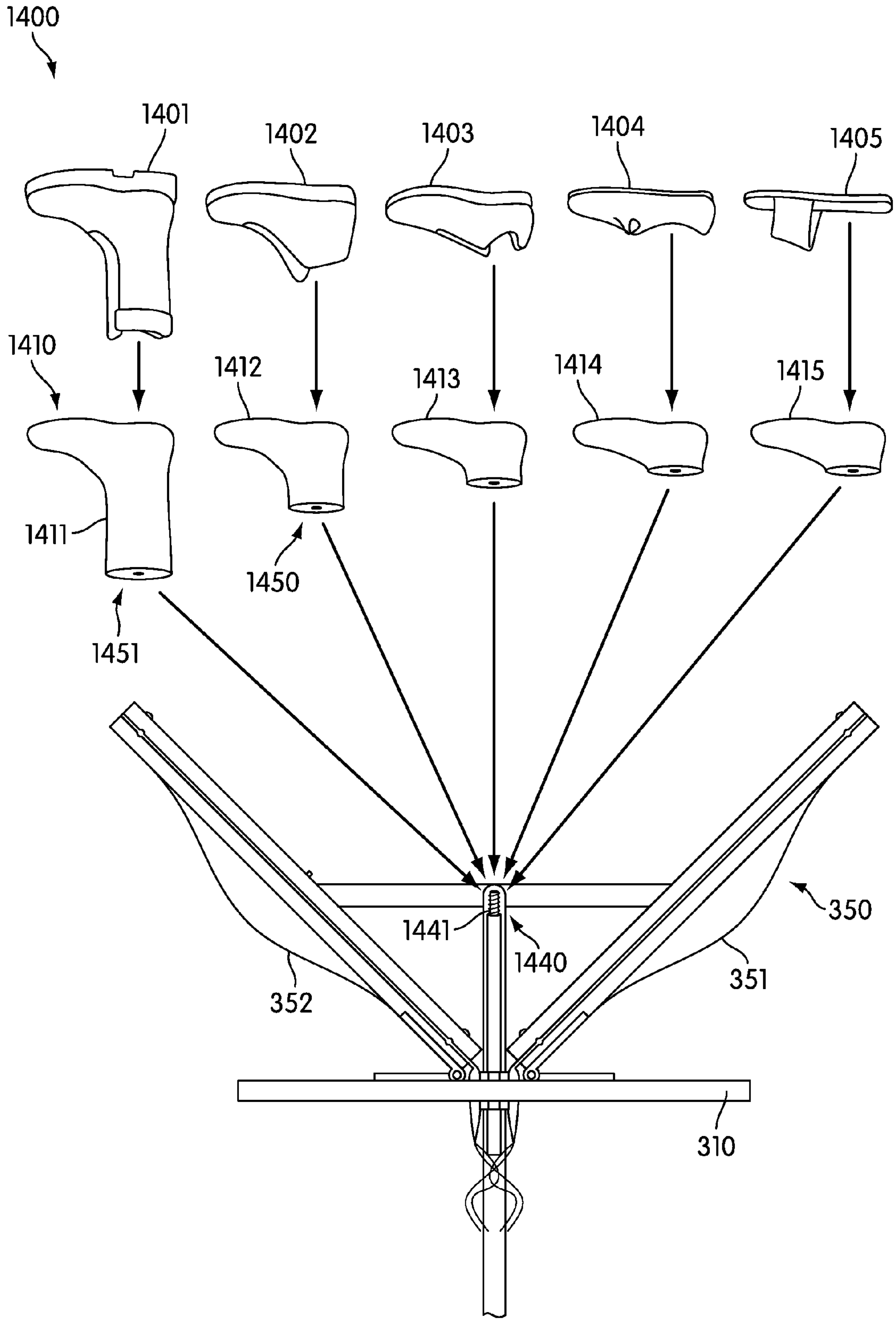
FIG. 19 is a schematic view of an embodiment of a set of articles that may be associated with a set of lasts and attached to a last assembly of a graphic transfer assembly.

In other embodiments, graphics may be applied to a set of different types of articles by graphic transfer assembly 350. FIG. 19 illustrates an exemplary embodiment of set of articles 1400 that may be associated with graphics that may be applied by graphic transfer assembly 350. In one embodiment, set of articles 1400 includes first article 1401, second article 1402, third article 1403, fourth article 1404 and fifth article 1405. Set of articles 1400 may include at least two different types of articles. For example, first article 1401 is a boot. Second article 1402 is a basketball shoe. Likewise, third article 1403 is a running shoe. In addition, fourth article 1404 is a ballet slipper. Finally, fifth article 1405 is a sandal. With this configuration, set of articles 1400 includes at least two different types of articles.

In some embodiments, articles of set of articles 1400 may comprise different materials. Examples of different materials include, but are not limited to: fabric, plastic, leather as well as other types of materials suitable for articles. Graphic transfer assembly 350 may be configured to apply graphics to articles comprising different types of materials. In particular, first deformable membrane 351 and second deformable membrane 352 may be configured to apply graphics to different types of materials comprising articles.

In some embodiments, set of articles 1400 may be associated with a set of lasts. In one embodiment, set of lasts 1410 includes first last 1411, second last 1412, third last 1413, fourth last 1414 and fifth last 1415. Set of lasts 1410 may be associated with set of articles 1400 according to the size and shape of articles of set of articles 1400. For example, first last 1411 may be associated with first article 1401. Also, second last 1412 may be associated with second article 1402. Similarly, third last 1413 may be associated with third article 1403. Likewise, fourth last 1414 may be associated with fourth article 1404. Finally, fifth last 1415 may be associated with fifth article 1405.

A graphic transfer assembly may include provisions to facilitate the application of graphics to different types of articles. In some embodiments, a graphic transfer assembly may include a last assembly to facilitate the application of graphics to different types of articles. In some cases, the last assembly may include a fastener configured to attach a set of lasts to a graphic transfer assembly. Examples of fasteners that may comprise a last assembly include, but are not limited to: a bolt, screw or other type of fastener known in the art. With this arrangement, a last assembly may provide interchangeability for a graphic transfer assembly by allowing different lasts associated with different articles to be attached to the graphic transfer assembly.

In an exemplary embodiment, graphic transfer assembly 350 includes last assembly 1440. Last assembly 1440 is configured to attach a last to base portion 310 of graphic transfer assembly 350. In particular, last assembly 1440 includes fastener 1441. In some cases, fastener 1441 may be inserted within a portion of a last in order to attach the last to last assembly 1440. With this arrangement, last assembly 1440 provides interchangeability for graphic transfer assembly 350 by allowing different lasts associated with different articles to be attached to graphic transfer assembly 350.

In one embodiment, lasts of set of lasts 1410 are configured with fastener receiver holes 1450. Fastener receiver holes 1450 are configured to receive fastener 1441 of last assembly 1440. For example, first last 1411 includes first fastener receiver hole 1451. By inserting fastener 1441 into first fastener receiver hole 1451, first last 1411 and associated first article 1401 may be associated with last assembly 1440. After first article 1401 is associated with last assembly 1440, a graphic may be applied to first article 1401 in a substantially similar manner as discussed with respect to FIGS. 4-9. In addition, it should be understood that the remaining articles of set of articles 1400 may be associated with lasts of set of lasts 1410 and attached to last assembly 1440 in a similar manner. With this configuration, graphic transfer assembly 350 may transfer graphics to curved portions of articles of set of articles 1400.

Figure 20:
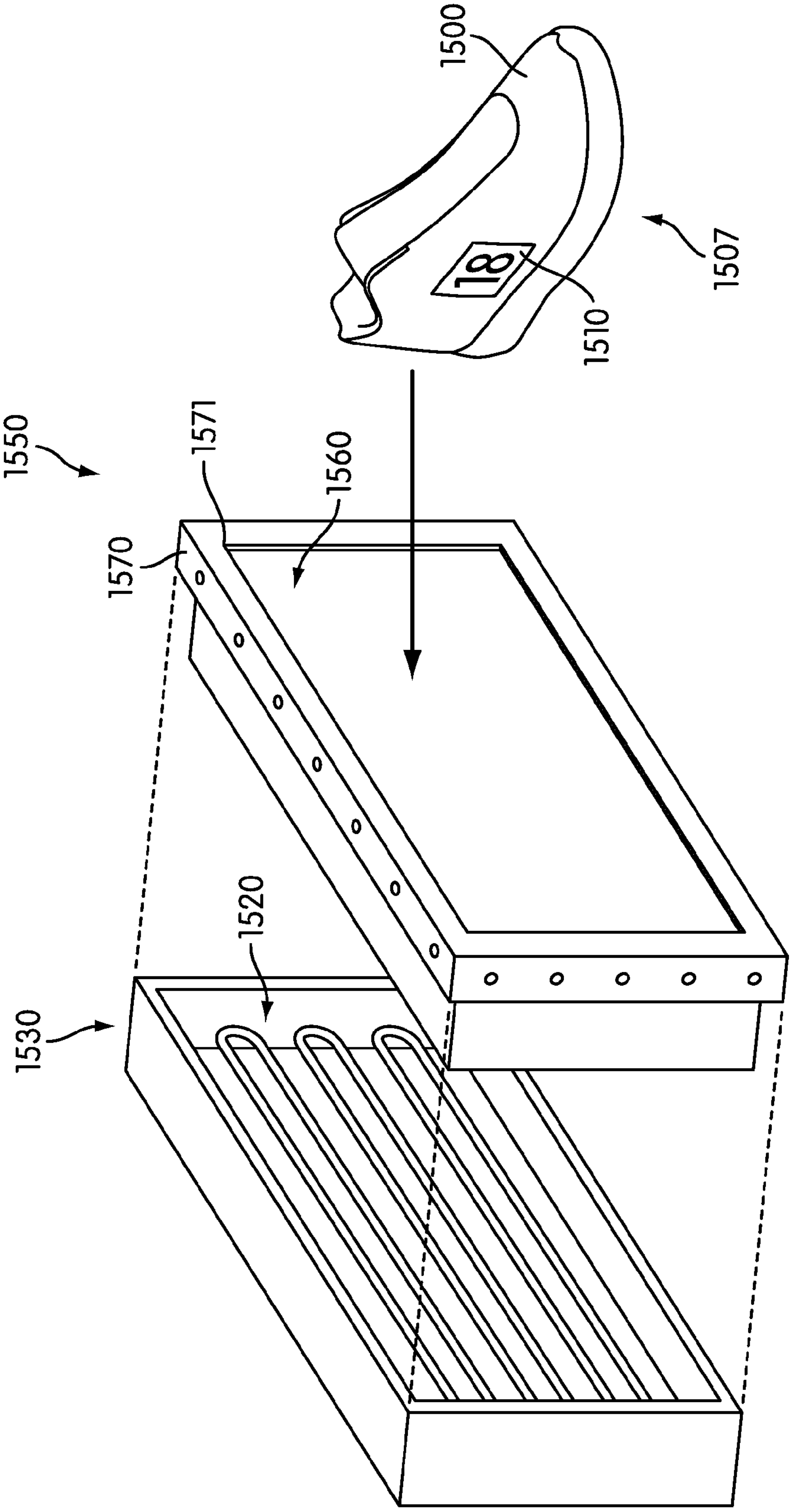
FIG. 20 is an exploded view of an exemplary embodiment of a graphic transfer assembly that may apply a graphic to a curved portion of an article.

FIG. 20 illustrates an exploded view of an exemplary embodiment of graphic transfer assembly 1550. Graphic transfer assembly 1550 includes deformable membrane 1560. In one embodiment, deformable membrane 1560 comprises a high temperature rubber. This configuration allows deformable membrane 1560 to conform to a portion of an article pressed against deformable membrane 1560.

A graphic transfer assembly may include provisions for using heating elements to transfer a graphic to a curved portion of an article. In some embodiments, heating elements may transfer heat to a deformable membrane in order to apply a graphic to a curved portion of an article. In some cases, heating elements may be filled with oil, water or other substances to transfer heat to a deformable membrane. In one embodiment, oil heating elements may be used to apply heat to a deformable membrane and transfer a graphic to a curved portion of an article.

In an exemplary embodiment, graphic transfer assembly 1550 includes heating elements 1520. Heating elements 1520 are oil heating elements. In other embodiments, heating elements 1520 may be another type of heating elements. Heating elements 1520 are configured to generate heat that may be transferred to deformable membrane 1560. In some cases, a portion of heating elements 1520 may be covered by housing portion 1530 of graphic transfer assembly 1550. This arrangement may help conserve heat generated by heating elements 1520.

As previously discussed, a graphic transfer assembly may include provisions to assist a deformable membrane in conforming to a curved portion of an article. In an exemplary embodiment, graphic transfer assembly 1550 includes chamber 1570. In some cases, chamber 1570 may be a diathermic oil plenum. In particular, chamber 1570 may be filled with an oil that provides heat conduction between a deformable membrane and one or more heating elements. Chamber 1570 may be disposed adjacent to deformable membrane 1560. In some cases, chamber 1570 may include cut out portion 1571. An outer periphery of deformable membrane 1560 may be attached to cut out portion 1571. With this arrangement, chamber 1570 may provide pressure against deformable membrane 1560 to help deformable membrane 1560 conform to a portion of an article.

In some embodiments, a provision that assists a deformable membrane in conforming to a curved portion of an article may also assist in transferring heat to the deformable membrane. For example, chamber 1570 may facilitate efficient heat transfer from heating elements 1520 to deformable membrane 1560 to aid in the transferring of a graphic to an article. In one embodiment, this may be achieved by attaching chamber 1570 to housing portion 1530. With heating elements 1520 disposed adjacent to chamber 1570, chamber 1570 may transfer heat from heating elements 1520 to deformable membrane 1560. Using this configuration, graphic transfer assembly 1550 may transfer a graphic to a portion of an article.

Figure 21:
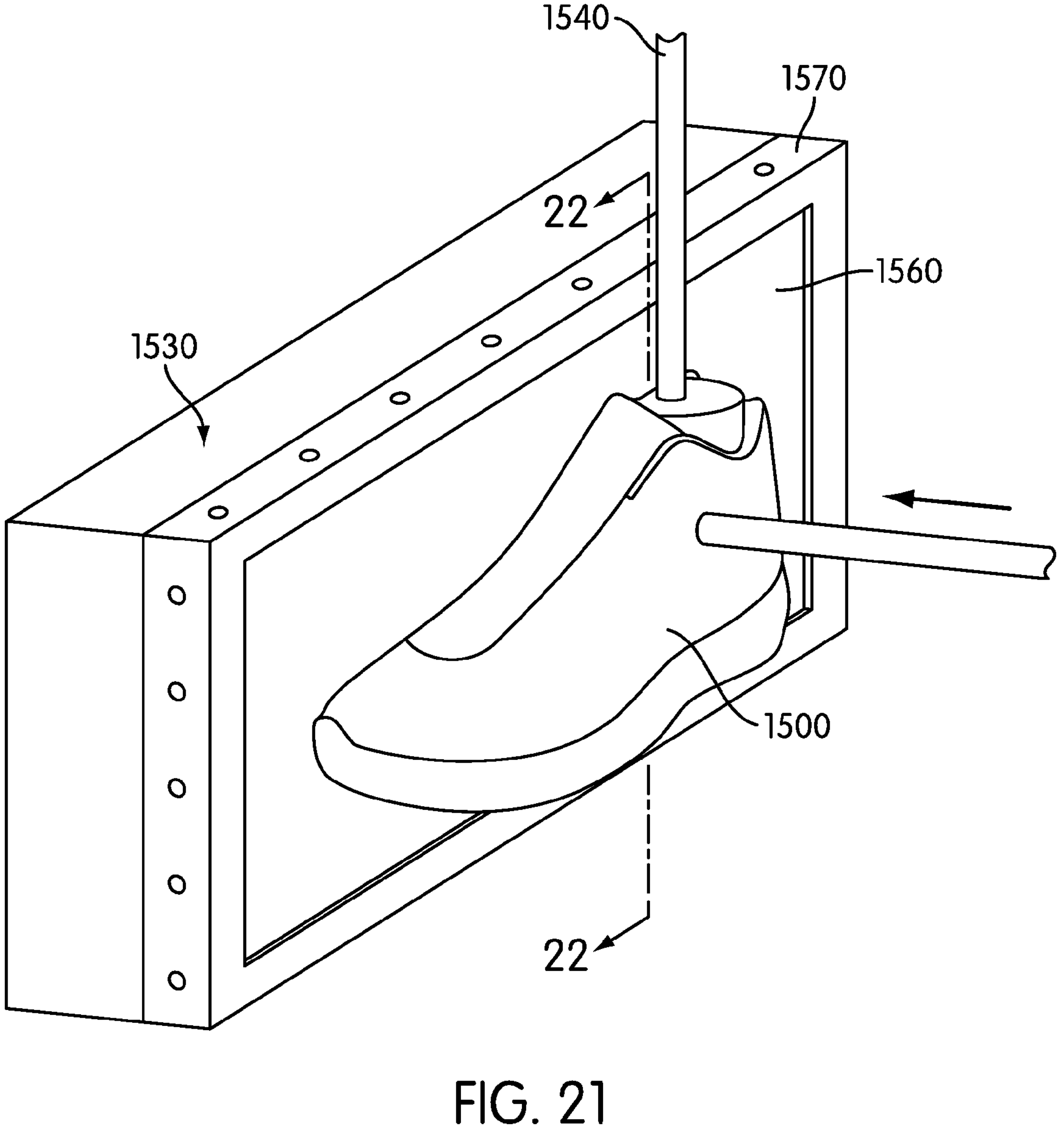
FIG. 21 is a schematic view of an embodiment of a graphic transfer assembly applying a graphic to an article.
Figure 22:
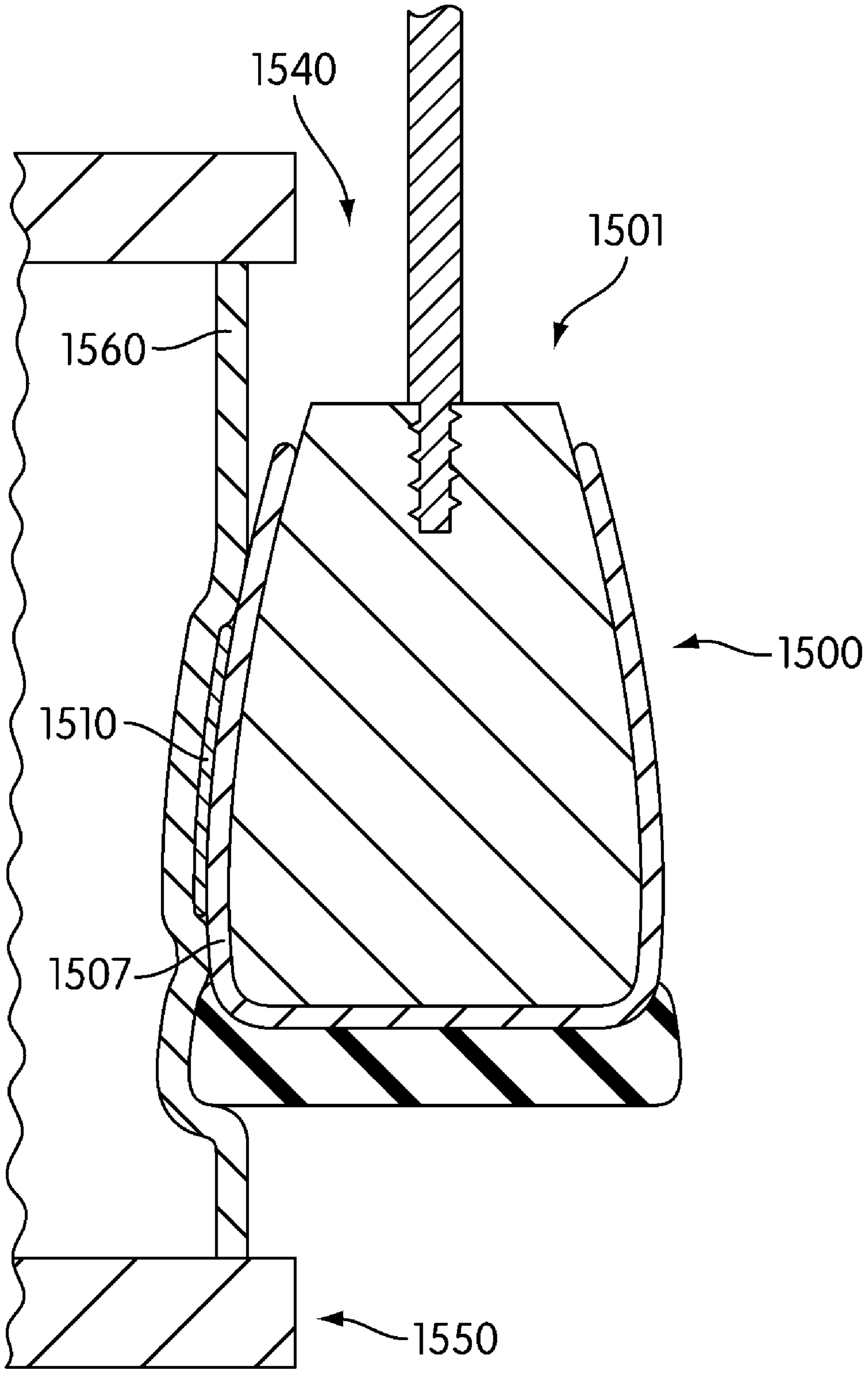
FIG. 22 is a cross sectional view of an embodiment of a graphic transfer assembly applying a graphic to a curved portion of an article.

In one embodiment, graphic transfer assembly 1550 may apply graphic 1510 to article 1500. Graphic 1510 may be associated with lateral portion 1507 of article 1500. Prior to application of graphic 1510 to lateral portion 1507, article 1500 may be associated with a last. Referring to FIGS. 21 and 22, article 1500 may be associated with last 1501. In addition, last 1501 may be attached to last assembly 1540. In particular, last 1501 may be attached to last assembly 1540 so that lateral portion 1507 is disposed adjacent to deformable membrane 1560.

Graphic transfer assembly 1550 may press article 1500 against deformable membrane 1560. As previously discussed, this may be achieved in various manners. In an exemplary embodiment, last assembly 1540 may move to push lateral portion 1507 of article 1500 against deformable membrane 1560. With lateral portion 1507 pressed against deformable membrane 1560, deformable membrane 1560 conforms to curved portions of lateral portion 1507, as illustrated in FIG. 22. Through the application of heat to graphic 1510 and lateral portion 1507, graphic transfer assembly 1550 may transfer graphic 1510 to lateral portion 1507 of article 1500.

In embodiments where multiple graphics may be applied to different portions of an article, a graphic transfer assembly may be configured to apply graphics to different portions of the article in a substantially simultaneous manner. In some embodiments, a graphic transfer assembly may be configured with one or more deformable membranes to apply graphics to different portions of an article. For example, in a previous embodiment, graphic transfer assembly 350 could apply graphics to different portions of an article. In other embodiments, a graphic transfer assembly may be configured with more than one graphic transfer assembly to apply graphics to different portions of an article.

Figure 23:
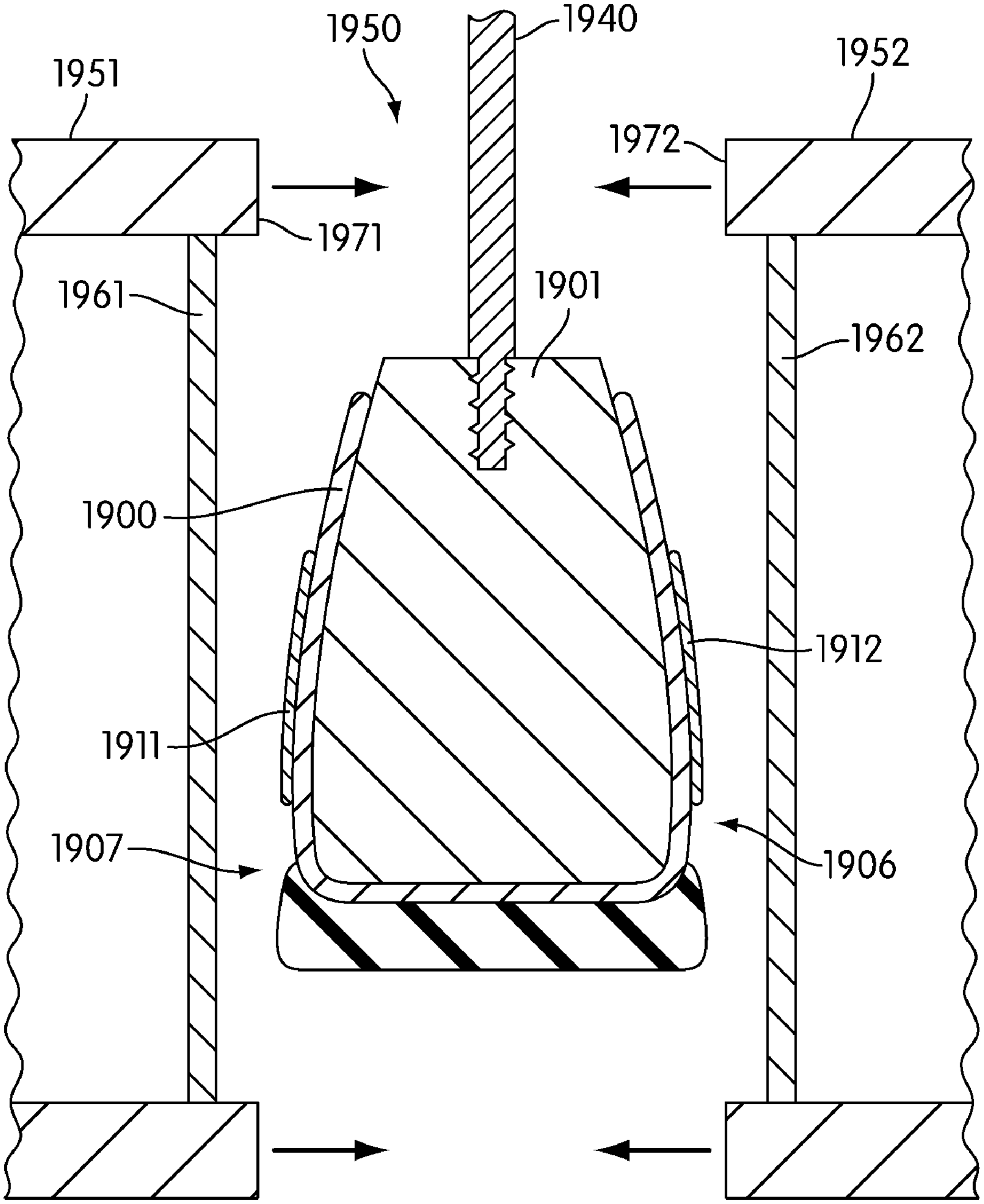
FIG. 23 is a cross sectional view of an exemplary embodiment of a graphic transfer assembly configured to apply two graphics to two curved portions of an article.
Figure 24:
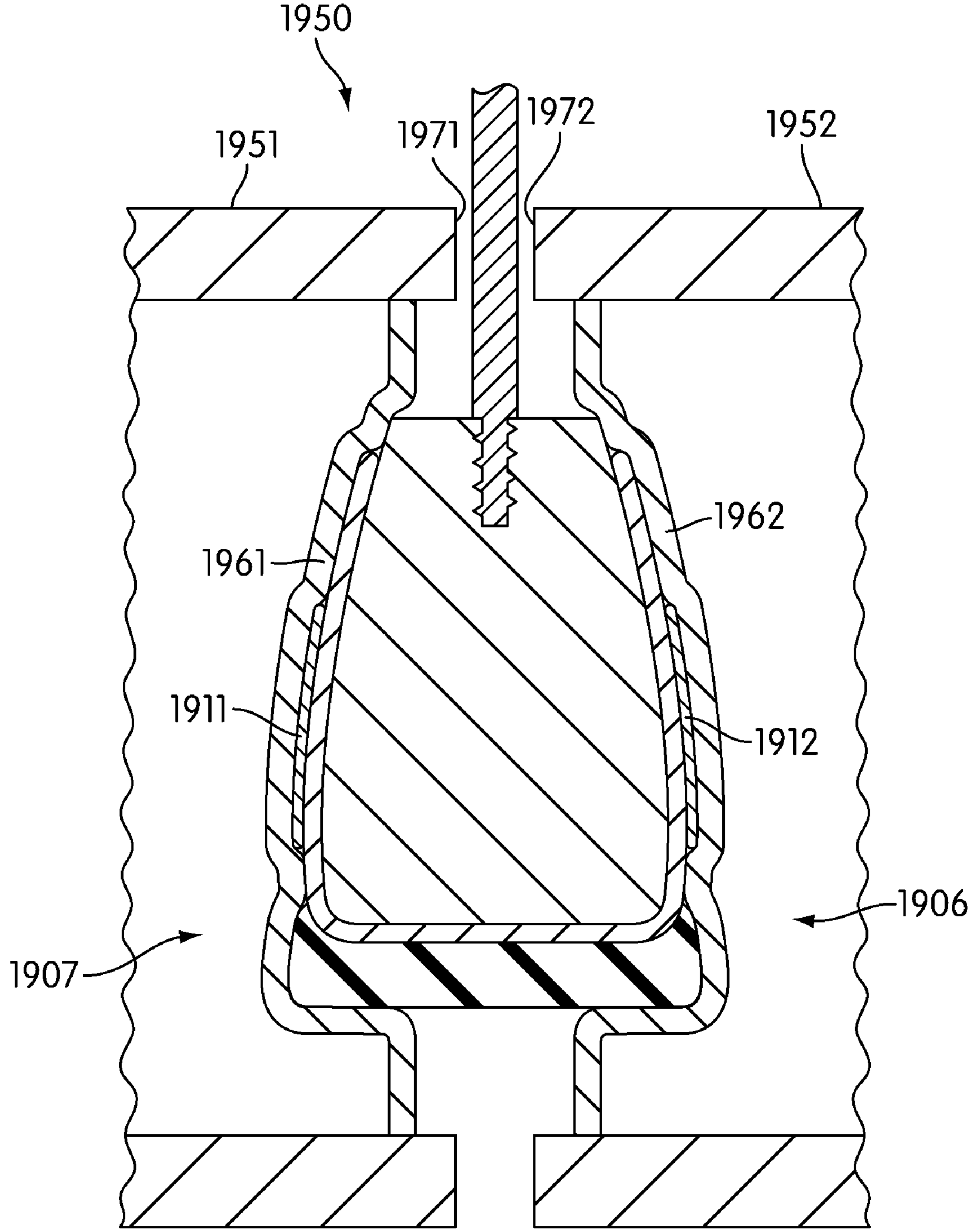
FIG. 24 is a cross sectional view of an exemplary embodiment of a graphic transfer assembly applying two graphics to two curved portions of an article.

Referring to FIGS. 23 and 24, graphic transfer assembly 1950 includes first graphic transfer assembly 1951 and second graphic transfer assembly 1952. In one embodiment, first graphic transfer assembly 1951 and second graphic transfer assembly 1952 are configured in a substantially similar manner. In some cases, first graphic transfer assembly 1951 and second graphic transfer assembly 1952 may be configured in a substantially similar manner as graphic transfer assembly 1550 of the previous embodiment.

In particular, first graphic transfer assembly 1951 includes first deformable membrane 1961. Furthermore, first graphic transfer assembly 1951 includes first chamber 1971 disposed adjacent to and surrounding first deformable membrane 1961. In addition, first graphic transfer assembly 1951 includes heating elements, not illustrated for purposes of clarity.

In a similar manner, second graphic transfer assembly 1952 includes second deformable membrane 1962. Also, second graphic transfer assembly 1951 includes second chamber 1972 disposed adjacent to and surrounding second deformable membrane 1962. In addition, second graphic transfer assembly 1952 includes heating elements, not illustrated for purposes of clarity.

In an exemplary embodiment, graphic transfer assembly 1950 applies first graphic 1911 and second graphic 1912 to article 1900. In particular, first graphic transfer assembly 1951 may apply first graphic 1911 to lateral portion 1907 of article 1900. Likewise, second graphic transfer assembly 1952 may apply second graphic 1912 to medial portion 1906 of article 1900. Medial portion 1906 and lateral portion 1907 are configured with curved portions that conform to a contour of a foot inserted within article 1900. With this arrangement, first graphic 1911 and second graphic 1912 may be associated with curved portions of article 1900.

Prior to the application of first graphic 1911 and second graphic 1912, last 1901 may be inserted within article 1900. Furthermore, last 1901 may be attached to last assembly 1940. With this arrangement, article 1900 may be disposed between first graphic transfer assembly 1951 and second graphic transfer assembly 1952. In particular, first graphic transfer assembly 1951 may be disposed adjacent to lateral portion 1907 of article 1900. Likewise, second graphic transfer assembly 1952 may be disposed adjacent to medial portion 1906 of article 1900.

Referring to FIG. 23, first graphic transfer assembly 1951 and second graphic transfer assembly 1952 may be pressed against lateral portion 1907 and medial portion 1906, respectively, of article 1900. By pressing first graphic transfer assembly 1951 and second graphic transfer assembly 1952 against article 1900, first deformable membrane 1961 and second deformable membrane 1962 may be pressed against article 1900. With this arrangement, first deformable membrane 1961 may conform to lateral portion 1907, as illustrated in FIG. 24. Similarly, second deformable membrane 1962 may conform to medial portion 1906. Furthermore, first deformable membrane 1961 and second deformable membrane 1962 may conform to a substantial entirety of article 1900. Using this configuration, graphic transfer assembly 1950 may transfer first graphic 1911 and second graphic 1912 to curved portions of article 1900 in a substantially simultaneous manner.

In embodiments where a vacuum may not be used with a graphic transfer assembly, the graphic transfer assembly may include additional provisions to conform a deformable membrane to curved portions of an article. In some embodiments, the graphic transfer assembly may be used with a pressure sensitive medium that conforms to the curvature of the article and helps a deformable membrane conform to the contours of the article. In one exemplary embodiment, a deformable membrane may be disposed between an outer portion of a graphic transfer assembly and an inner portion of the graphic transfer assembly that are configured to conform to the surface of an article when the graphic transfer assembly applies one or more graphics to the article.

Figure 25:
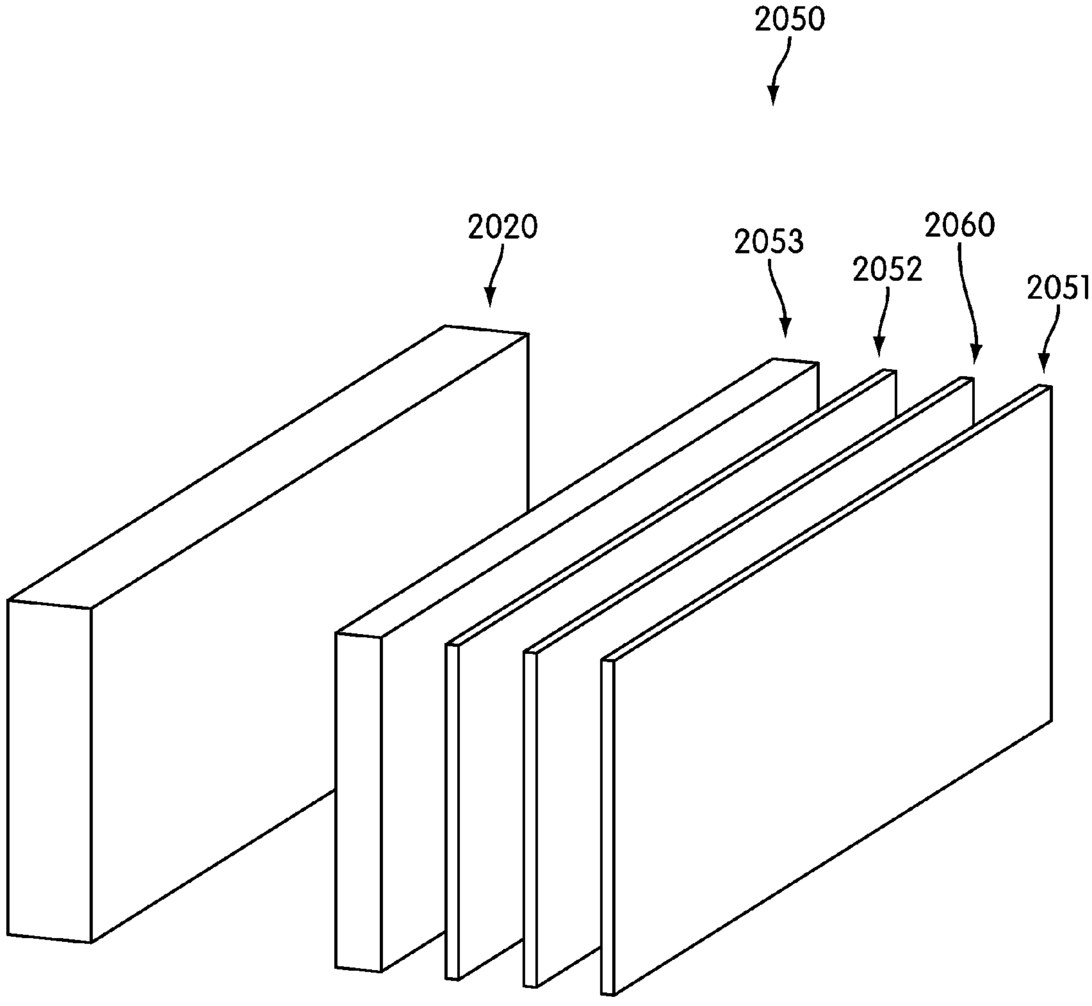
FIG. 25 is an exploded view of an exemplary embodiment of a graphic transfer assembly configured to deter attachment of a graphic to a deformable membrane.

FIG. 25 illustrates an exploded view of an exemplary embodiment of graphic transfer assembly 2050. In an exemplary embodiment, graphic transfer assembly 2050 includes deformable membrane 2060. In addition, graphic transfer assembly includes outer portion 2051. Outer portion 2051 may be disposed between deformable membrane 2060 and an article when a graphic is applied to the article.

Outer portion 2051 may be configured with various sizes and shapes, including, but not limited to: square shapes, rectangular shapes, elliptical shapes, triangular shapes, regular shapes, irregular shapes as well as other types of shapes. In some embodiments, outer portion 2051 may be configured with a substantially similar size and shape as deformable membrane 2060. In one embodiment, outer portion 2051 and deformable membrane 2060 may comprise rectangular shapes.

In some embodiments, a graphic transfer assembly may include provisions to improve heat transfer to a portion of an article. For example, in embodiments where a deformable membrane applies heat to a portion of an article, an insulating portion may be disposed adjacent to the deformable membrane in order to improve heat transfer to a portion of an article. In one embodiment, graphic transfer assembly 2050 includes insulating portion 2052. In some cases, insulating portion 2052 may be disposed adjacent to deformable membrane 2060. With this arrangement, insulating portion 2052 may improve the efficiency of heat transfer to an article.

Generally, insulating portion 2052 may be configured with any size and shape. Examples of shapes include, but are not limited to: square shapes, rectangular shapes, elliptical shapes, triangular shapes, regular shapes, irregular shapes as well as other types of shapes. In some cases, insulating portion 2052 may be configured with substantially similar size and shape as deformable membrane 2060. In an exemplary embodiment, insulating portion 2052 may be configured with a rectangular shape.

In some embodiments, graphic transfer assembly 2050 may include additional provisions to assist a deformable membrane in conforming to a curved portion of an article. In some cases, graphic transfer assembly 2050 may include inner portion 2053. Inner portion 2053 may provide additional pressure against deformable membrane 2060 when an article is pressed against outer portion 2051 and deformable membrane 2060. With this arrangement, inner portion 2053 may assist deformable membrane 2060 in conforming to a curved portion of an article.

In different embodiments, outer portion 2051 and inner portion 2053 may comprise various suitable materials. In some cases, materials suitable for outer portion 2051 and inner portion 2053 may have high temperature stability and thermo conductivity so that outer portion 2051 may transfer heat to apply a graphic to an article. Furthermore, outer portion 2051 and inner portion 2053 may also be constructed of a resilient material that may conform to a curved portion of an article. Examples of suitable materials for outer portion 2051 and inner portion 2053 include, but are not limited to: silicone, plastics, other polymers as well as other materials known in the art. In one embodiment, outer portion 2051 may be constructed of duro silicone. In addition, third portion 2053 may be constructed of silicone.

Generally, various materials may be used for insulating portion 2052. Examples of suitable materials include, but are not limited to: synthetic polymers, cotton, other natural plant materials, wool, other animal fibers, fiber-glass, other mineral wools as well as other materials. In an exemplary embodiment, insulating portion 2052 may comprise a synthetic polymer.

In different embodiments, graphic transfer assembly 2050 may be controlled in various manners. In some embodiments, an article may be pressed against outer portion 2051 to apply a graphic to the article. In other embodiments, graphic transfer assembly 2050 may include an actuator that may push portions of graphic transfer assembly 2050 against an article to apply a graphic to the article.

In an exemplary embodiment, graphic transfer assembly 2050 includes actuator 2020. Actuator 2020 may be disposed adjacent to inner portion 2053. Actuator 2020 may be configured to push inner portion 2053, insulating portion 2052, deformable membrane 2060 and outer portion 2051 against an article to apply a graphic to the article.

Figure 26:
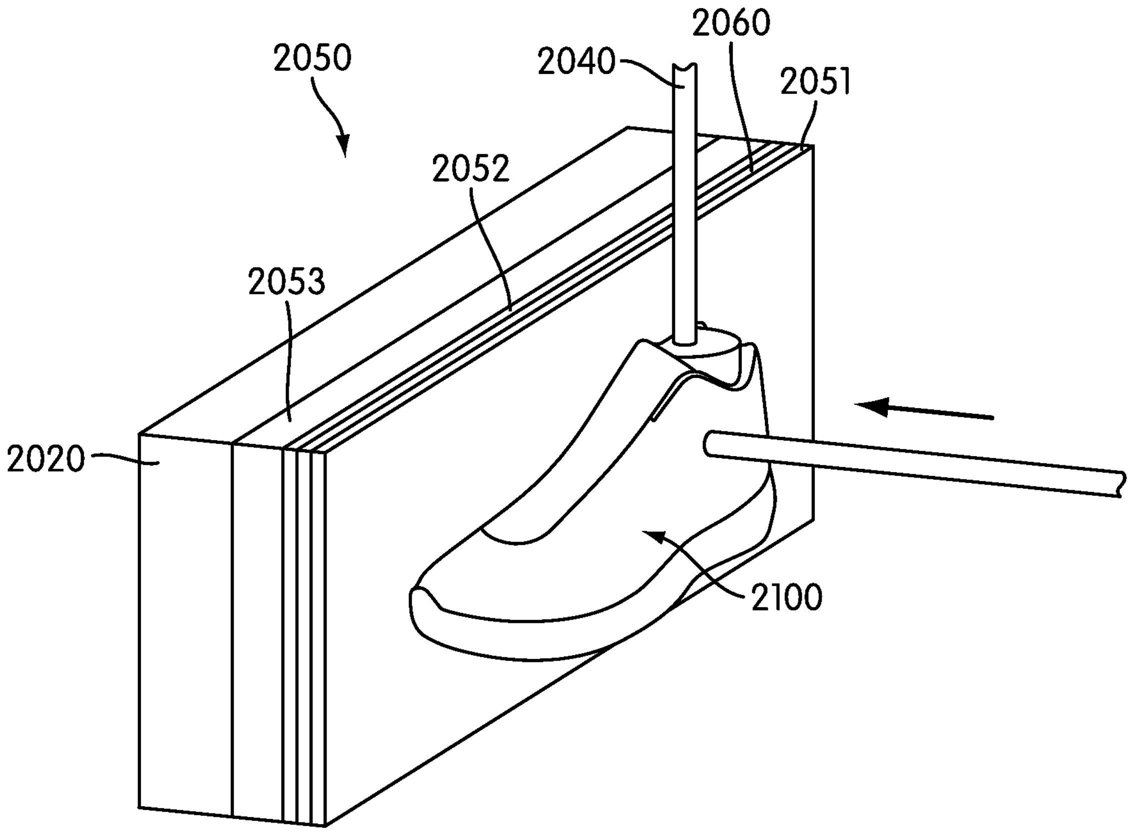
FIG. 26 is a schematic view of an embodiment of a graphic transfer assembly applying a graphic to a curved portion of an article.
Figure 27:
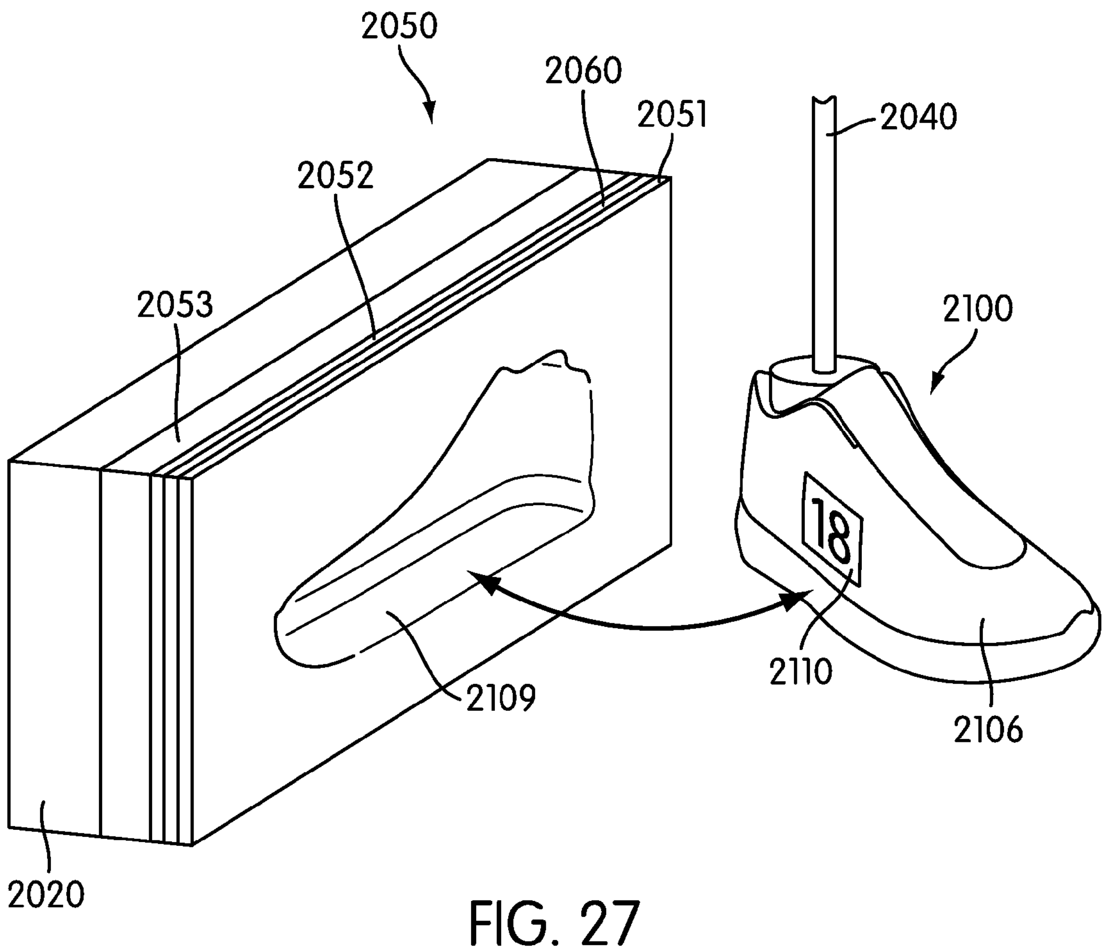
FIG. 27 is a schematic view of an embodiment of a graphic transfer assembly following the application of a graphic to an article.

FIGS. 26 and 27 illustrate an exemplary embodiment of graphic transfer assembly 2050 applying graphic 2110 to lateral portion 2106 of article 2100. Lateral portion 2106 includes curved portions configured to follow a contour of a medial portion of a foot disposed within lateral portion 2106. In other words, graphic 2110 may be associated with a curved portion of article 2100.

In one embodiment, article 2100 may be associated with a last. Furthermore, article 2100 and associated last may be attached to last assembly 2040. In particular, article 2100 may be attached to last assembly 2040 so that lateral portion 2106 is disposed adjacent to outer portion 2051.

Following the association of article 2100 with last assembly 2040, actuator 2020 may push inner portion 2053, insulating portion 2052, deformable membrane 2060 and outer portion 2051 against lateral portion 2106 of article 2100. This configuration allows inner portion 2053, insulating portion 2052, deformable membrane 2060 and outer portion 2051 to conform to lateral portion 2106 of article 2100. By conforming to lateral portion 2106, outer portion 2051 may transfer heat from deformable membrane 2060 to apply graphic 2110 to article 2100.

After graphic 2110 is applied to article 2100, actuator 2020 may pull inner portion 2053, insulating portion 2052, deformable membrane 2060 and outer portion 2051 away from article 2100. Article 2100 may be removed from the last. With this arrangement, graphic transfer assembly 2050 may apply graphic 2110 to article 2100.

In some cases, indentation 2109 may be evident in outer portion 2051 following the removal of article 2100 from outer portion 2051. Indentation 2109 in outer portion 2051 may indicate the conformation of outer portion 2051 as well as other portions of graphic transfer assembly 2050 to article 2100. Indentation 2109 may remain for a time following the removal of article 2100.

Figure 28:
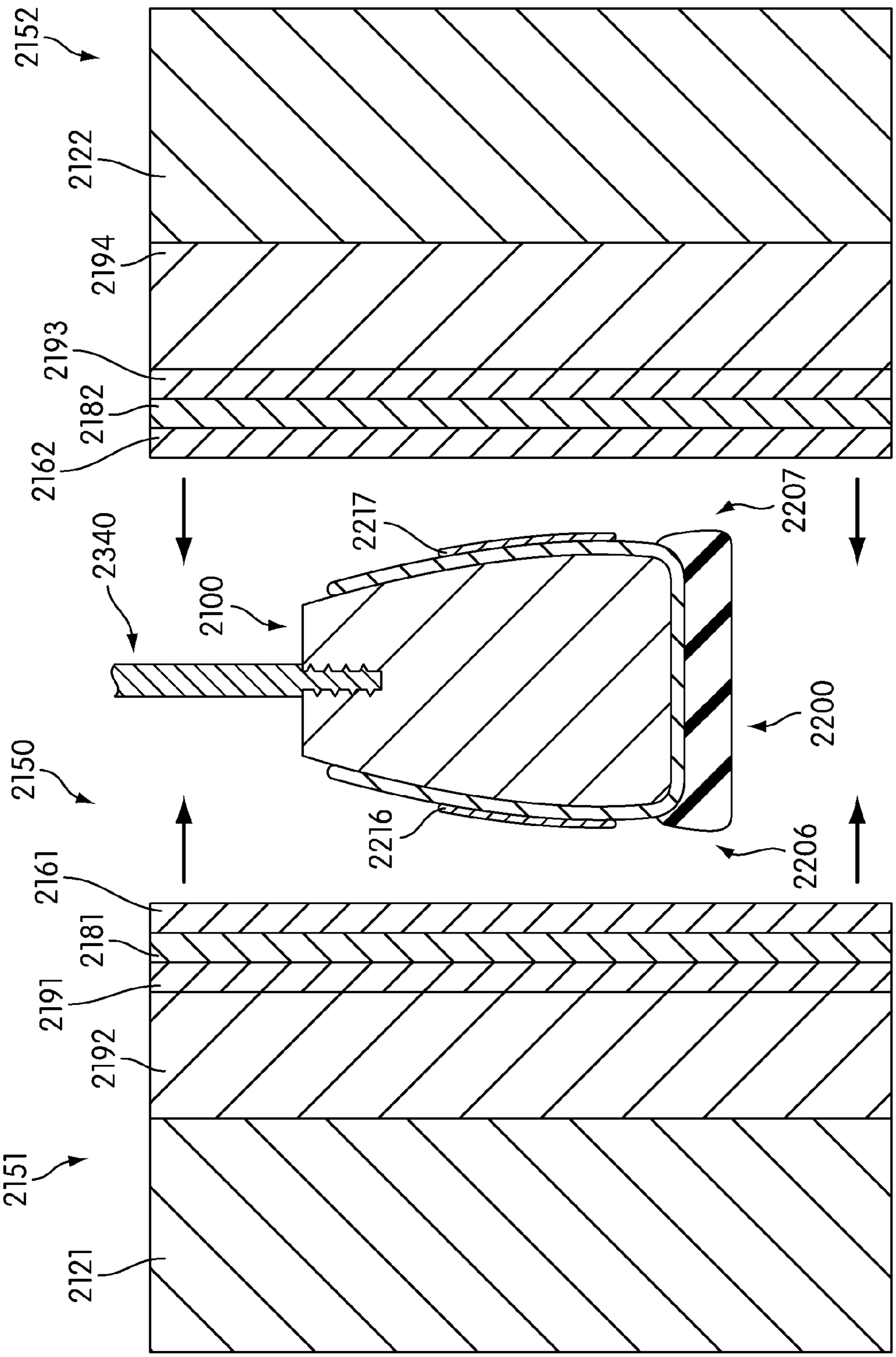
FIG. 28 is a cross sectional view of an embodiment of a graphic transfer assembly configured to apply two graphics to two curved portions of an article.
Figure 29:
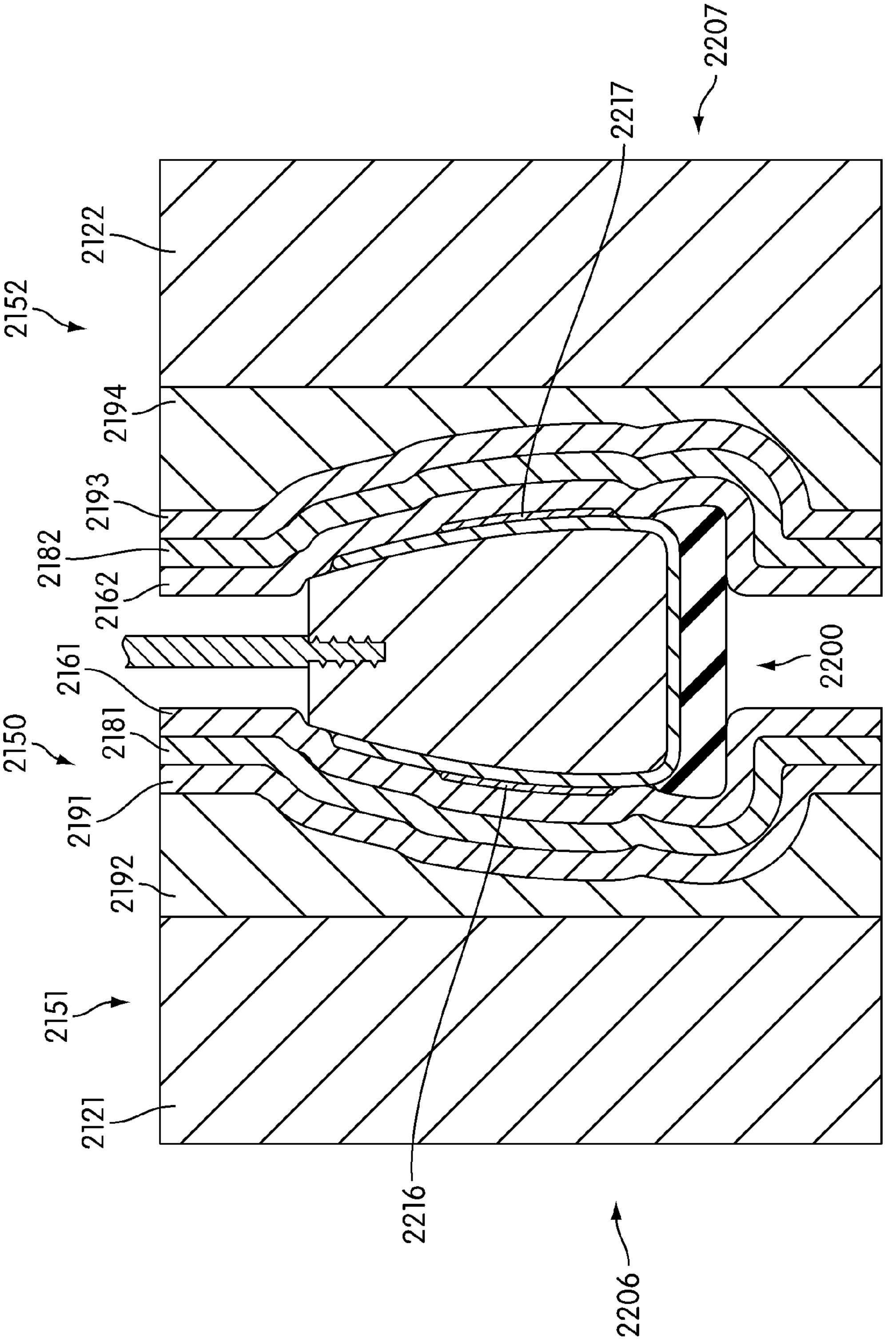
FIG. 29 is a cross sectional view of an embodiment of a graphic transfer assembly applying two graphics to two curved portions of an article.

As previously discussed, a graphic transfer assembly may be configured with more than one graphic transfer assembly to apply graphics to different portions of an article in a substantially simultaneous manner. Referring to FIGS. 28 and 29, graphic transfer assembly 2150 includes first graphic transfer assembly 2151 and second graphic transfer assembly 2152.

In an exemplary embodiment, first graphic transfer assembly 2151 and second graphic transfer assembly 2152 are configured in a substantially similar manner. In some cases, first graphic transfer assembly 2151 and second graphic transfer assembly 2152 may be configured in a substantially similar manner as graphic transfer assembly 2050 of the previous embodiment. For example, first graphic transfer assembly 2151 includes first outer portion 2161 disposed adjacent to first deformable membrane 2181. Also, first graphic transfer assembly 2151 includes first insulating portion 2191 disposed adjacent to first deformable membrane 2181. Additionally, first graphic transfer assembly 2151 includes first inner portion 2192 disposed between first insulating portion 2191 and first actuator 2121.

In a similar manner, second graphic transfer assembly 2152 includes second outer portion 2162 disposed between second deformable membrane 2182 and an article. In addition, second graphic transfer assembly 2152 includes second insulating portion 2193 disposed adjacent to second deformable membrane 2182. Also, second graphic transfer assembly 2152 includes second inner portion 2194 disposed between second insulating portion 2193 and second actuator 2122.

In an exemplary embodiment, graphic transfer assembly 2150 applies first graphic 2216 and second graphic 2217 to article 2200. In particular, first graphic transfer assembly 2151 may apply first graphic 2216 to medial portion 2206 of article 2200. In addition, second graphic transfer assembly 2152 may apply second graphic 2217 to lateral portion 2207 of article 2200.

Before applying first graphic 2216 and second graphic 2217, a last may be inserted within article 2200. Furthermore, the last may be attached to last assembly 2340. With this arrangement, article 2200 may be disposed between first graphic transfer assembly 2151 and second graphic transfer assembly 2152. In particular, first graphic transfer assembly 2151 may be disposed adjacent to medial portion 2206. Likewise, second graphic transfer assembly 2152 may be disposed adjacent to lateral portion 2207.

Referring to FIG. 28, first actuator 2121 may press first inner portion 2192, first insulating portion 2191, first deformable membrane 2181 and first outer portion 2161 against medial portion 2206 of article 2200. Similarly, second actuator 2122 may press second inner portion 2194, second insulating portion 2193, second deformable membrane 2182 and second outer portion 2162 against lateral portion 2207 of article 2200. With this arrangement, first inner portion 2192, first insulating portion 2191, first deformable membrane 2181 and first outer portion 2161 may conform to medial portion 2206, as illustrated in FIG. 29. Similarly, second inner portion 2194, second insulating portion 2193, second deformable membrane 2182 and second outer portion 2162 may conform to lateral portion 2207. Using this configuration, graphic transfer assembly 2150 may transfer first graphic 2216 and second graphic 2217 to article 2200.

In different embodiments, any layer of graphic transfer assembly 2150 can be used to provide heat to one or more graphics. In some cases, first outer portion 2161 and second outer portion 2162 can be heated directly by a thermal source. In other cases, first deformable membrane 2181 and second deformable membrane 2182 can be heated directly by a thermal source. In still other cases, first insulating portion 2191 and second insulating portion 2192 can be heated directly by a thermal source. In still other embodiments, other portions of graphic transfer assembly 2150 can be heated. In an exemplary embodiment, first outer portion 2161 and second outer portion 2162 may be heated layers. Furthermore, these layers can be heated using any known method in the art. For example, in some cases, the layers can be heated using wires or other conductors configured to produce heat. These heated wires can be disposed on the surface of a layer, or embedded within a layer.

With this method, a graphic transfer assembly may apply graphics to curved portions of various articles. In particular, a last assembly provides interchangeability by allowing various types of articles to be attached to the graphic transfer assembly. In addition, a deformable membrane associated with the graphic transfer assembly may be adapted to conform to curved portions of various articles. With this configuration, graphics may be applied to articles without a molding process. This allows graphics to be applied to post-production articles.

A graphic transfer assembly can include provisions for protecting a sole or tooling of an article of footwear. In some cases, heating during the transfer process can contribute to degradation or deformation of a sole of an article. In an exemplary embodiment, a protective member can be used to cover the sole to prevent unwanted heating of the sole.

Figure 30:
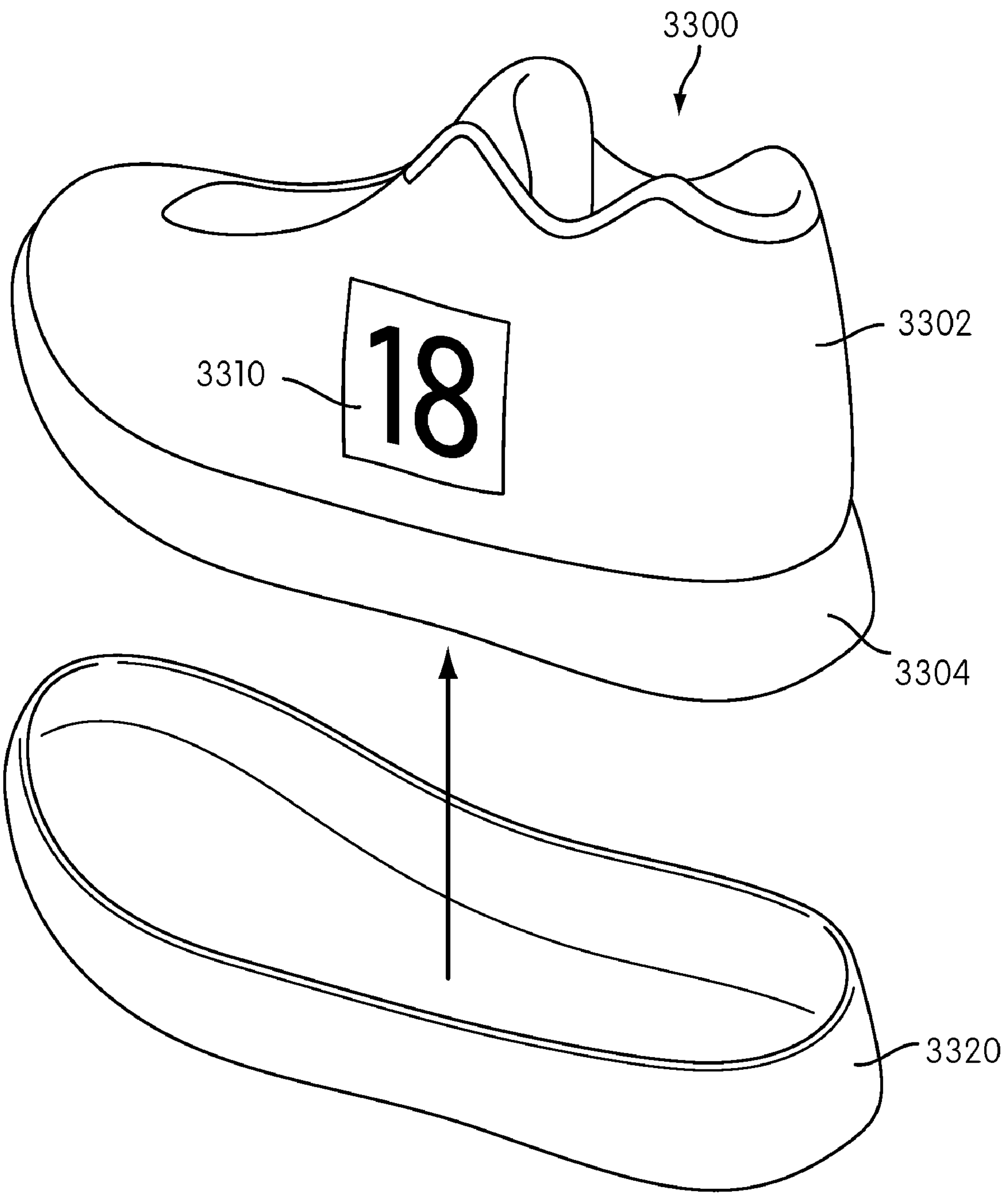
FIG. 30 is an isometric exploded view of an exemplary embodiment of an article of footwear and a protective member.

Referring to FIG. 30, article 3300 includes upper 3302 and sole 3304. At this point, first graphic 3310 and second graphic 3312 (see FIG. 31) may be associated with upper 3302. Prior to associating article 3300 with a graphic transfer assembly, sole 3304 may be covered using protective member 3320. In one embodiment, protective member 3320 can be shaped to receive sole 3304. Furthermore, protective member 3320 can be made of a material that has low thermal conductivity.

Figure 31:
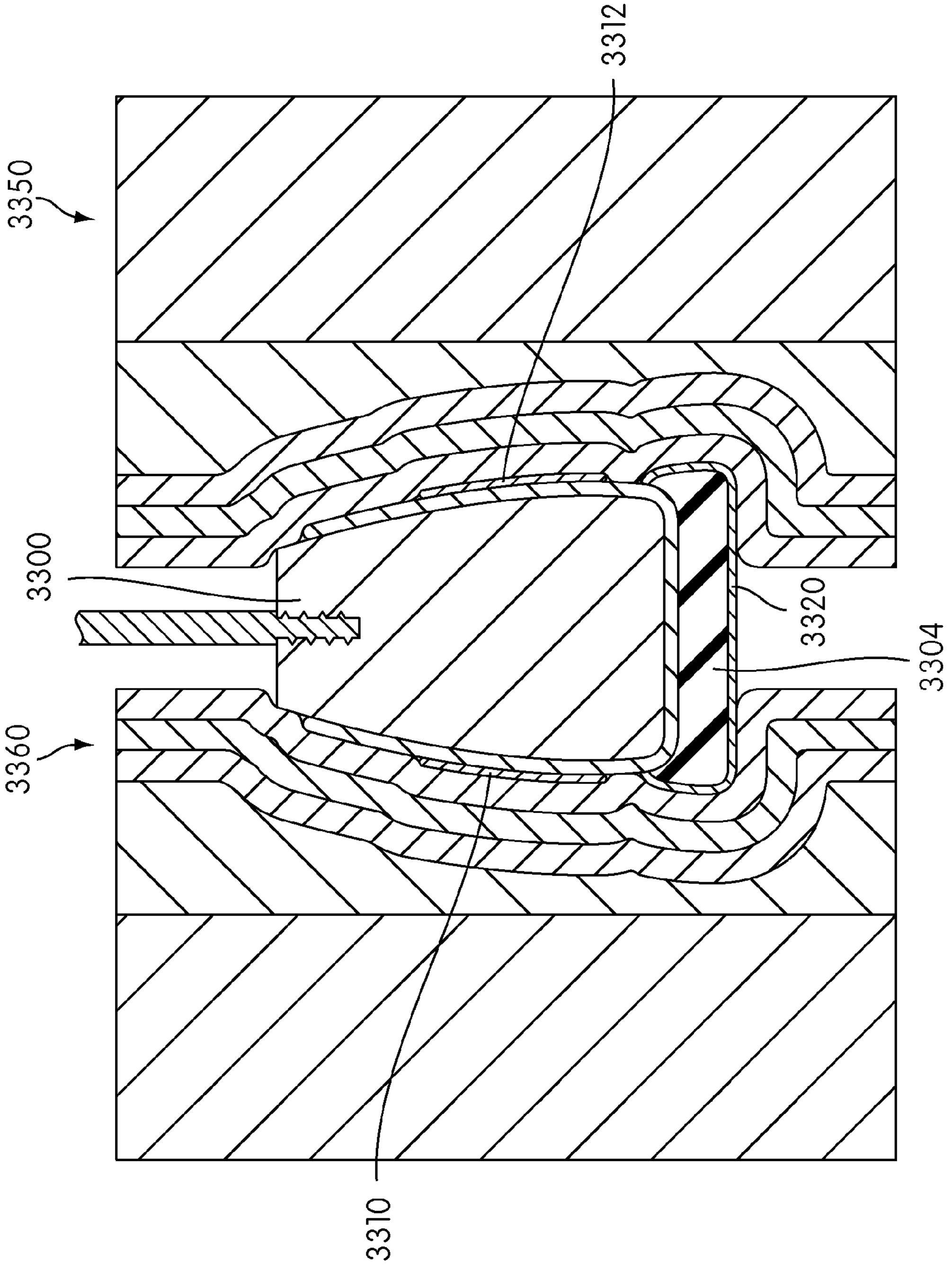
FIG. 31 is an isometric view of an exemplary embodiment of an article of footwear and a protective member.

Referring to FIG. 31, article 3300 may be exposed to graphic transfer assembly 3350 to transfer first graphic 3310 and second graphic 3312 to one or more curved portions of article 3300. In some cases, graphic transfer assembly 3350 may be substantially similar to graphic assembly 3350 of the previous embodiment. At this point, one or more of plurality of layers 3360 of graphic transfer assembly 3350 may conform to the shape of article 3300. Furthermore, one or more of plurality of layers 3360 may be heated to facilitate transfer of first graphic 3310 and second graphic 3312. By using protective member 3320, sole 3304 may be protected from the heat generated by graphic transfer assembly 3350 during the transfer process.

Figure 32:
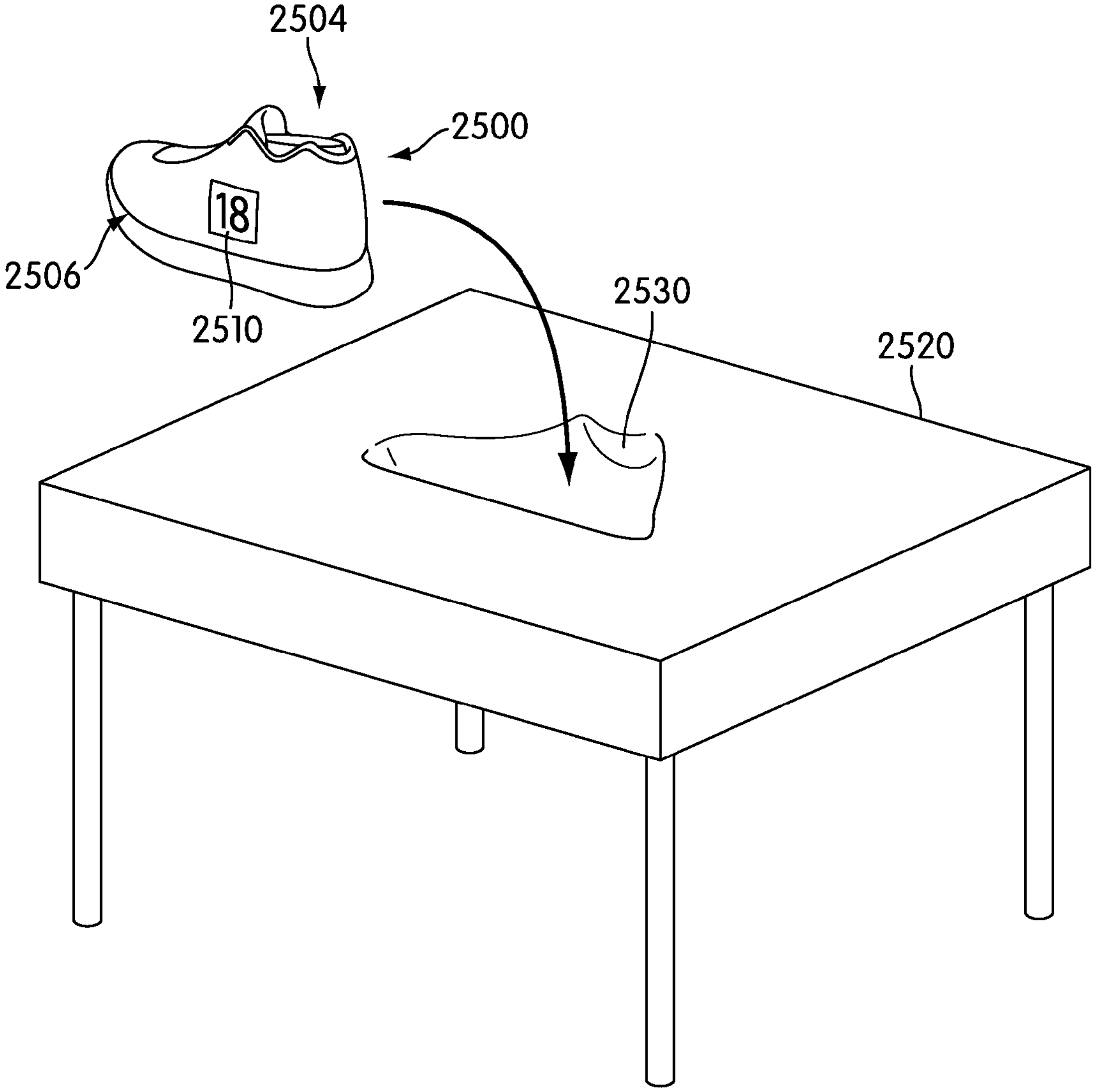
FIG. 32 is an isometric view of an exemplary embodiment of a graphic transfer assembly.

A graphic transfer assembly can include provisions to facilitate easy of use for a graphic transfer process. FIGS. 32 through 35 illustrate another embodiment of a graphic transfer assembly. Referring to FIG. 32, article 2500 includes graphic 2510 disposed on lateral portion 2506. In some cases a graphic transfer assembly for article 2500 can include base portion 2520. In one embodiment, base portion 2520 may be a table or counter.

Base portion 2520 may include provisions for receiving article 2500. In some cases, base portion 2520 may include cavity 2530. In different embodiments, cavity 2530 can have any shape. In this exemplary embodiment, cavity 2530 can be shaped to receive medial portion 2504 of article 2500.

Figure 33:
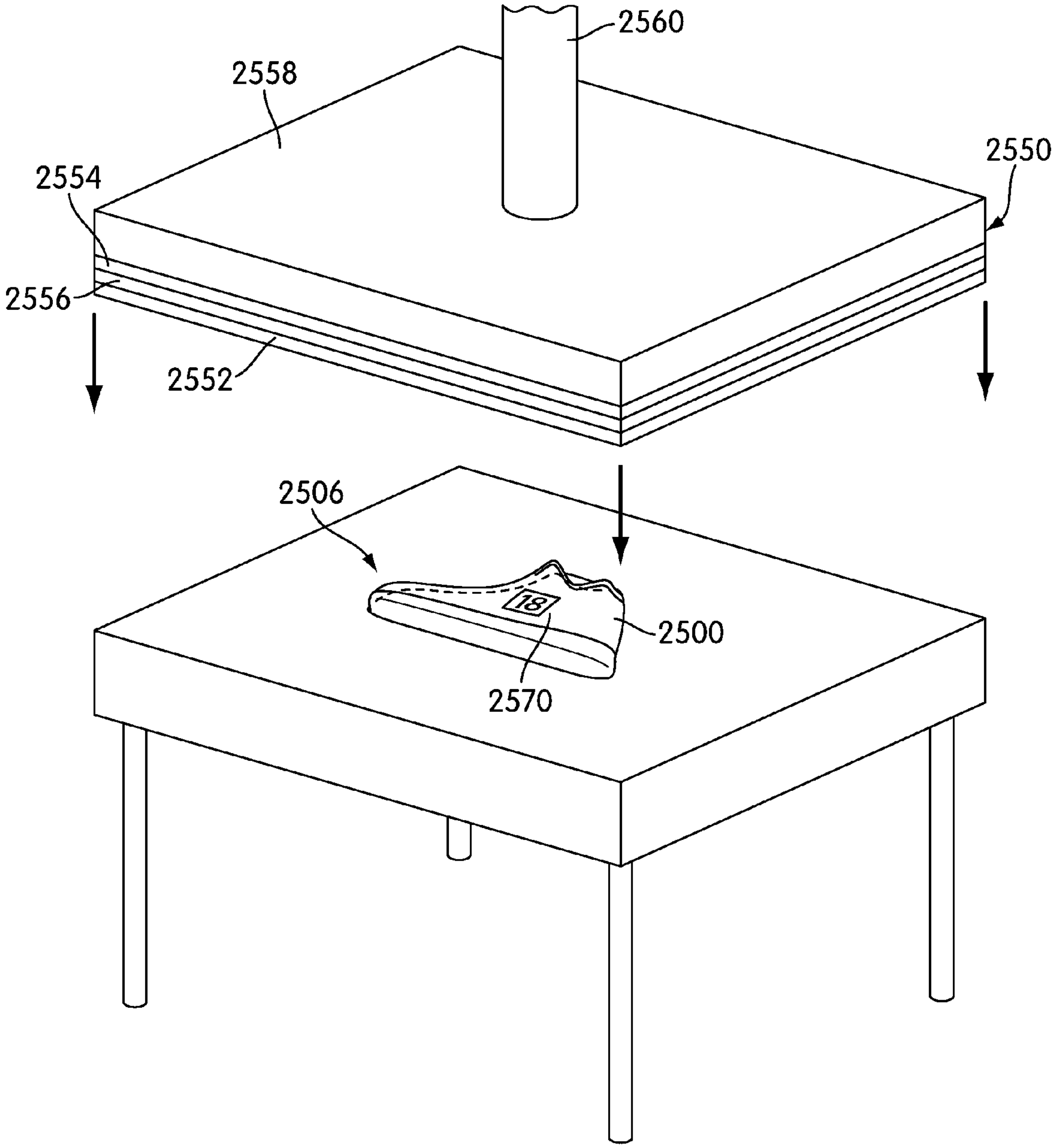
FIG. 33 is an isometric view of an exemplary embodiment of a graphic transfer assembly.

Referring to FIG. 33, medial portion 2504 of article 2500 has been inserted into cavity 2530. This arrangement exposes lateral portion 2506, including graphic 2510, in a generally upwards direction.

Graphic transfer assembly 2500 may further include moving portion 2550. In some cases, moving portion 2550 may include several layers. In one embodiment, moving portion 2550 may comprise outer layer 2552, inner layer 2554 and intermediate layer 2556. Furthermore, moving portion 2550 can include rigid layer 2558. Finally, in some cases, moving portion 2550 can include actuating member 2560. In some cases, actuating member 2560 may be a rod. In other cases, actuating member 2560 can be any structure configured to facilitate movement for moving portion 2550.

In some embodiments, outer layer 2552 can be configured to conform to curved portion 2570 of article 2500. In some cases, outer layer 2552 can be made of a material including a soft silicone. In other cases, outer layer 2552 can be made of another relatively soft material that is capable of deforming to curved portion 2570 of article 2500. Additionally, inner layer 2554 can be made of a partially deforming material. In some cases, inner layer 2554 can be made of a material including silicone. In still other embodiments, inner layer 2554 can be made of another deforming material.

In some embodiments, intermediate layer 2556 can be made of a deformable membrane. In particular, intermediate layer 2556 can be made of a material such as rubber. In other cases, intermediate layer 2556 can be any other type of deformable membrane that has been previously discussed or which is known in the art.

As previously discussed, any layer of moving portion 2550 can include heating provisions. In some cases, outer layer 2552 can be a heating layer. In other cases, inner layer 2554 can be a heating layer. In still other cases, intermediate layer 2556 can be a heating layer. In still other cases, more than one of these layers can be a heating layer.

Figure 34:
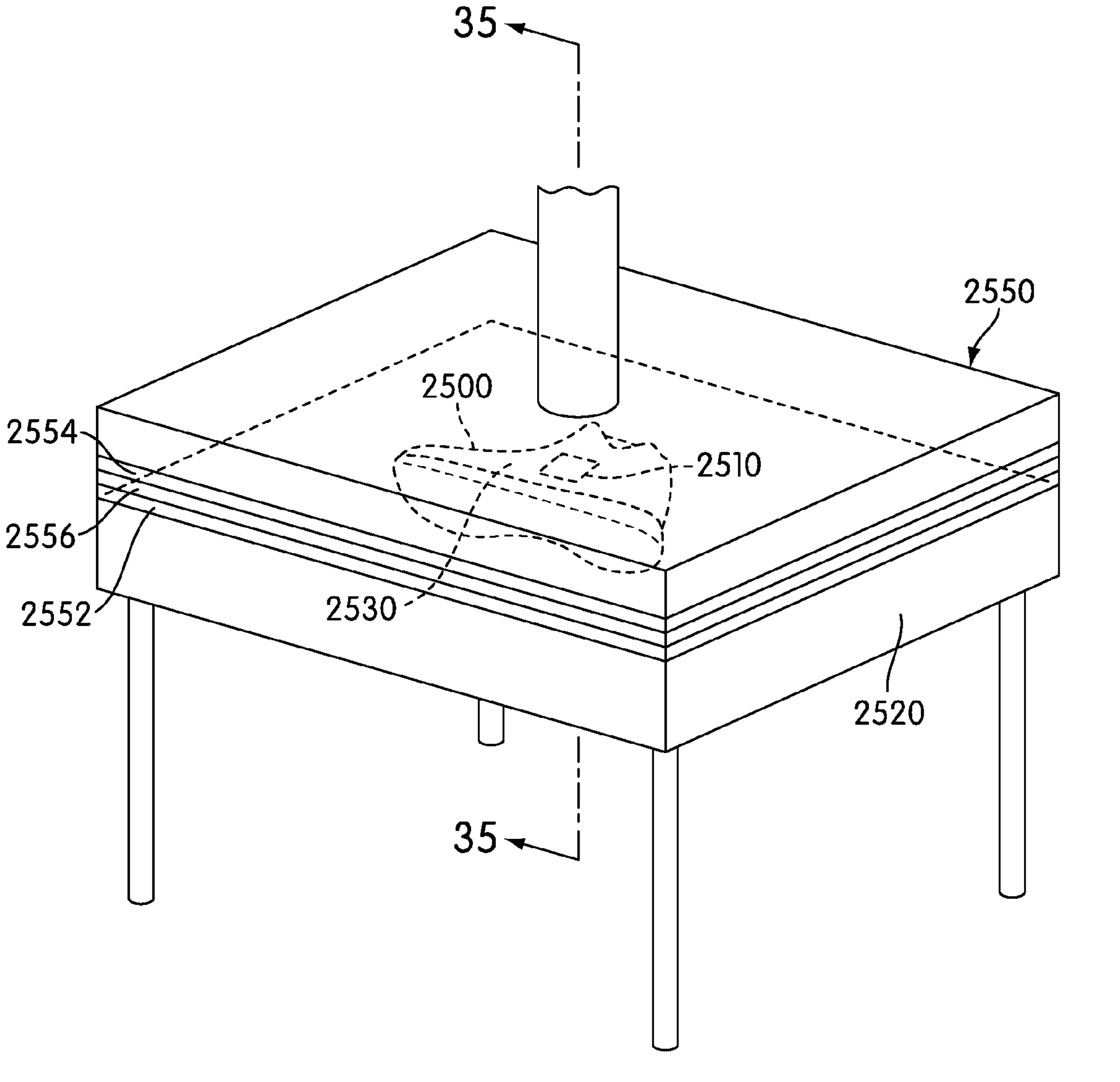
FIG. 34 is an isometric view of an exemplary embodiment of a graphic transfer assembly.
Figure 35:
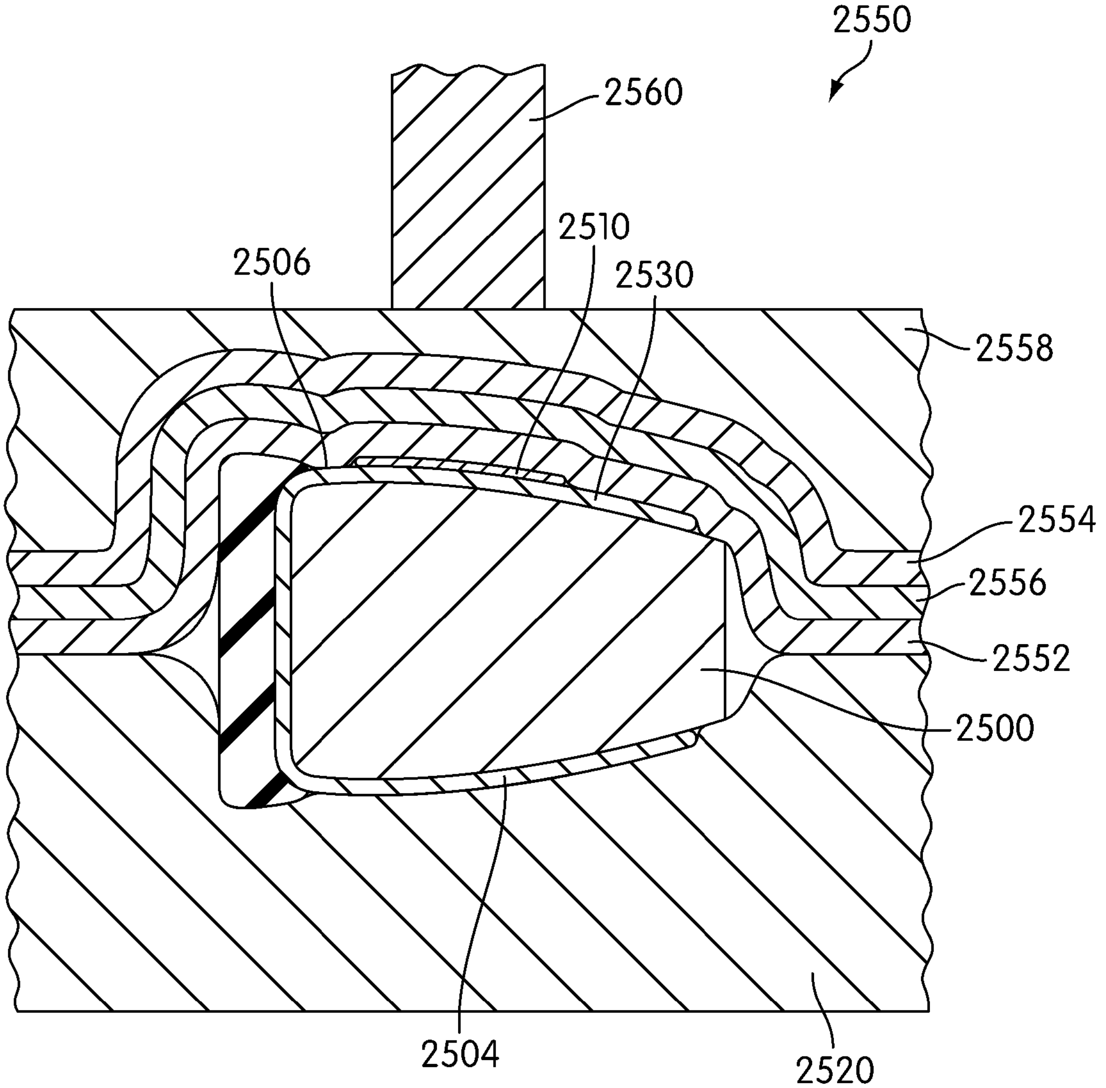
FIG. 35 is a cross sectional view of an exemplary embodiment of a graphic transfer assembly.

Referring to FIGS. 34-35, moving portion 2550 can be pressed against base portion 2520, using actuating member 2560. As moving portion 2550 is pressed against base portion 2520, moving portion 2550 may apply pressure to curved portion 2530 of article 2500. In particular, outer layer 2552, inner layer 2554 and intermediate layer 2556 may deform against the contours of curved portion 2530. This arrangement allows graphic 2510 to be applied to curved portion 2530. In particular, as one or more layers of moving portion 2550 are heated, graphic 2510 will be transferred to curved portion 2530 in the manner previously discussed.

In some cases, the embodiment discussed here can be easily adapted to a large scale manufacturing process. In particular, articles of footwear including an associated graphic can quickly be inserted into pre-formed cavities of a table, counter, or other working surface. Furthermore, using a press-type arrangement allows for quick and easy application of deformable layers to a curved portion of the article of footwear.

FIGS. 36-43 illustrate another embodiment of a method of applying a graphic to an article with a graphic transfer assembly. For purposes of illustration, FIGS. 36-43 illustrate an embodiment of a method of applying a graphic to a side portion of an article. However, it should be understood that this method could also be used to apply a graphic to any other portion of an article. For example, in embodiments where the article is an article of footwear, this method could be used to apply a graphic to another portion of an upper, a sole, as well as any other portions of the article. Furthermore, this method could be used to apply a graphic to individual portions of an article that could later be assembled together to form a completed article.

While the illustrated embodiments are directed towards articles in the form of footwear, other embodiments can be used for applying graphics to any other type of article. Examples of other types of articles that could be used with a graphic transfer assembly include, but are not limited to: shirts, pants, hats, gloves, socks, any other garments as well as any other type of article. For example, in another embodiment, a graphic transfer assembly could be used to apply a graphic to a portion of a baseball cap. In particular, rather than using a footwear last with the graphic transfer assembly, a baseball cap can be placed over any support member that fills out the baseball cap in a manner similar to a head. With this arrangement, a graphic can be applied to the baseball cap using the graphic transfer assembly method used to apply graphics to articles of footwear, which has been discussed in the previous embodiments.

Figure 36:
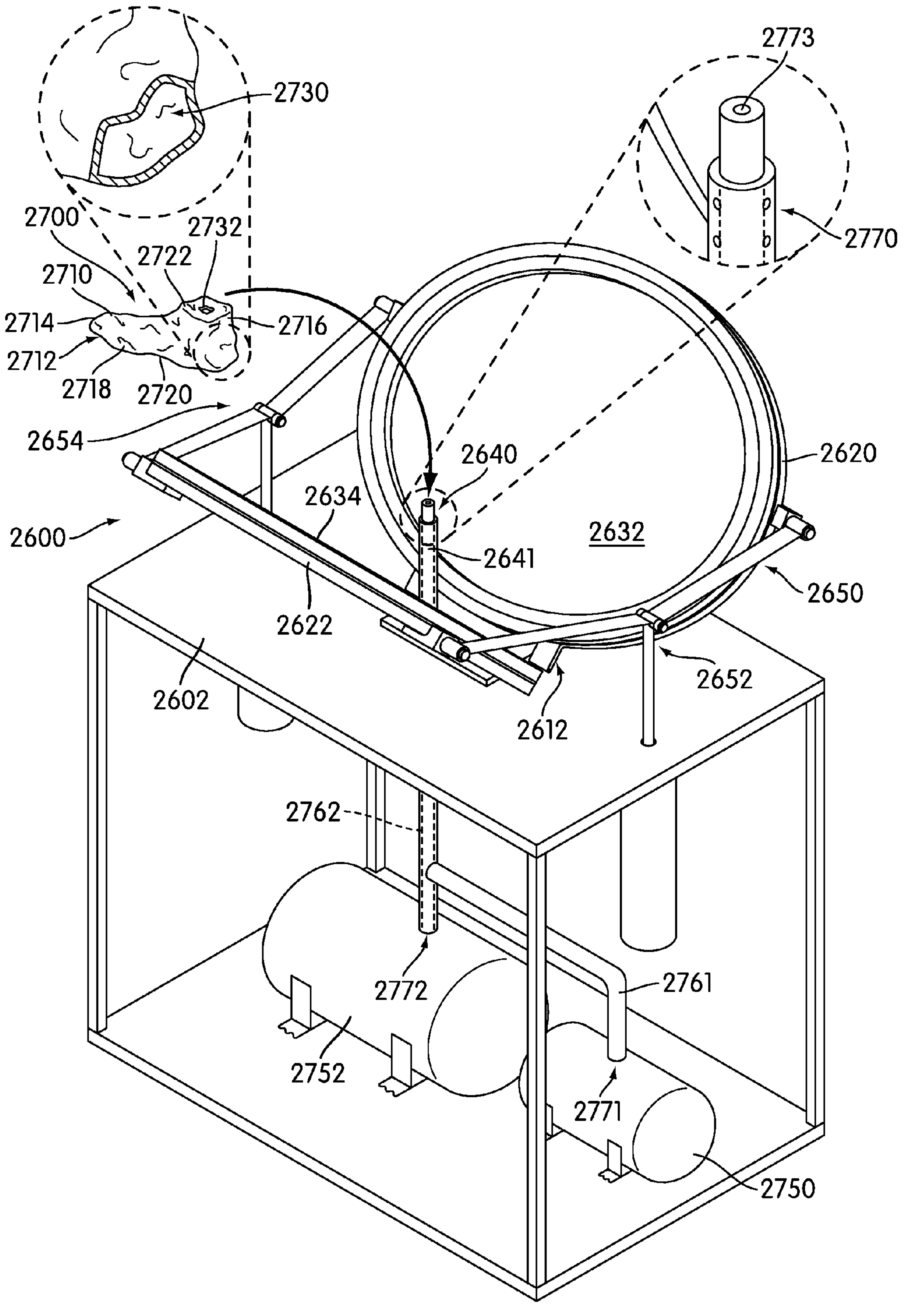
FIG. 36 is an isometric view of an embodiment of a graphic transfer assembly including an inflatable member.

FIG. 36 illustrates an embodiment of graphic transfer assembly 2600. In some embodiments, graphic transfer assembly 2600 may be substantially similar to any of the graphic transfer assemblies discussed in previous embodiments. In other embodiments, graphic transfer assembly 2600 can include other provisions not used in the previous embodiments. In still other embodiments, graphic transfer assembly 2600 can exclude some provisions used in the previous embodiments.

Referring to FIG. 36, graphic transfer assembly 2600 includes base portion 2602. In some cases, graphic transfer assembly 2600 can further include first moveable portion 2620 and second moveable portion 2622. Also, first moveable portion 2620 and second moveable portion 2622 may be further associated with first deformable membrane 2632 and a second deformable membrane 2634.

In some embodiments, first moveable portion 2620 may be attached to base portion 2602 at first pivot attachment 2612. Likewise, second moveable portion 2622 may be attached to base portion 2602 at a similar pivot attachment that is disposed adjacent to first pivot attachment 2612. With this arrangement, first moveable portion 2620 and second moveable portion 2622 can be drawn apart to insert a last and/or an article and can also be drawn together to apply a graphic to an article in the manner previously discussed.

In this embodiment, graphic transfer assembly 2600 further includes actuation system 2650. In particular, actuation system 2650 comprises first actuator assembly 2652 and second actuator assembly 2654. In some cases, first actuator assembly 2652 and second actuator assembly 2654 may provide means for opening and closing first moveable portion 2620 and second moveable portion 2622. In an exemplary embodiment, first actuator assembly 2652 and second actuator assembly 2654 may be substantially similar to the actuator assemblies discussed above and illustrated in FIGS. 17 and 18.

It should be further understood that although the current embodiment employs an actuation system for opening and closing a graphic transfer assembly, in other embodiments different types of systems could be used. For example, in one embodiment, a first moveable portion and a second moveable portion of a graphic transfer assembly could be manually opened and closed by lifting and lowering the moveable portions between an open and closed position. In another example, a motor could be attached to one or more pivot portions of the moveable portions to control the motion of the moveable portions.

In an exemplary embodiment, graphic transfer assembly 2600 includes support assembly 2640. Support assembly 2640 is configured to attach a last to base portion 2602 of graphic transfer assembly 2600. In particular, support assembly 2640 includes last post 2641. In some cases, last post 2641 may include one or more fasteners that may be inserted within a portion of a last in order to attach the last to support assembly 2640. With this arrangement, support assembly 2640 provides interchangeability for graphic transfer assembly 2600 by allowing different lasts to be attached to graphic transfer assembly 2600.

A method of applying a graphic to an article can include provisions for increasing the adaptability of a last that may be used with a graphic transfer assembly. In some embodiments, a graphic transfer assembly can be associated with an inflatable member. The term "inflatable member" as used throughout this detailed description and in the claims refers to any member that may undergo some degree of expansion upon being filled with a fluid of some kind. In some cases, an inflatable member can be configured to receive a gas including, but not limited to: air, hydrogen, helium, nitrogen or any other type of gas. In other cases, the inflatable member can be configured to receive a liquid, such as water or any other type of liquid. In an exemplary embodiment, a fluid used to fill an inflatable member can be selected according to desired properties such as compressibility.

Generally, an inflatable member can have any shape or size. In some embodiments, an inflatable member may have a shape that corresponds to a type of article to which a graphic may be applied. For example, in embodiments where a graphic transfer assembly is used to apply graphics to an article of footwear, the inflatable member may be an inflatable last that has the shape of a footwear last. In embodiments where the graphic transfer assembly may be used to apply graphics to a baseball cap, the inflatable member may have the shape of a portion of a head. In other words, the inflatable member may be shaped so the baseball cap can be fitted over the inflatable member, in a similar manner to the way that an article of footwear is fitted over a footwear last. In embodiments where the graphic transfer assembly may be used to apply graphics to a sleeve of a shirt, the inflatable member may have the shape of an arm. In other words, the inflatable member may be shaped so the sleeve can be fitted over the inflatable member. In an exemplary embodiment, an inflatable last can be used with a graphic transfer assembly.

In some embodiments, graphic transfer assembly 2600 may be associated with inflatable member 2700. In some cases, inflatable member 2700 may comprise body portion 2710. In some cases, body portion 2710 may be configured as a substantially monolithic portion. In other cases, body portion 2710 can comprise multiple distinct portions. Body portion 2710 can include exterior surface 2712. In addition, body portion 2710 may include toe portion 2714, heel portion 2716 and central portion 2718 that is disposed between toe portion 2714 and heel portion 2716. Also, body portion 2710 may include bottom portion 2720 and top portion 2722.

Inflatable member 2700 can also include interior chamber 2730. In some cases, interior chamber 2730 may be configured to receive a volume of fluid. Generally, interior chamber 2730 can have any size and shape that fits within the boundaries of body portion 2710. In particular, the size and shape of interior chamber 2730 may vary with the thickness of body portion 2710. Although the current embodiment includes a single interior chamber that extends throughout a substantial entirety of body portion 2710, in other embodiments, two or more chambers can be used. In some cases, in embodiments where two or more chambers are used, the chambers can be in fluid communication. In other cases, in embodiments where two or more chambers are used, the chambers may not be in fluid communication.

In some embodiments, inflatable member 2700 can include fluid port 2732 that is in fluid communication with interior chamber 2730. Generally, fluid port 2732 can be any type of port known in the art for controlling the flow of fluid between two regions. In some embodiments, fluid port 2732 may be associated with one or more air valves. For example, in one embodiment, fluid port 2732 may include a one way valve that helps to prevent fluid from leaving interior chamber 2730 but allows air to enter interior chamber 2730. In other embodiments, any other provisions known in the art for controlling the flow of fluids into or out of an inflatable device can be used.

In some cases, fluid port 2732 can be associated with top portion 2722 of body portion 2710. In other cases, however, fluid port 2732 can be disposed on other portions of body portion 2710. Furthermore, in embodiments where two or more separate interior chambers are used, two or more corresponding fluid ports can be used. With this arrangement, fluid can be inserted or removed from interior chamber 2730 using fluid port 2732.

In an exemplary embodiment, inflatable member 2700 can have the shape of a human foot in a fully inflated position. In particular, inflatable member 2700 may have a three dimensional shape that is similar to the shape provided by traditional lasts that are made of wood or other solid materials.

With this arrangement, inflatable member 2700 can be used for any purposes associated with traditional types of lasts including, but not limited to: assembling articles around the last. In an exemplary embodiment, inflatable member 2700 may be further used for applying graphics to an article using a graphic transfer assembly.

Generally, an inflatable member can be made of any material. In some embodiments, an inflatable member can be made of a substantially flexible and resilient material that is configured to deform under fluid forces. In some cases, an inflatable member can be made of a plastic material. Examples of plastic materials that may be used include high density polyvinyl-chloride (PVC), polyethylene, thermoplastic materials, elastomeric materials as well as any other types of plastic materials including combinations of various materials. In embodiments where thermoplastic polymers are used for an inflatable member, a variety of thermoplastic polymer materials may be utilized for the inflatable member, including polyurethane, polyester, polyester polyurethane, and polyether polyurethane. Another suitable material for an inflatable member is a film formed from alternating layers of thermoplastic polyurethane and ethylene-vinyl alcohol copolymer, as disclosed in U.S. Pat. Nos. 5,713,141 and 5,952,065 to Mitchell et al., both of which patents are hereby incorporated by reference. An inflatable member may also be formed from a flexible microlayer membrane that includes alternating layers of a gas barrier material and an elastomeric material, as disclosed in U.S. Pat. Nos. 6,082,025 and 6,127,026 to Bonk et al., both of which patents are hereby incorporated by reference. In addition, numerous thermoplastic urethanes may be utilized, such as PELLETHANE, a product of the Dow Chemical Company; ELASTOLLAN, a product of the BASF Corporation; and ESTANE, a product of the B.F. Goodrich Company, all of which are either ester or ether based. Still other thermoplastic urethanes based on polyesters, polyethers, polycaprolactone, and polycarbonate macrogels may be employed, and various nitrogen blocking materials may also be utilized. Additional suitable materials are disclosed in U.S. Pat. Nos. 4,183,156 and 4,219,945 to Rudy, both of which patents are hereby incorporated by reference. Further suitable materials include thermoplastic films containing a crystalline material, as disclosed in U.S. Pat. Nos. 4,936,029 and 5,042,176 to Rudy, both of which patents are hereby incorporated by reference, and polyurethane including a polyester polyol, as disclosed in U.S. Pat. Nos. 6,013,340; 6,203,868; and 6,321,465 to Bonk et al., all of which are hereby incorporated by reference. In an exemplary embodiment, an inflatable member may be made of a material that provides sufficient rigidity for an article of footwear when fully inflated.

Since deformable membranes of a graphic transfer assembly can be configured to apply heat to an article during the graphic transfer process, as discussed above, an inflatable member can include provisions for withstanding heat. In some embodiments, the inflatable member can be made of a material that does not degrade or substantially deform when heated. In other embodiments, the inflatable member can be treated with one or more heat resistant materials. In an exemplary embodiment, an inflatable member can comprise materials that are capable of withstanding a predetermined amount of heat associated with the temperatures applied to an article by a graphic transfer assembly.

Graphic transfer assembly 2600 can include provisions for applying a vacuum between first deformable membrane 2632 and second deformable membrane 2634. In some embodiments, a vacuum pump can be used. In this embodiment, graphic transfer assembly 2600 can include vacuum pump 2750. Examples of different types of vacuum pumps that can be used include, but are not limited to: a positive displacement pump, a momentum transfer pump and/or an entrapment pump.

Figure 37:
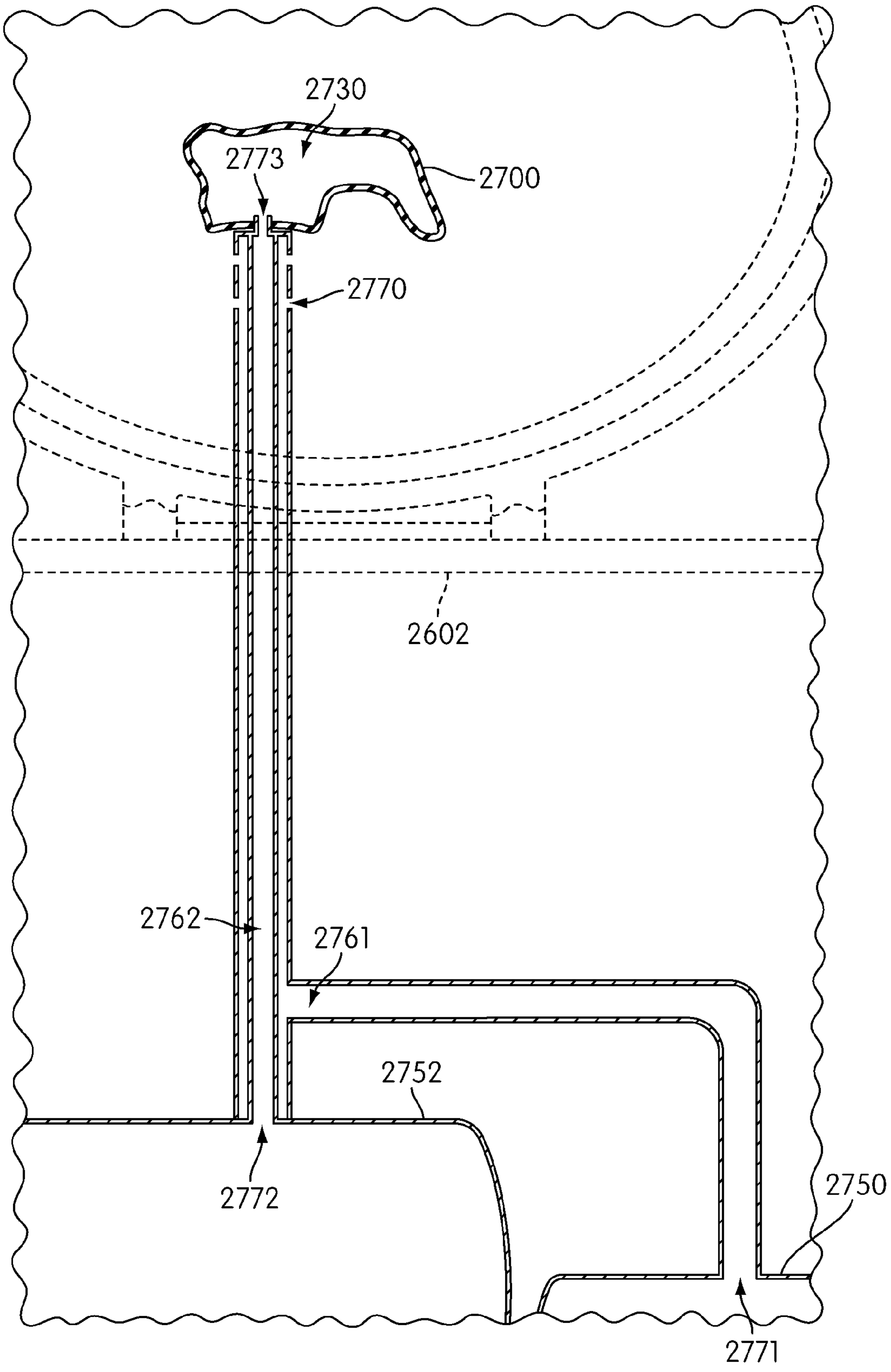
FIG. 37 is a cross sectional view of an embodiment of a graphic transfer assembly including an inflatable member.

Referring to FIGS. 36 and 37, graphic transfer assembly 2600 can include provisions for filling an inflatable member. In some embodiments, a fluid pump can be used. In one embodiment, graphic transfer assembly 2600 can include fluid pump 2752. Examples of types of pumps that can be used include, but are not limited to: positive displacement pumps, roots-type pumps, reciprocating-type pumps, kinetic pumps as well as any other type of pump.

In some embodiments, graphic transfer assembly 2600 can be associated with one or more fluid lines. In one embodiment, first fluid line 2761 may extend from vacuum pump 2750 to a region between first deformable membrane 2632 and second deformable membrane 2634. In particular, first fluid line 2761 can include first fluid port 2771 associated with vacuum pump 2750. In addition, first fluid line 2761 can include set of fluid ports 2770 that are disposed on support assembly 2640. In some cases, only a single fluid port may be used. In other cases, two or more fluid ports may comprise set of fluid ports 2770. In an exemplary embodiment, set of fluid ports 2770 may comprise a plurality of holes. With this arrangement, as first moveable portion 2620 and second moveable portion 2622 close together, the region between first deformable membrane 2632 and second deformable membrane 2634 may be in fluid communication with vacuum pump 2750.

Graphic transfer assembly 2600 may also be associated with second fluid line 2762 that extends from fluid pump 2752 to a region between first deformable membrane 2632 and second deformable membrane 2634. In particular, second fluid line 2762 can include second fluid port 2772 that is associated with fluid pump 2752 and third fluid port 2773 disposed on support assembly 2640. Furthermore, third fluid port 2773 may be configured to insert into fluid port 2732 of inflatable member 2700. With this arrangement, an inflatable member may be in fluid communication with fluid pump 2752.

In different embodiments, the arrangement of first fluid line 2761 and second fluid line 2762 may vary. In some embodiments, first fluid line 2761 may be separated from second fluid line 2762. In other embodiments, however, first fluid line 2761 and second fluid line 2762 may be disposed adjacent to one another. In an exemplary embodiment, portions of first fluid line 2761 and second fluid line 2762 may be substantially coaxial. In particular, in this embodiment, a portion of second fluid line 2762 may be disposed within a portion of first fluid line 2761. With this arrangement, a single seal may be used for both first fluid line 2761 and second fluid line 2762 in order to reduce leaking between first deformable membrane 2632 and second deformable membrane 2634 while a vacuum is applied.

In the exemplary embodiment, first fluid line 2761 and second fluid line 2762 may be associated with last post 2641 that is intended to provide an attachment point and support for a last. In some cases, last post 2641 may be formed by a substantially rigid portion of second fluid line 2762. In other cases, last post 2641 can be a separate portion of graphic transfer assembly 2600 that may include provisions for receiving one or more fluid lines.

Generally, any type of fluid lines can be used with graphic transfer assembly 2600. In some cases, one or more pipes can be used. In other cases, one or more tubes can be used. Furthermore, in different embodiments, the rigidity of one or more fluid lines can vary. For example, in another embodiment, substantially flexible plastic tubing can be used for one or more fluid lines. In still other embodiments, fluid lines can be made from any material including, but not limited to, metal, plastic, rubber as well as any other material that can be used for transferring fluids.

In some embodiments, inflatable member 2700 may initially be disposed in a substantially deflated state. In this substantially deflated state, inflatable member 2700 may have a partially flattened and/or partially deformed shape. In order to fill inflatable member 2700, inflatable member 2700 may be attached to last post 2641 of graphic transfer assembly 2600. In particular, fluid port 2732 of inflatable member 2700 may be engaged with third fluid port 2773 of second fluid line 2762.

Figure 38:
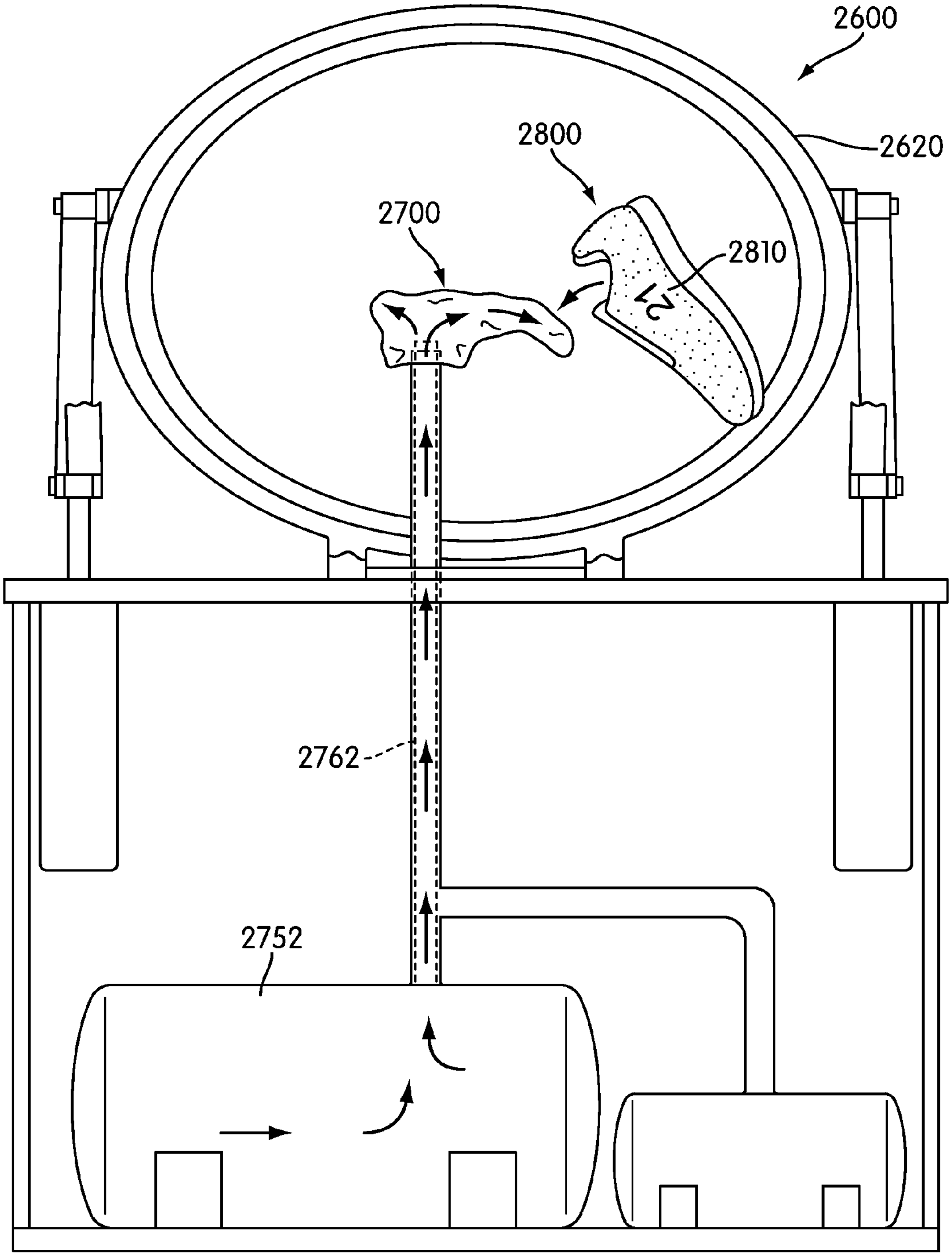
FIG. 38 is a schematic view of an embodiment of an inflatable member being associated with an article of footwear.

Referring to FIG. 38, inflatable member 2700 may be filled with a fluid. In particular, fluid may be pumped from fluid pump 2752 into inflatable member 2700 using second fluid line 2762. In this case, as fluid flows into interior chamber 2730 (see FIGS. 36 and 37), inflatable member 2700 may expand.

In some cases, prior to fully inflating inflatable member 2700, an article may be associated with inflatable member 2700. In the current embodiment, article of footwear 2800 may be associated with graphic transfer assembly 2600. In this case, article of footwear 2800 includes graphic 2810. In particular, graphic 2810 is a number "21". In other embodiments, any other type of graphic can be used. Examples of various types of graphics have been previously discussed. For example, in another embodiment, graphic 2810 could be a shape of some kind. Furthermore, in some cases, two or more graphics could be applied to article of footwear 2800.

Figure 39:
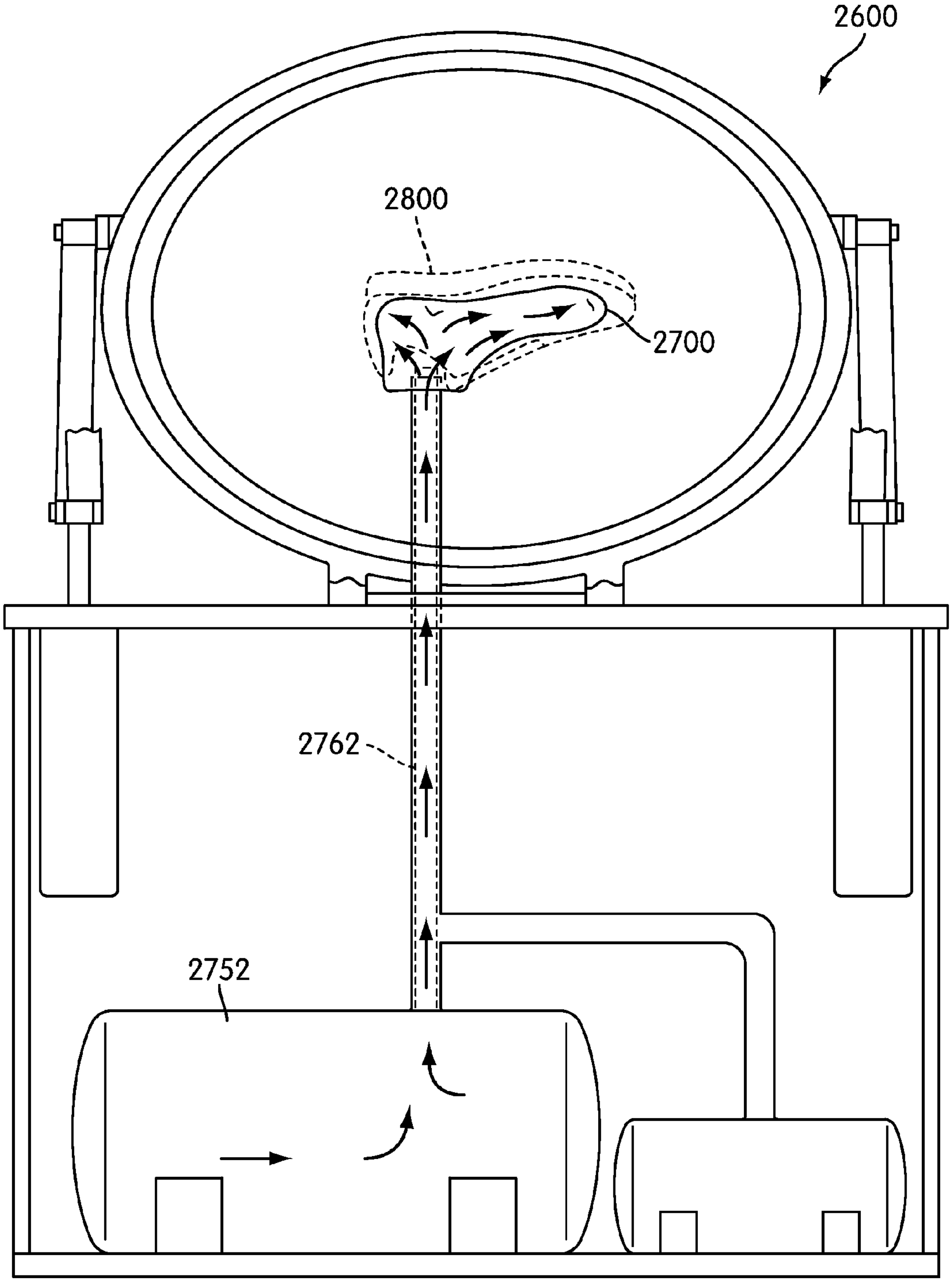
FIG. 39 is a schematic view of an embodiment of an inflatable member inflating to fill an article of footwear.
Figure 40:
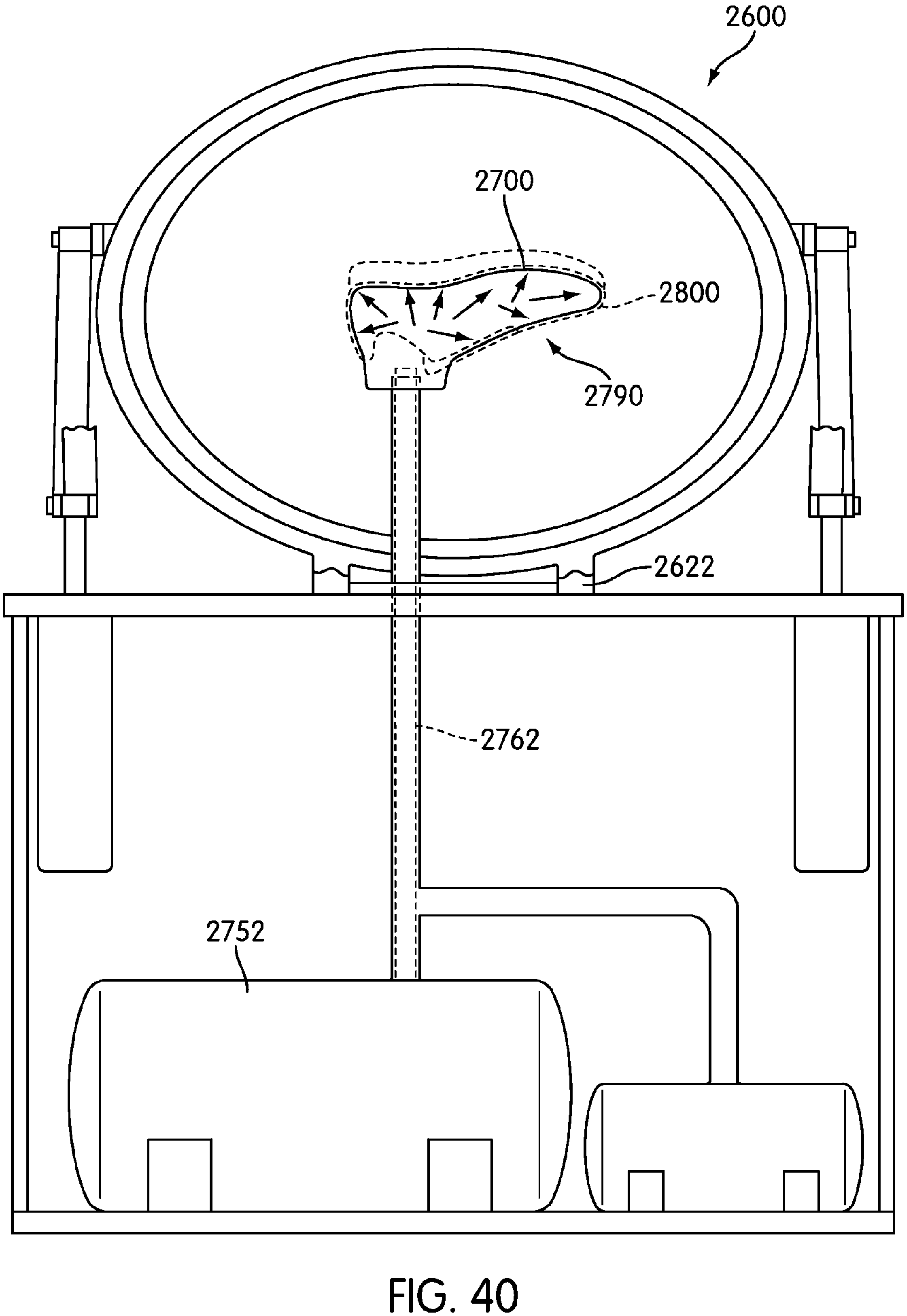
FIG. 40 is an isometric view of an embodiment of an inflatable member inflated to fill the interior of an article of footwear.

Referring to FIGS. 39 and 40, once article of footwear 2800 has been placed onto inflatable member 2700, inflatable member 2700 may continue to inflate. In particular, fluid may continue to flow into inflatable member 2700 until inflatable member 2700 has expanded to fill article of footwear 2800. Eventually, as illustrated in FIG. 40, inflatable member 2700 may be fully inflated. At this point, inflatable member 2700 may have a substantially smooth outer surface 2790 that is substantially similar to the shape of a foot. At this point, first moveable portion 2620 and second moveable portion 2622 (see FIG. 36) may close around article of footwear 2800.

Figure 41:
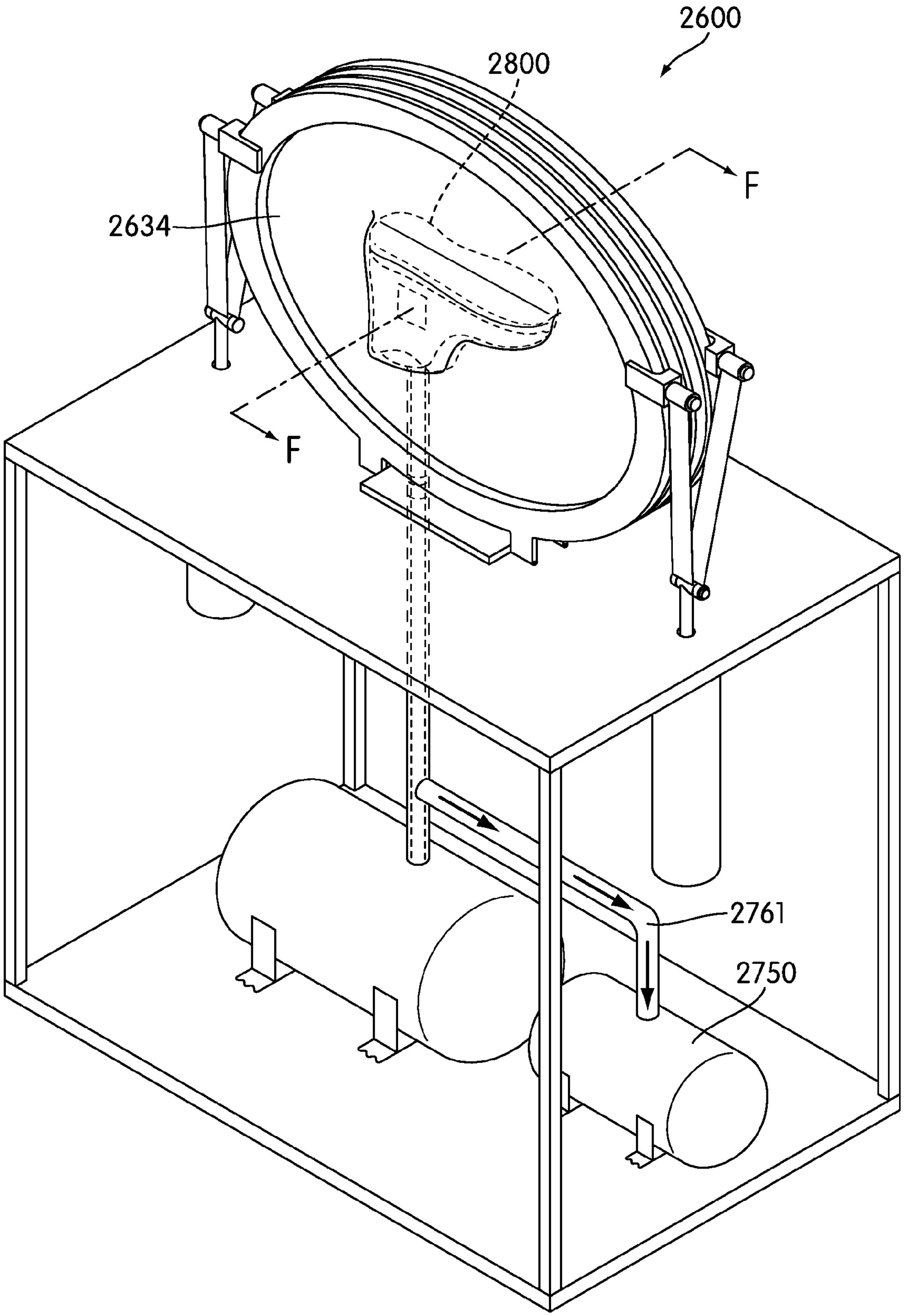
FIG. 41 is an isometric view of an embodiment of an graphic transfer assembly closing around an article.
Figure 42:
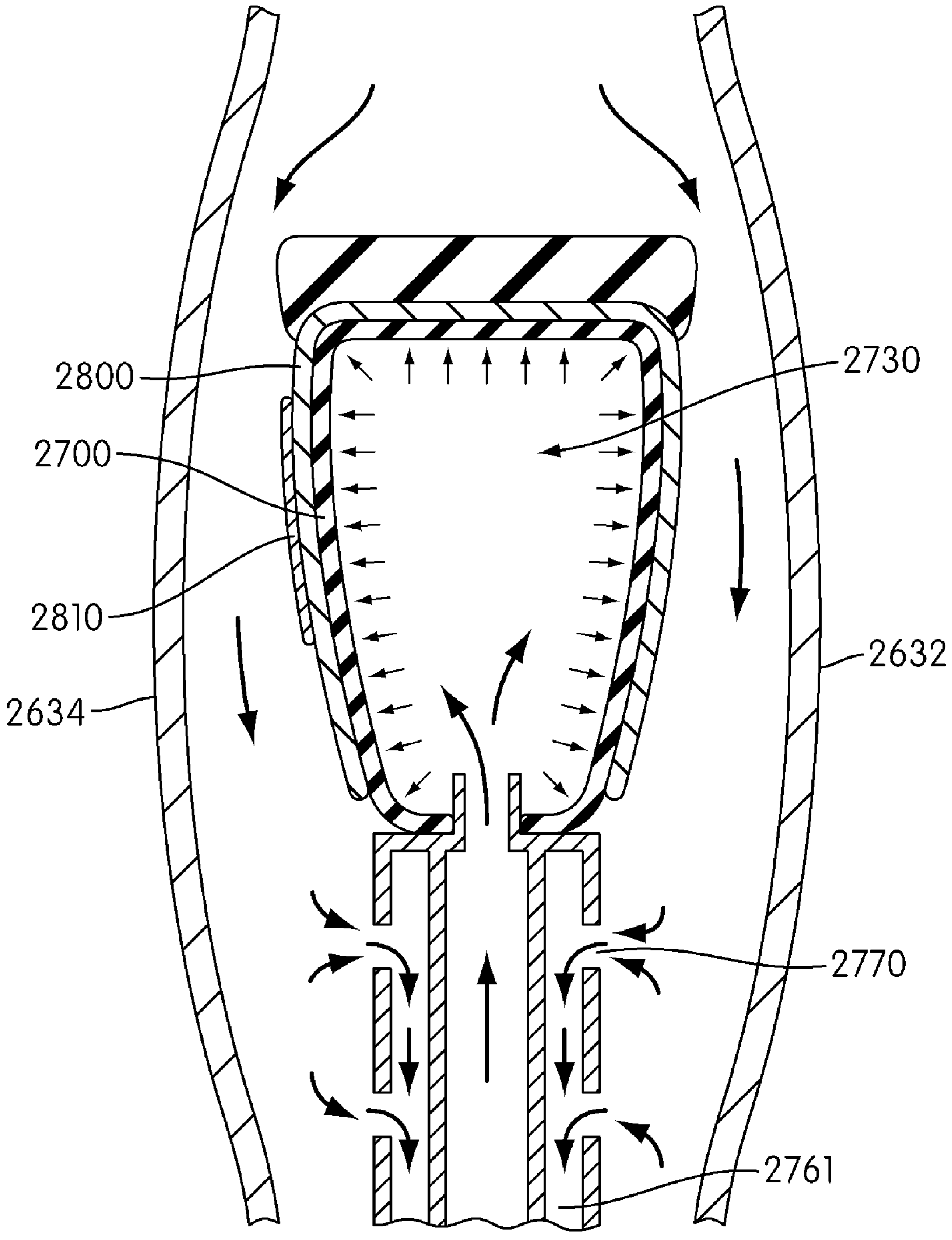
FIG. 42 is a cross sectional view of an embodiment of a vacuum being applied around an article.
Figure 43:
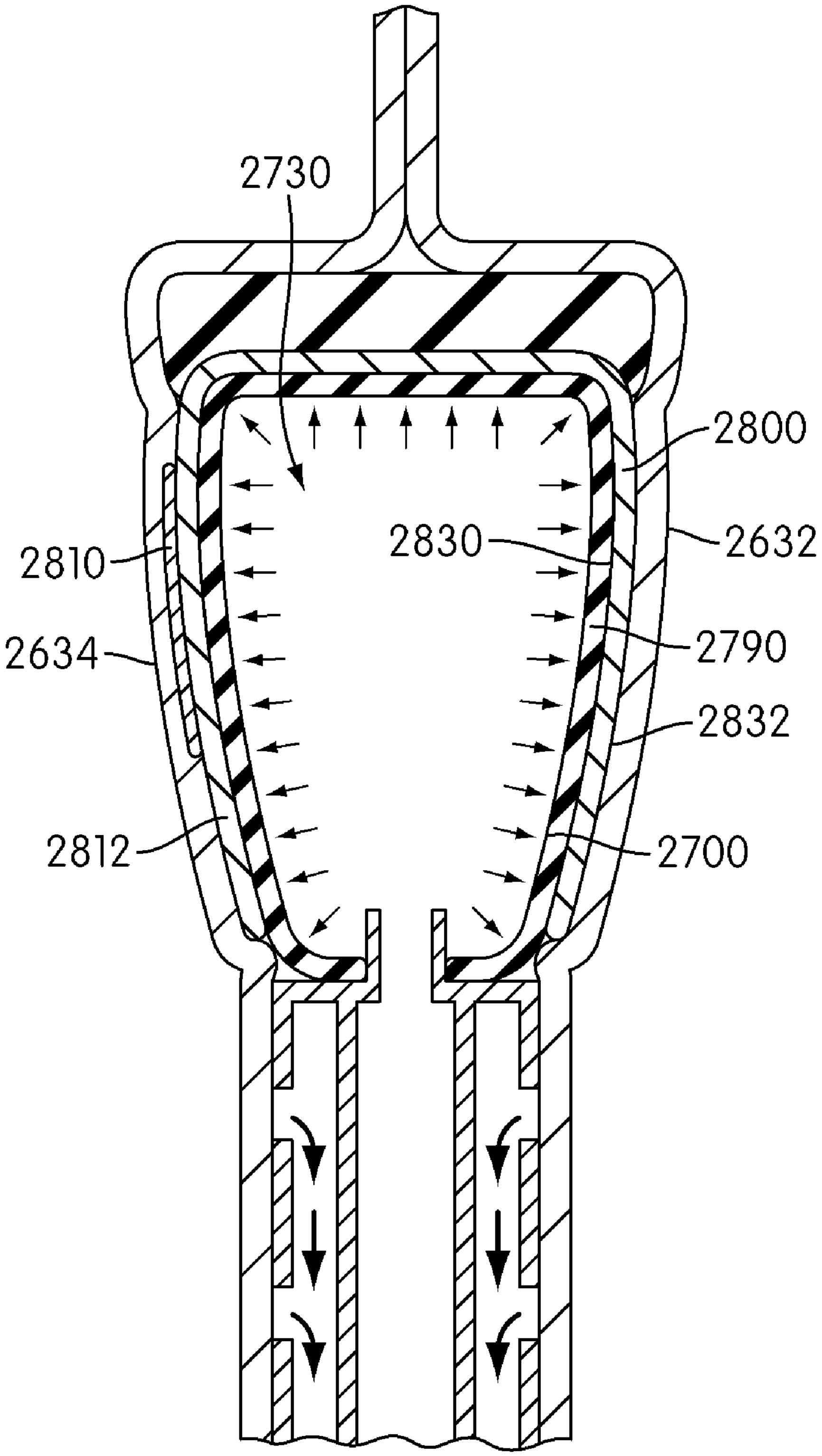
FIG. 43 is a cross sectional view of an embodiment of a vacuum being applied around an article.

Referring to FIGS. 41 through 43, article of footwear 2800 is disposed between first deformable membrane 2632 and second deformable membrane 2634. At this point, a vacuum may be applied between first deformable membrane 2632 and second deformable membrane 2634. In particular, air disposed between first deformable membrane 2632 and second deformable membrane 2634 may be evacuated using first fluid line 2761 that is connected to vacuum pump 2750.

Referring to FIG. 42, air trapped between first deformable membrane 2632 and second deformable membrane 2634 may be pulled through set of fluid ports 2770 of first fluid line 2761 towards vacuum pump 2750. Eventually, as a substantial entirety of the air is evacuated, first deformable membrane 2632 and second deformable membrane 2634 may be pulled tightly against the outer surface of article of footwear 2800, as illustrated in FIG. 43. In particular, first deformable membrane 2632 and second deformable membrane 2634 may conform to curved portions of article of footwear 2800. Furthermore, graphic 2810 may be pressed against side portion 2812 of article of footwear 2800 using second deformable membrane 2634.

As illustrated in FIGS. 42 and 43, inflatable member 2700 provides substantially even pressure throughout exterior surface 2790. In particular, exterior surface 2790 of inflatable member 2700 provides substantially even pressure throughout interior surface 2830 of article of footwear 2800. In an exemplary embodiment, the forces applied by inflatable member 2700 along interior surface 2830 of article of footwear 2800 and the forces applied to outer surface 2832 of article of footwear 2800 by first deformable membrane 2632 and second deformable membrane 2634 can be adjusted. For example, by modifying the inflation pressure of inflatable member 2700 as well as the vacuum pressure applied between first deformable membrane 2632 and second deformable membrane 2634, the forces applied to interior surface 2830 and exterior surface 2832 can be fine tuned to provide a maximally efficient transfer of graphic 2810 to a portion of article of footwear 2800.

In order to apply a graphic to an article, heat may be used to attach the graphic to the article. In some embodiments, heat may be applied by heating elements disposed adjacent to a deformable membrane. In other embodiments, heat may be applied by heat radiated from a deformable membrane. In some cases, heating wires may be embedded in a deformable membrane. In other cases, a deformable membrane may comprise a heat conducting material to transfer heat to an article.

With first deformable membrane 2632 and second deformable membrane 2634 conforming to portions of article of footwear 2800, heat may be transferred through first deformable membrane 2632 and second deformable membrane 2634 to apply graphic 2810 to article of footwear 2800. In an exemplary embodiment, heating wires embedded in first deformable membrane 2632 and second deformable membrane 2634 may be heated to apply graphic 2810 to article of footwear 2800.

As illustrated in FIGS. 42 and 43, inflatable member 2700 provides substantially even pressure throughout exterior surface 2790. In particular, exterior surface 2790 of inflatable member 2700 provides substantially even pressure throughout interior surface 2830 of article of footwear 2800. In an exemplary embodiment, the forces applied by inflatable member 2700 along interior surface 2830 of article of footwear 2800 and the forces applied to outer surface 2832 of article of footwear 2800 by first deformable membrane 2632 and second deformable membrane 2634 can be adjusted. For example, by modifying the inflation pressure of inflatable member 2700 as well as the vacuum pressure applied between first deformable membrane 2632 and second deformable membrane 2634, the forces applied to interior surface 2830 and exterior surface 2832 can be fine tuned to provide a maximally efficient transfer of graphic 2810 to a portion of article of footwear 2800.

It will be understood that an inflatable member can be used with any method for applying a graphic to an article. Furthermore, the use of an inflatable member is not restricted to use with a particular type of graphic transfer assembly. In some embodiments, an inflatable member could be used with any of the different types of graphic transfer assemblies discussed previously in this detailed description.

Figure 44:
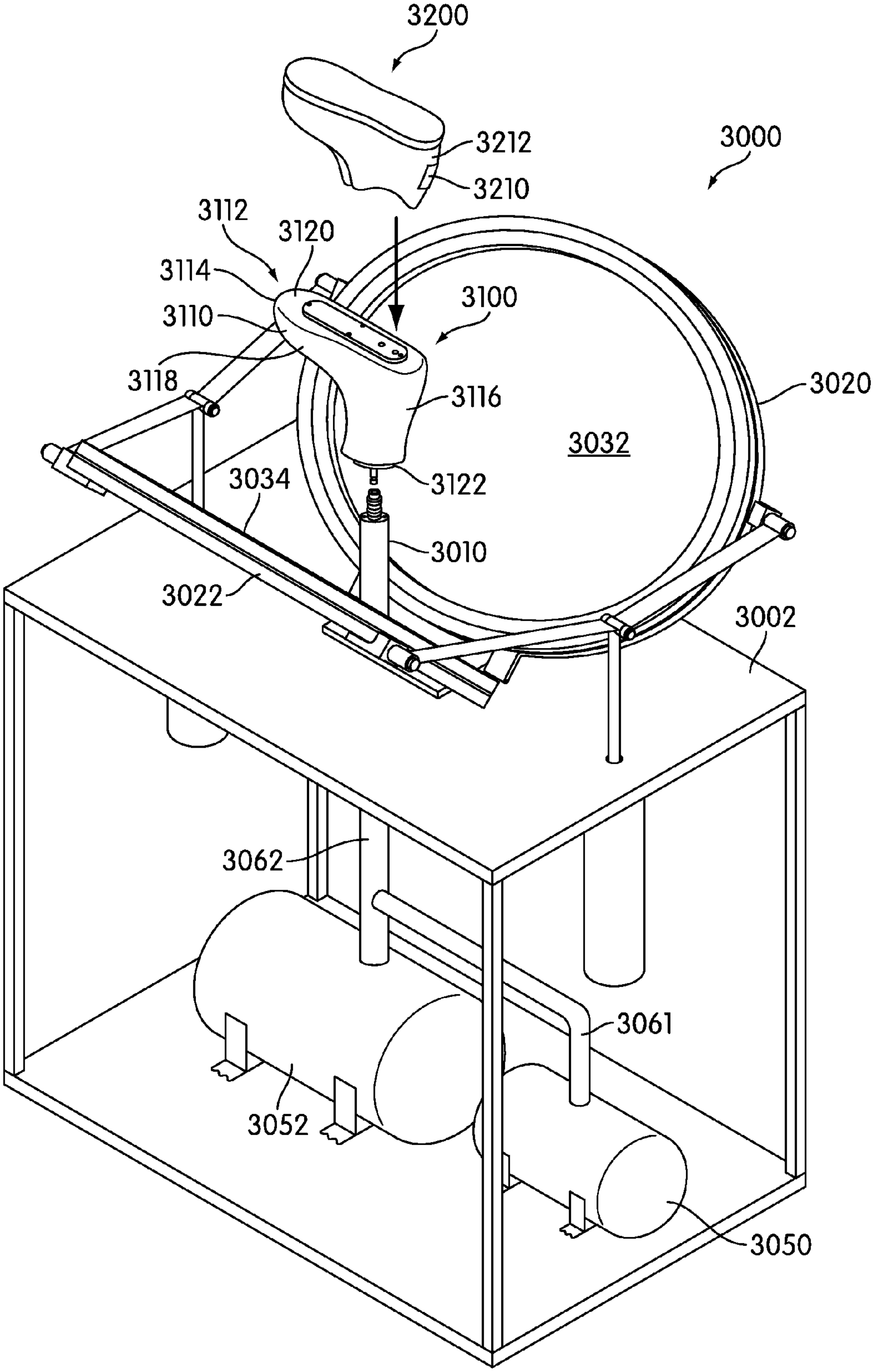
FIG. 44 is an isometric view of an embodiment of a graphic transfer assembly.

FIG. 44 illustrates another embodiment of a graphic transfer assembly. Referring to FIG. 44, graphic transfer assembly 3000 can include many of the provisions discussed in the previous embodiments. For example, in some embodiments, graphic transfer assembly 3000 may be associated with base portion 3002. In some cases, graphic transfer assembly 3000 can further include first moveable portion 3020 and second moveable portion 3022. Also, first moveable portion 3020 and second moveable portion 3022 may be further associated with first deformable membrane 3032 and a second deformable membrane 3034. In addition, graphic transfer assembly 3000 may further include an actuation system that facilitates opening and closing of first moveable portion 3020 and second moveable portion 3022. Any type of actuation system can be used including any of the systems discussed above.

Graphic transfer assembly 3000 can include provisions for applying a vacuum between first deformable membrane 3032 and second deformable membrane 3034. In some embodiments, a vacuum pump can be used. In this embodiment, graphic transfer assembly 3000 can include vacuum pump 3050. Examples of different types of vacuum pumps that can be used include, but are not limited to: a positive displacement pump, a momentum transfer pump and/or an entrapment pump.

Graphic transfer assembly 3000 can include provisions for filling an inflatable member. In some embodiments, a fluid pump can be used. In one embodiment, graphic transfer assembly 3000 can include fluid pump 3052. Examples of types of pumps that can be used include, but are not limited to: positive displacement pumps, roots-type pumps, reciprocating-type pumps, kinetic pumps as well as any other type of pump.

In some embodiments, graphic transfer assembly 3000 can be associated with one or more fluid lines. In one embodiment, first fluid line 3061 may extend from vacuum pump 3050 to last post 3010. Additionally, in some embodiments, graphic transfer assembly can be associated with second fluid line 3062. In one embodiment, second fluid line 3062 may extend from fluid pump 3052 to last post 3010.

Graphic transfer assembly 3000 can be associated with inflatable last 3100. In some embodiments, inflatable member 3100 may comprise body portion 3110. In some cases, body portion 3110 may be configured as a substantially monolithic portion. In other cases, body portion 3110 can comprise multiple distinct portions. Body portion 3110 can include exterior surface 3112. In addition, body portion 3110 may include toe portion 3114, heel portion 3116 and central portion 3118 that is disposed between toe portion 3114 and heel portion 3116. Also, body portion 3110 may include bottom portion 3120 and top portion 3122.

In a similar manner to the embodiments discussed above, inflatable member 3100 may be configured to receive article of footwear 3200. In some embodiments, article 3200 may be fit onto inflatable member 3100 to facilitate transferring graphic 3210 to curved portion 3212 of article 3200. In some cases, inflatable member 3100 may be configured to provide substantially consistent pressure along curved portion 3212 while applying graphic 3210 to article 3200.

In some embodiments, an inflatable last can include provisions to improve the efficiency of a graphic transfer assembly. In some embodiments, an inflatable last can include structural components that help facilitate inflation and that provide increase structural integrity for the inflatable last. In an exemplary embodiment, an inflatable last can include an internal support member that is configured with fluid delivery ports that help provide efficient inflation for the inflatable last.

Figure 45:
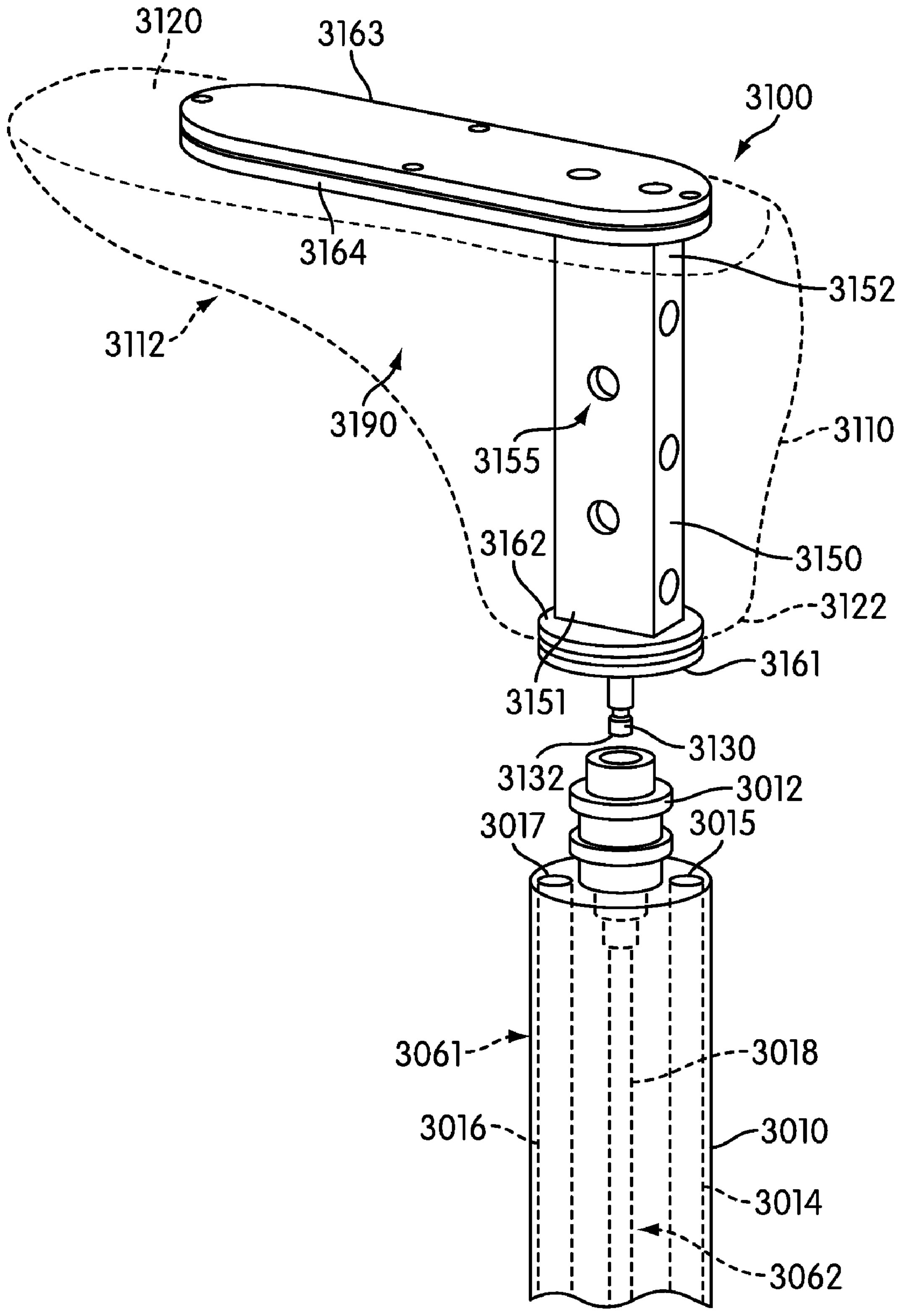
FIG. 45 is a close up view of an embodiment of a portion of a graphic transfer assembly.

FIG. 45 illustrates an isometric view of an embodiment of inflatable last 3100 in position to be attached to last post 3110. For purposes of illustration, body portion 3110 of inflatable last 3100 is shown in phantom, so that internal components of inflatable last 3100 are visible. Referring to FIG. 45, inflatable member 3100 may comprise support member 3150, which is disposed within interior chamber 3190 of inflatable last 3100. In some cases, support member 3150 may extend between bottom portion 3120 and top portion 3122 of inflatable member 3100. In other words, support member 3150 may extend in a generally vertical direction through inflatable member 3100. In other embodiments, however, support member 3150 could extend through inflatable member 3100 in another direction.

Generally, support member 3150 may be configured with any shape. In the exemplary embodiment, support member 3150 can have a substantially rectangular cross sectional shape. In other embodiments, however, support member 3150 can have any other cross sectional shape including, but not limited to, circular, oval, polygonal, regular, irregular, as well as any other kind of cross sectional shape. In another embodiment, for example, support member 3150 can be configured with a column-like geometry having a circular cross-sectional shape.

Generally, support member 3150 may be attached to inflatable member 3100 in any manner. In some embodiments, support member 3150 may be fixedly attached to inflatable member 3100. In other embodiments, support member 3150 may be removably attached to inflatable member 3100. In an exemplary embodiment, support member 3150 may be fixedly attached to inflatable member 3100 using support plates.

In some embodiments, inflatable member 3100 may include first support plate 3161 and second support plate 3162. In some cases, first support plate 3161 may be disposed on an external surface of top portion 3122 of inflatable member 3100. In addition, second support plate 3162 may be disposed on an internal surface of top portion 3122. In other words, second support plate 3162 may be disposed within interior chamber 3190 of inflatable member 3100. Furthermore, first support plate 3161 may be joined with second support plate 3162 using one or more fasteners that are further inserted through top portion 3122. In other words, top portion 3122 is sandwiched between first support plate 3161 and second support plate 3162, which allows first support plate 3161 and second support plate 3162 to be anchored in place with respect to top portion 3122.

In some embodiments, inflatable member 3100 may include third support plate 3163 and fourth support plate 3164. In some cases, third support plate 3163 may be disposed on an external surface of bottom portion 3120 of inflatable member 3100. In addition, fourth support plate 3164 may be disposed on an internal surface of bottom portion 3120. In other words, fourth support plate 3164 may be disposed within interior chamber 3190 of inflatable member. Furthermore, third support plate 3163 may be joined with fourth support plate 3164 using one or more fasteners that are further inserted through bottom portion 3120. In other words, bottom portion 3120 is sandwiched between third support plate 3163 and fourth support plate 3164, which allows third support plate 3163 and fourth support plate 3164 to be anchored in place with respect to bottom portion 3120.

In an exemplary embodiment, support member 3150 extends between support plates on top portion 3122 and bottom portion 3120. In particular, first end 3151 of support member 3150 is joined with second support plate 3162. Also, second end 3152 of support plate 3150 is joined with fourth support plate 3164. With this arrangement, support member 3150 may be held fixedly in place between top portion 3122 and bottom portion 3120.

In different embodiments, the geometries of one or more support plates can vary. In one embodiment, first support plate 3161 and second support plate 3162 can have substantially circular shapes. In some cases, the circular shapes for first support plate 3161 and second support plate 3162 correspond approximately to the shape of top portion 3122. In addition, in one embodiment, third support plate 3163 and fourth support plate 3164 can have elongated shapes with rounded end portions. In some cases, the shapes of third support plate 3163 and fourth support plate 3164 can correspond approximately to the shape of bottom portion 3120. In other embodiments, however, each support plate can have any other type of shape.

Although four support plates are used in the current embodiment, in other embodiments more or less than four support plates can be used. For example, in another embodiment, a first support plate may be disposed on a bottom portion of an inflatable member and a second support plate may be disposed on a top portion of an inflatable member. In some cases, the first support plate can be fastened directly to the bottom portion and the second support plate can be fastened directly to the top portion, rather than using a sandwiching arrangement as discussed above. Furthermore, in this alternative arrangement, the support member can be connected to the first support plate and the second support plate. Additionally, in still other embodiments, additional support plates can be provided on different portions of an inflatable member, including lateral side portions and/or medial side portions.

In some embodiments, inflatable member 3100 can include provisions for engaging with graphic transfer assembly 3000. In some embodiments, inflatable member 3100 can include stem 3130 for engaging with last post 3010. In some cases, stem 3130 can be associated with fluid port 3132, which is in fluid communication with interior chamber 3190 of inflatable member 3100. In other embodiments, however, inflatable member 3100 may not include a stem. In another embodiment, for example, a fluid port can be disposed on first support plate 3161 or directly on top portion 3122.

Generally, stem 3130 can be joined to inflatable member 3100 in any manner. In some cases, stem 3130 can be joined to inflatable member 3100 using an adhesive. In other cases, stem 3130 can be attached to inflatable member 3100 using fasteners. In other embodiments, stem 3130 may be integrally formed with a support plate. In an exemplary embodiment, step 3130 may be integrally formed with first support plate 3161 of inflatable member 3100.

In some embodiments, stem 3130 can include fluid port 3132 that is in fluid communication with interior chamber 3190 of inflatable member 3100. Generally, fluid port 3132 can be any type of port known in the art for controlling the flow of fluid between two regions. In some embodiments, fluid port 3132 may be associated with one or more air valves. For example, in one embodiment, fluid port 3132 may include a one way valve that helps to prevent fluid from leaving interior chamber 3190 but allows air to enter interior chamber 3190. In other embodiments, any other provisions known in the art for controlling the flow of fluids into or out of an inflatable device can be used.

In some embodiments, support member 3150 can include fluid port set 3155. Generally, fluid port set 3155 can comprise any number of fluid ports. In some cases, fluid port set 3155 can comprise at least five fluid ports. In other cases, fluid port set 3155 can comprise more than five fluid ports. In still other cases, fluid port set 3155 can comprise less than five fluid ports. In an exemplary embodiment, fluid port set 3155 can comprise a plurality of ports disposed on each sidewall of support member 3150.

In some cases, fluid port set 3155 may be in fluid communication with fluid port 3132. An exemplary arrangement is discussed in detail below. In other cases, however, fluid port set 3155 may not be in fluid communication with fluid port 3132.

In some embodiments, last post 3010 can include provisions for connecting with inflatable member 3100. In some embodiments, last post 3010 can include socket 3012. In some cases, socket 3012 may be a quick disconnect socket that is configured to automatically control fluid flow. Socket 3012 may also be in fluid communication with central tube 3018 of second fluid line 3062. With this arrangement, stem 3130 of inflatable member 3100 may be inserted into socket 3012 to provide fluid communication between fluid pump 3052 and inflatable member 3100.

Last stem 3010 may include provisions for supplying a vacuum between first deformable membrane 3032 and second deformable membrane 3034 (see FIG. 44). In some cases, last stem 3010 may be associated with first tube 3014 and second tube 3016. First tube 3014 and second tube 3016 may comprise distinct portions of fluid line 3061. Additionally, first tube 3014 and second tube 3016 can be further associated with first vacuum port 3015 and second vacuum port 3017, respectively. With this arrangement, vacuum pump 3050 can be used to draw a vacuum between first deformable membrane 3032 and second deformable membrane 3034 using first vacuum port 3015 and second vacuum port 3017.

The arrangements illustrated and discussed in the current embodiment for first fluid line 3061 and second fluid line 3062 are only intended to be exemplary. In other embodiments, other arrangements can be provided for directing fluid between a fluid pump and an inflatable member as well as for providing a vacuum between deformable membranes. For example, while first fluid line 3061 comprises two tubes at last post 3010 in the current embodiment, in other embodiments, this portion of fluid line 3061 may be associated with more than two tubes, or only a single tube. Likewise, while second fluid line 3062 comprises a single central tube in the current embodiment, other embodiments can be associated with additional tubes.

Figure 46:
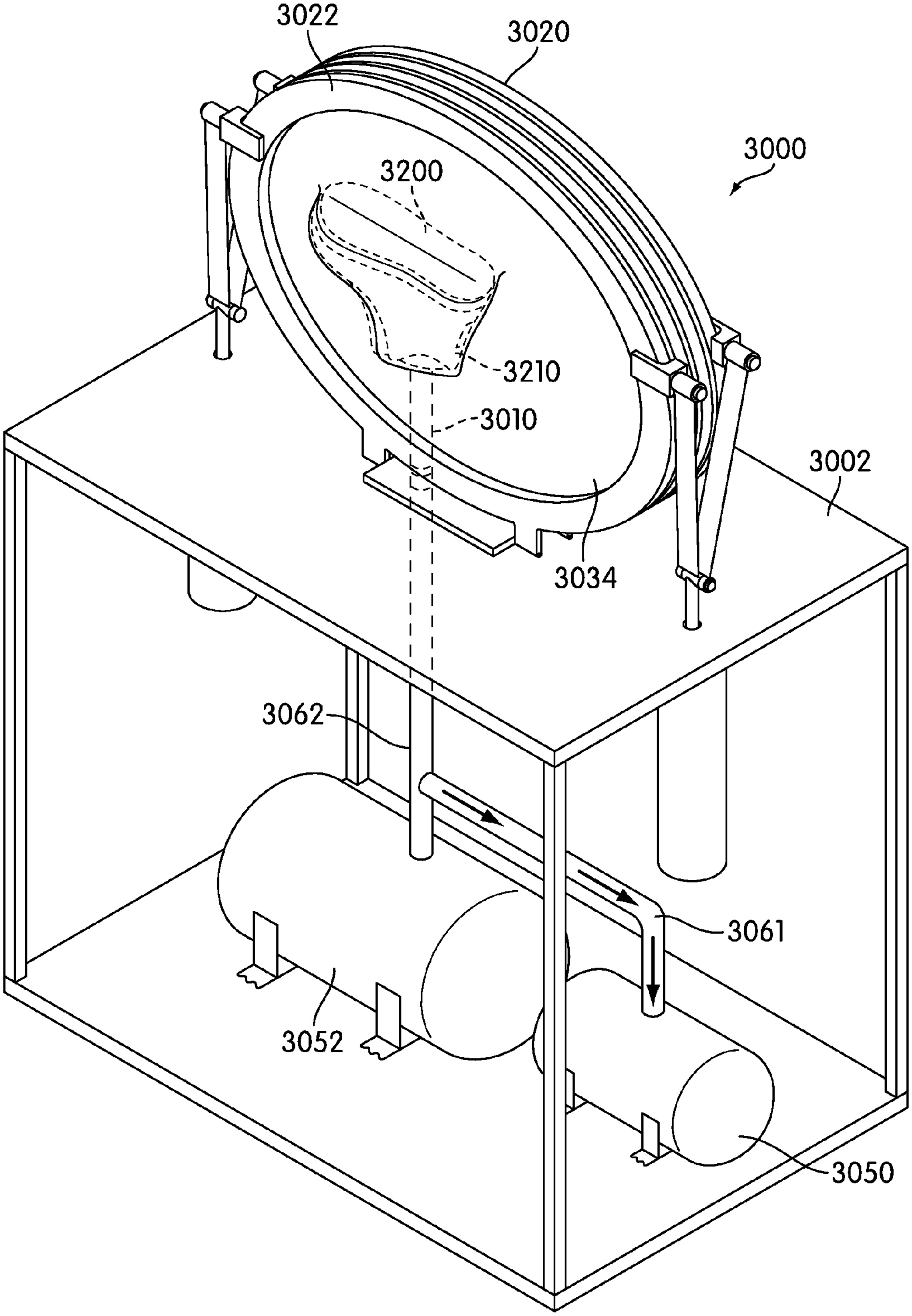
FIG. 46 is an isometric view of an embodiment of a graphic transfer assembly.
Figure 47:
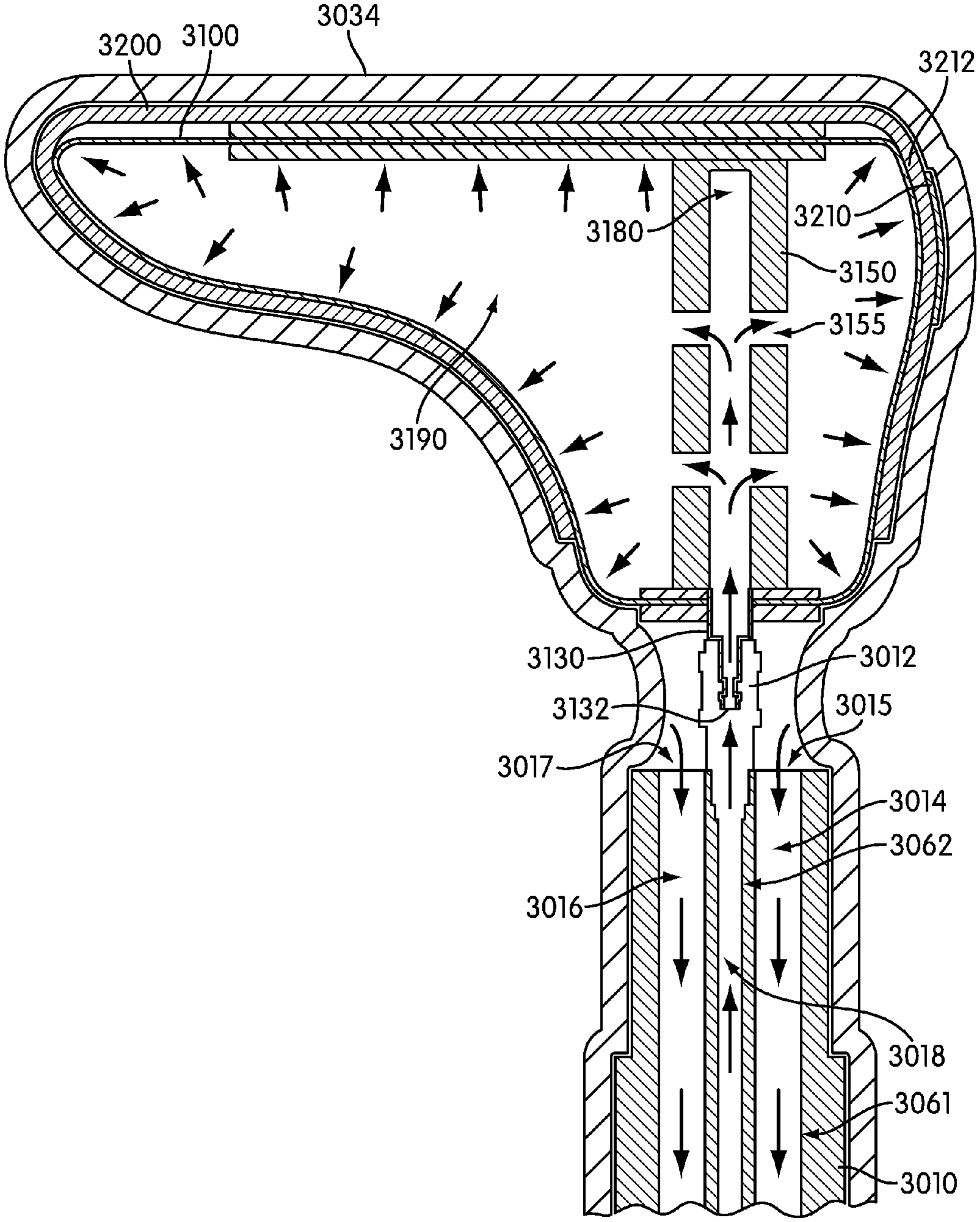
FIG. 47 a cross sectional view of an embodiment of a graphic transfer assembly.

Referring to FIGS. 46 through 47, article of footwear 3200 is disposed between first deformable membrane 3032 (see FIG. 44) and second deformable membrane 3034. For purposes of illustration, only second deformable membrane 3034 may be seen in the cross sectional view illustrated in FIG. 47. After article of footwear 3200 is applied to inflatable member 3100, inflatable member 3100 may be fully inflated. In this case, fluid from fluid pump 3052 is pumped into central tube 3018 and then to fluid port 3132. Upon entering fluid port 3132, the fluid may travel through central channel 3180 of support member 3150 and exit support member 3150 via fluid port set 3155. With this arrangement, fluid may fill interior chamber 3190 until inflatable member 3100 is inflated to a desired pressure. In some cases, socket 3012 can be configured to shut off fluid flow into fluid port 3132 when inflatable member 3100 has been inflated to a desired pressure. In other cases, fluid pump 3052 may be stopped to prevent additional fluid from entering inflatable member 3100.

As illustrated in the current embodiment, some portions of stem 3130 may extend through first support plate 3161 and second support plate 3162. This arrangement may allow air to travel from fluid port 3032 into central channel 3180 of support member 3150. In other embodiments, however, stem 3130 may not extend through first support plate 3161 and/or second support plate 3162. Instead, for example, central holes or cavities of first support plate 3161 and/or second support plate 3162 can provide for fluid communication between stem 3130 and central channel 3180.

At this point, a vacuum may be applied between first deformable membrane 3032 and second deformable membrane 3034. In particular, air disposed between first deformable membrane 3032 and second deformable membrane 3034 may be evacuated using first fluid line 3061 that is connected to vacuum pump 3050. In particular, air trapped between first deformable membrane 3032 and second deformable membrane 3034 may be pulled through first vacuum port 3015 and second vacuum port 3017 down first tube 3014 and second tube 3016, respectively, of first fluid line 3061. Eventually, as a substantial entirety of the air is evacuated, first deformable membrane 3032 and second deformable membrane 3034 may be pulled tightly against the outer surface of article of footwear 3200. In particular, first deformable membrane 3032 and second deformable membrane 3034 may conform to curved portions of article of footwear 3200. Furthermore, graphic 3210 may be pressed against curved portion 3212 of article of footwear 3200 using second deformable membrane 3034.

In different embodiments, the materials used for different portions of an inflatable member can vary. In some cases, a body portion, which is configured to expand or otherwise elastically deform, can be made of a substantially elastic material or any other type of material, such as the materials disclosed above. In addition, a support member can be made of any material. In some cases, a support member can be made of a substantially rigid material including, but not limited to, metal, a rigid plastic, wood as well as any other substantially rigid material. In other cases, a support member may comprise a material that is substantially elastic and capable of deforming with an inflatable member. Furthermore, support plates used with an inflatable member can be made of materials having any rigidity. In some cases, support plates can be made of a substantially rigid material including, but not limited to, metal, plastic, wood or other rigid materials. In other cases, however, support plates can be made of any other kind of material. In an exemplary embodiment, a support member and one or more support plates used with an inflatable member can be made of a substantially rigid material, such as a material comprising metal, in order to provide a substantially rigid frame for the inflatable member. Also, by using substantially rigid materials, the durability of a support member and/or support plates can be increased so that an inflatable member can be used for extended periods of time before replacement. This can help to protect against premature wear caused by the use of the inflatable member in creating multiple sizes of footwear, which increases the time of use over traditional lasts that are used for creating a single size of footwear.

A graphic transfer assembly can include provisions for reducing the number of lasts required to apply graphics to articles of various sizes. In some cases, a graphic transfer assembly can be associated with a last with a variable size. In an exemplary embodiment, a graphic transfer assembly can be associated with an inflatable member with a variable size.

Figure 48:
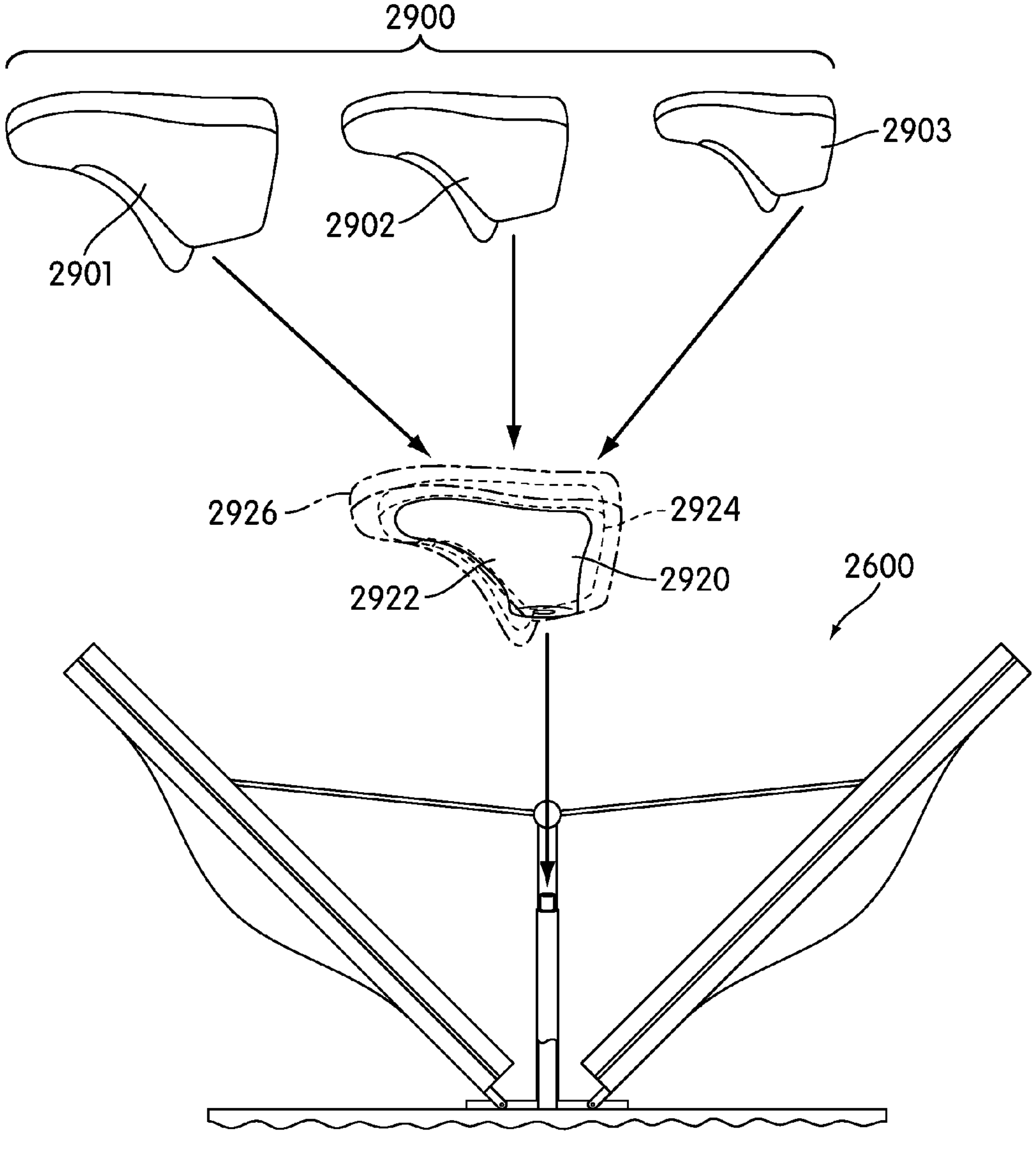
FIG. 48 is a schematic view of an embodiment of a set of articles that may be associated with a graphic transfer assembly.

Referring to FIG. 48, graphics may be applied to a set of articles of varying sizes. In one embodiment, set of articles 2900 may be associated with graphics that may be applied by graphic transfer assembly 2600. In one embodiment, set of articles 2900 includes first article 2901, second article 2902 and third article 2903. Set of articles 2900 may include at least two different sizes of articles. In an exemplary embodiment, set of articles 2900 may include three different sizes of articles. For example, first article 2901 may be a size 10 article. Second article 2902 may be a size 9½ article. Likewise, third article 2903 may be a size 9 article.

In some embodiments, each article of a set of articles may be associated with a corresponding last of a similar size. In other embodiments, a single last may be used for articles of two or more different sizes. In an exemplary embodiment, set of articles 2900 may be associated with inflatable member 2920. In particular, inflatable member 2920 may be configured to inflate to various sizes that are configured to fit articles of a predetermined size. For example, in this embodiment, inflatable member 2920 may be configured to inflate to first size 2922 that is configured to fit third article 2903. In addition, inflatable member 2920 may be configured to inflate to second size 2924 that is configured to fit second article 2902. Also, inflatable member 2920 may be configured to inflate to third size 2926 that is configured fit first article 2901. With this arrangement, a single inflatable member can be used to provide support to articles of varying sizes for the purposes of applying a graphic to the article.

It will be understood that in different embodiments an inflatable member can be associated with varying ranges of shoe sizes. For example, in one embodiment, an inflatable member can be configured to accommodate any article with a size in the range between size 7 and size 8. In another embodiment, an inflatable member can be configured to accommodate any article with a size in the range between size 7 and size 9. In still another embodiment, an inflatable member can be configured to accommodate any article with a size in the range between size 5 and size 9. The ranges discussed here are only intended to be exemplary and in different embodiments an inflatable member can be used with articles of any standard or non-standard sizes.

In some cases, the material comprising an inflatable member can vary to accommodate different degrees of stretching. For example, in embodiments where an inflatable member may be used with a wide range of sizes, the inflatable member may be made of a substantially elastic material that is capable of expanding over several article sizes. However, in embodiments where an inflatable member may only be used with a narrow range of sizes, the inflatable member can be made of materials with a lower elasticity since the inflatable member may only undergo slight expansion.

Using a single inflatable member for articles of varying sizes can help reduce manufacturing costs over systems that require the use of a distinct last for each distinct article size. As an example, an embodiment using inflatable members that are configured to vary between a predetermined whole size and the next half size can substantially reduce the overall number of lasts required to operate a graphic transfer assembly by almost half. In particular, where a traditional last system would require distinct lasts for sizes 5, 5½, 6, 6½, 7, 7½, 8, 8½, 9, 9½, 10 and 10½, which is a total of 12 lasts, using inflatable members capable of expanding by half a size could reduce the total number of lasts used to 6, since each whole and next half size could be associated with a single inflatable member. Furthermore, in embodiments where an inflatable member is capable of expanding through a larger range of sizes, the number of lasts required to operate a graphic transfer assembly can be further reduced.

In addition to reducing manufacturing costs due to a decreased number of lasts required to operate a graphic transfer assembly, using an inflatable member can also help reduce manufacturing costs by increasing the efficiency of the graphic transfer assembly. In particular, in some cases, the size of an inflatable member can be varied in a shorter period of time than the time required to remove one last of a particular size and attach another last of a different size. This arrangement may help reduce the time required to apply graphics to articles of varying sizes.

An inflatable member used with a graphic transfer assembly can include provisions for providing varying types of rigidity. In some cases, an inflatable member can include a first portion having a first rigidity and a second portion having a second rigidity that is different from the first rigidity.

Figure 49:
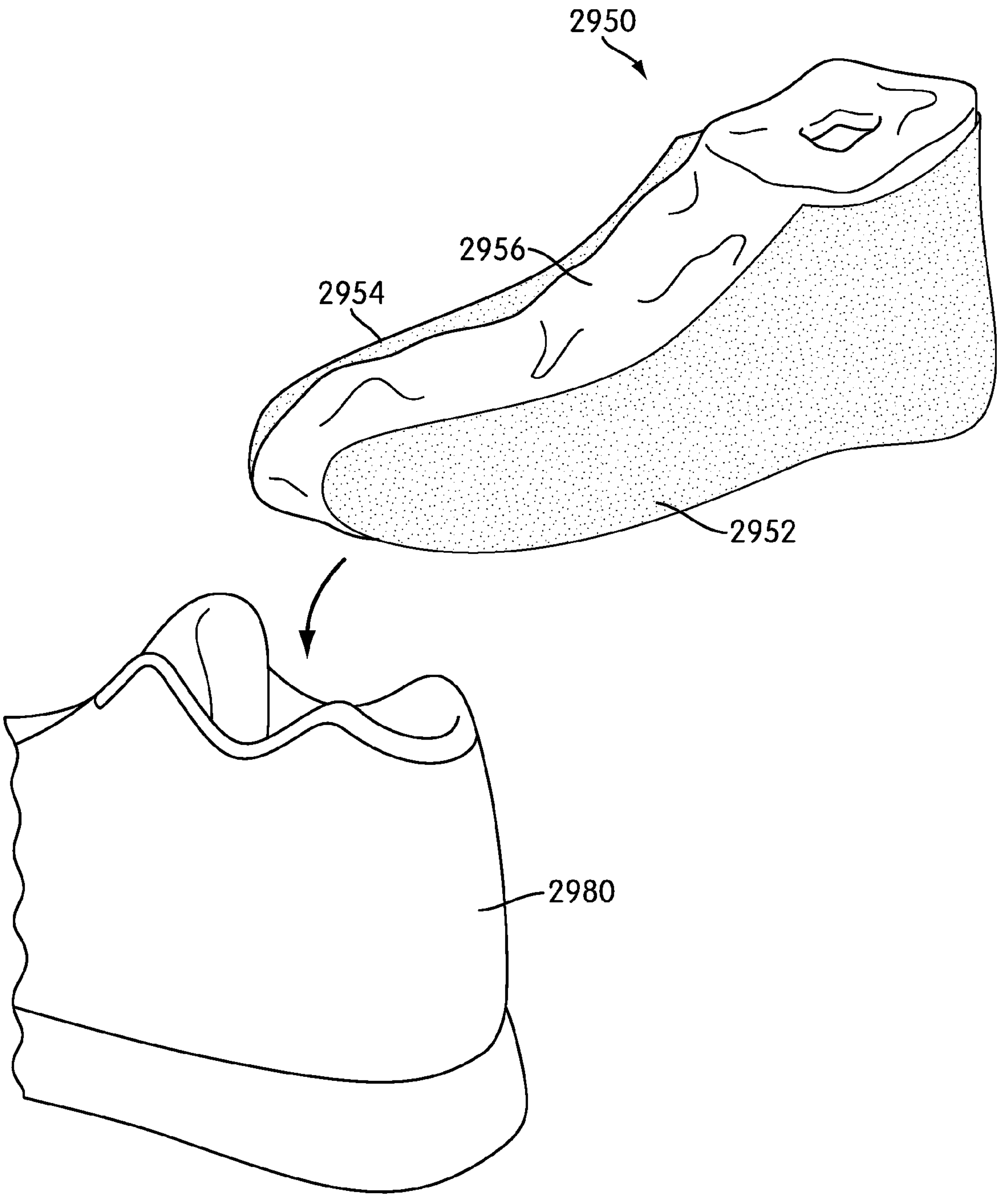
FIG. 49 is an isometric view of an embodiment of an inflatable member with various portions of differing rigidities.

FIG. 49 illustrates an embodiment of inflatable member 2950. In this embodiment, inflatable member 2950 includes first side portion 2952, second side portion 2954 and intermediate portion 2956 that is disposed between first side portion 2952 and second side portion 2954. In some cases, first side portion 2952 may be associated with a first rigidity. Also, intermediate portion 2956 may be associated with a second rigidity. In addition, second side portion 2954 maybe associated with the first rigidity. In one embodiment, the first rigidity and the second rigidity can be substantially similar. In another embodiment, the first rigidity may be substantially different than the second rigidity. In an exemplary embodiment, the first rigidity can be substantially greater than the second rigidity. In other words, in one embodiment, intermediate portion 2956 may be less rigid than first side portion 2952 and second side portion 2954.

In some cases, inflatable member 2950 can be inserted into article 2980 in a partially deflated state. Since intermediate portion 2956 is less rigid than first side portion 2952 and second side portion 2954, first side portion 2952 and second side portion 2954 may be disposed closer together as intermediate portion 2956 elastically compresses. This arrangement may help inflatable member 2950 insert more easily into article 2980.

After inflatable member 2950 has been fully inserted into article 2980, inflatable member 2950 may be fully inflated. In particular, intermediate portion 2956 may be configured to elastically expand to allow first side portion 2952 and second side portion 2954 to be pressed along the interior side walls of article 2980. With this arrangement, first side portion 2952 and second side portion 2954 may provide substantially rigid support for applying any graphics to the sides of article 2980 using a graphic transfer assembly.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A graphic transfer assembly, comprising:

a base portion configured to support graphic transfer assembly;

a first moveable portion including a first deformable membrane and a second moveable portion including a second deformable membrane;

an actuator configured to control the first moveable portion and the second moveable portion between an open position and a closed position;

a support assembly configured to attach an inflatable member to the base portion;

the support assembly including a first fluid port configured to fill an interior chamber of the inflatable member with fluid;

the support assembly also including a second fluid port, the second fluid port configured to apply a vacuum between the first deformable membrane and the second deformable membrane;

wherein the first deformable membrane and the second deformable membrane are configured to conform to a portion of an article and thereby transfer a graphic to the article;

wherein the inflatable member includes a support member disposed within the interior chamber, and wherein the support member extends between a top portion and a bottom portion of the inflatable member; and wherein the bottom portion of the inflatable member is associated with a first support plate, and wherein the top portion of the inflatable member is associated with a second support plate, and wherein the support member extends between the first support plate and the second support plate.

2. The graphic transfer assembly according to claim 1, wherein the second fluid port is in fluid communication with a vacuum pump.

3. The graphic transfer assembly according to claim 2, wherein the first fluid port is in fluid communication with a fluid pump.

4. The graphic transfer assembly according to claim 1, wherein the first fluid port is disposed on a post of the support assembly.

5. The graphic transfer assembly according to claim 1, wherein the second fluid port is disposed on a post of the support assembly.

6. The graphic transfer assembly according to claim 5, wherein the second fluid port is associated with a set of fluid ports, the set of fluid ports comprising at least two fluid ports in fluid communication with a vacuum pump.

7. The graphic transfer assembly according to claim 1, wherein the inflatable member includes a first portion with a first rigidity and a second portion with a second rigidity, and wherein the first rigidity is different than the second rigidity.

8. The graphic transfer assembly according to claim 7, wherein the first portion is a side portion of the inflatable member, and wherein the second portion is an intermediate portion of the inflatable member.

9. The graphic transfer assembly according to claim 1, wherein the first support plate includes a stem configured to attach to the first fluid port.

10. The graphic transfer assembly according to claim 1, wherein the support member includes a fluid port set in fluid communication with the first fluid port when the inflatable member is connected to the graphic transfer assembly.

11. The graphic transfer assembly according to claim 1, wherein the the support member includes a central channel that places the first port in fluid communication with at least one port set.

* * * * *